US010248899B2

(12) United States Patent
Kesler et al.

(10) Patent No.: US 10,248,899 B2
(45) Date of Patent: Apr. 2, 2019

(54) RFID TAG AND TRANSPONDER DETECTION IN WIRELESS ENERGY TRANSFER SYSTEMS

(71) Applicant: WiTricity Corporation, Watertown, MA (US)

(72) Inventors: Morris P. Kesler, Bedford, MA (US);
Dustin J. Alinger, Boston, MA (US);
Karl Twelker, Somerville, MA (US);
Oguz Atasoy, Watertown, MA (US);
Shrenik Vora, Philadelphia, PA (US);
Noam Katz, Lincoln, RI (US)

(73) Assignee: WiTricity Corporation, Watertown, MA (US)

( * ) Notice: Subject to any disclaimer, the term of this patent is extended or adjusted under 35 U.S.C. 154(b) by 0 days.

(21) Appl. No.: 15/287,596

(22) Filed: Oct. 6, 2016

(65) Prior Publication Data
US 2017/0098149 A1  Apr. 6, 2017

Related U.S. Application Data

(60) Provisional application No. 62/237,676, filed on Oct. 6, 2015, provisional application No. 62/246,971, filed
(Continued)

(51) Int. Cl.
*G06K 19/07* (2006.01)
*H02J 50/12* (2016.01)
(Continued)

(52) U.S. Cl.
CPC .......... *G06K 19/0726* (2013.01); *H02J 50/12* (2016.02); *H02J 50/60* (2016.02); *H04B 5/0037* (2013.01)

(58) Field of Classification Search
None
See application file for complete search history.

(56) References Cited

U.S. PATENT DOCUMENTS

| 645,576 A | 3/1900 | Tesla |
| 649,621 A | 5/1900 | Tesla |

(Continued)

FOREIGN PATENT DOCUMENTS

| CA | 142352 | 8/1912 |
| CN | 102239633 | 11/2011 |

(Continued)

OTHER PUBLICATIONS

Preradovic et al, "Chipless RFID: Bar Code of the Future". Dec. 2010. IEEE, Microwave Magazine.*
(Continued)

*Primary Examiner* — Thien M Le
*Assistant Examiner* — Asifa Habib
(74) *Attorney, Agent, or Firm* — Fish & Richardson P.C.

(57) ABSTRACT

The disclosure features wireless power transmitters configured to detect a radio frequency identification (RFID) tag, the transmitters including a transmitter resonator, a transmitter impedance matching network coupled to the transmitter resonator, an amplifier coupled to the transmitter impedance matching network, a detection subsystem connected to the transmitter resonator, and a controller coupled to the amplifier and to the detection subsystem and configured so that during operation of the transmitter, the controller is configured to control the transmitter resonator, the amplifier, and the impedance matching network to cycle the transmitter between a power transmission mode and a RFID tag detection mode.

24 Claims, 37 Drawing Sheets

Related U.S. Application Data on Oct. 27, 2015, provisional application No. 62/264,305, filed on Dec. 7, 2015, provisional application No. 62/371,009, filed on Aug. 4, 2016.

(51) Int. Cl.
*H04B 5/00* (2006.01)
*H02J 50/60* (2016.01)

(56) References Cited

U.S. PATENT DOCUMENTS

| | | |
|---|---|---|
| 787,412 A | 4/1905 | Tesla |
| 1,119,732 A | 12/1914 | Tesla |
| 2,133,494 A | 10/1938 | Waters |
| 3,517,350 A | 6/1970 | Beaver |
| 3,535,543 A | 10/1970 | Dailey |
| 3,780,425 A | 12/1973 | Penn et al. |
| 3,871,176 A | 3/1975 | Schukei |
| 4,088,999 A | 5/1978 | Fletcher et al. |
| 4,095,998 A | 6/1978 | Hanson |
| 4,180,795 A | 12/1979 | Matsuda et al. |
| 4,280,129 A | 7/1981 | Wells |
| 4,450,431 A | 5/1984 | Hochstein |
| 4,588,978 A | 5/1986 | Allen |
| 5,027,709 A | 7/1991 | Slagle |
| 5,033,295 A | 7/1991 | Schmid et al. |
| 5,034,658 A | 7/1991 | Hiering et al. |
| 5,053,774 A | 10/1991 | Schuermann et al. |
| 5,070,293 A | 12/1991 | Ishii et al. |
| 5,118,997 A | 6/1992 | El-Hamamsy |
| 5,216,402 A | 6/1993 | Carosa |
| 5,229,652 A | 7/1993 | Hough |
| 5,287,112 A | 2/1994 | Schuermann |
| 5,341,083 A | 8/1994 | Klontz et al. |
| 5,367,242 A | 11/1994 | Hulman |
| 5,374,930 A | 12/1994 | Schuermann |
| 5,408,209 A | 4/1995 | Tanzer et al. |
| 5,437,057 A | 7/1995 | Richley et al. |
| 5,455,467 A | 10/1995 | Young et al. |
| 5,493,691 A | 2/1996 | Barrett |
| 5,522,856 A | 6/1996 | Reineman |
| 5,528,113 A | 6/1996 | Boys et al. |
| 5,541,604 A | 7/1996 | Meier |
| 5,550,452 A | 8/1996 | Shirai et al. |
| 5,565,763 A | 10/1996 | Arrendale et al. |
| 5,630,835 A | 5/1997 | Brownlee |
| 5,697,956 A | 12/1997 | Bornzin |
| 5,703,461 A | 12/1997 | Minoshima et al. |
| 5,703,573 A | 12/1997 | Fujimoto et al. |
| 5,710,413 A | 1/1998 | King et al. |
| 5,742,471 A | 4/1998 | Barbee, Jr. et al. |
| 5,821,728 A | 10/1998 | Sshwind |
| 5,821,731 A | 10/1998 | Kuki et al. |
| 5,864,323 A | 1/1999 | Berthon |
| 5,898,579 A | 4/1999 | Boys et al. |
| 5,903,134 A | 5/1999 | Takeuchi |
| 5,923,544 A | 7/1999 | Urano |
| 5,940,509 A | 8/1999 | Jovanovich et al. |
| 5,957,956 A | 9/1999 | Kroll et al. |
| 5,959,245 A | 9/1999 | Moe et al. |
| 5,986,895 A | 11/1999 | Stewart et al. |
| 5,993,996 A | 11/1999 | Firsich |
| 5,999,308 A | 12/1999 | Nelson et al. |
| 6,012,659 A | 1/2000 | Nakazawa et al. |
| 6,047,214 A | 4/2000 | Mueller et al. |
| 6,066,163 A | 5/2000 | John |
| 6,067,473 A | 5/2000 | Greeninger et al. |
| 6,108,579 A | 8/2000 | Snell et al. |
| 6,127,799 A | 10/2000 | Krishnan |
| 6,176,433 B1 | 1/2001 | Uesaka et al. |
| 6,184,651 B1 | 2/2001 | Fernandez et al. |
| 6,207,887 B1 | 3/2001 | Bass et al. |
| 6,232,841 B1 | 5/2001 | Bartlett et al. |
| 6,238,387 B1 | 5/2001 | Miller, III |
| 6,252,762 B1 | 6/2001 | Amatucci |
| 6,436,299 B1 | 8/2002 | Baarman et al. |
| 6,450,946 B1 | 9/2002 | Forsell |
| 6,452,465 B1 | 9/2002 | Brown et al. |
| 6,459,218 B2 | 10/2002 | Boys et al. |
| 6,473,028 B1 | 10/2002 | Luc |
| 6,483,202 B1 | 11/2002 | Boys |
| 6,515,878 B1 | 2/2003 | Meins et al. |
| 6,535,133 B2 | 3/2003 | Gohara |
| 6,561,975 B1 | 5/2003 | Pool et al. |
| 6,563,425 B2 | 5/2003 | Nicholson et al. |
| 6,597,076 B2 | 7/2003 | Scheible et al. |
| 6,609,023 B1 | 8/2003 | Fischell et al. |
| 6,631,072 B1 | 10/2003 | Paul et al. |
| 6,650,227 B1 | 11/2003 | Bradin |
| 6,664,770 B1 | 12/2003 | Bartels |
| 6,673,250 B2 | 1/2004 | Kuennen et al. |
| 6,683,256 B2 | 1/2004 | Kao |
| 6,696,647 B2 | 2/2004 | Ono et al. |
| 6,703,921 B1 | 3/2004 | Wuidart et al. |
| 6,731,071 B2 | 5/2004 | Baarman |
| 6,749,119 B2 | 6/2004 | Scheible et al. |
| 6,772,011 B2 | 8/2004 | Dolgin |
| 6,798,716 B1 | 9/2004 | Charych |
| 6,803,744 B1 | 10/2004 | Sabo |
| 6,806,649 B2 | 10/2004 | Mollema et al. |
| 6,812,645 B2 | 11/2004 | Baarman |
| 6,825,620 B2 | 11/2004 | Kuennen et al. |
| 6,831,417 B2 | 12/2004 | Baarman |
| 6,839,035 B1 | 1/2005 | Addonisio et al. |
| 6,844,702 B2 | 1/2005 | Giannopoulos et al. |
| 6,856,291 B2 | 2/2005 | Mickle et al. |
| 6,858,970 B2 | 2/2005 | Malkin et al. |
| 6,903,656 B1 * | 6/2005 | Lee ............... G06K 7/0008 340/10.1 |
| 6,906,495 B2 | 6/2005 | Cheng et al. |
| 6,917,163 B2 | 7/2005 | Baarman |
| 6,917,431 B2 | 7/2005 | Soljacic et al. |
| 6,937,130 B2 | 8/2005 | Scheible et al. |
| 6,960,968 B2 | 11/2005 | Odendaal et al. |
| 6,961,619 B2 | 11/2005 | Casey |
| 6,967,462 B1 | 11/2005 | Landis |
| 6,975,198 B2 | 12/2005 | Baarman |
| 6,988,026 B2 | 1/2006 | Breed et al. |
| 7,027,311 B2 | 4/2006 | Vanderelli et al. |
| 7,035,076 B1 | 4/2006 | Stevenson |
| 7,042,196 B2 | 5/2006 | Ka-Lai et al. |
| 7,069,064 B2 | 6/2006 | Govorgian et al. |
| 7,084,605 B2 | 8/2006 | Mickle et al. |
| 7,116,200 B2 | 10/2006 | Baarman et al. |
| 7,118,240 B2 | 10/2006 | Baarman et al. |
| 7,126,450 B2 | 10/2006 | Baarman et al. |
| 7,127,293 B2 | 10/2006 | MacDonald |
| 7,132,918 B2 | 11/2006 | Baarman et al. |
| 7,147,604 B1 | 12/2006 | Allen et al. |
| 7,180,248 B2 | 2/2007 | Kuennen et al. |
| 7,191,007 B2 | 3/2007 | Desai et al. |
| 7,193,418 B2 | 3/2007 | Freytag |
| D541,322 S | 4/2007 | Garrett et al. |
| 7,212,414 B2 | 5/2007 | Baarman |
| 7,233,137 B2 | 6/2007 | Nakamura et al. |
| D545,855 S | 7/2007 | Garrett et al. |
| 7,239,110 B2 | 7/2007 | Cheng et al. |
| 7,248,017 B2 | 7/2007 | Cheng et al. |
| 7,251,527 B2 | 7/2007 | Lyden |
| 7,288,918 B2 | 10/2007 | DiStefano |
| 7,340,304 B2 | 3/2008 | MacDonald |
| 7,375,492 B2 | 5/2008 | Calhoon et al. |
| 7,375,493 B2 | 5/2008 | Calhoon et al. |
| 7,378,817 B2 | 5/2008 | Calhoon et al. |
| 7,382,636 B2 | 6/2008 | Baarman et al. |
| 7,385,357 B2 | 6/2008 | Kuennen et al. |
| 7,443,135 B2 | 10/2008 | Cho |
| 7,462,951 B1 | 12/2008 | Baarman |
| 7,466,213 B2 | 12/2008 | Lobl et al. |
| 7,471,062 B2 | 12/2008 | Bruning |
| 7,474,058 B2 | 1/2009 | Baarman |
| 7,492,247 B2 | 2/2009 | Schmidt et al. |
| 7,514,818 B2 | 4/2009 | Abe et al. |
| 7,518,267 B2 | 4/2009 | Baarman |

(56) References Cited

U.S. PATENT DOCUMENTS

| | | |
|---|---|---|
| 7,521,890 B2 | 4/2009 | Lee et al. |
| 7,525,283 B2 | 4/2009 | Cheng et al. |
| 7,545,337 B2 | 6/2009 | Guenther |
| 7,554,316 B2 | 6/2009 | Stevens et al. |
| 7,599,743 B2 | 10/2009 | Hassler, Jr. et al. |
| 7,615,936 B2 | 11/2009 | Baarman et al. |
| 7,639,514 B2 | 12/2009 | Baarman |
| 7,741,734 B2 | 6/2010 | Joannopoulos et al. |
| 7,795,708 B2 | 9/2010 | Katti |
| 7,825,543 B2 | 11/2010 | Karalis et al. |
| 7,825,544 B2 | 11/2010 | Jansen et al. |
| 7,835,417 B2 | 11/2010 | Heideman et al. |
| 7,843,288 B2 | 11/2010 | Lee et al. |
| 7,844,306 B2 | 11/2010 | Shearer et al. |
| 7,863,859 B2 | 1/2011 | Soar |
| 7,880,337 B2 | 2/2011 | Farkas |
| 7,884,697 B2 | 2/2011 | Wei et al. |
| 7,885,050 B2 | 2/2011 | Lee |
| 7,919,886 B2 | 4/2011 | Tanaka |
| 7,923,870 B2 | 4/2011 | Jin |
| 7,932,798 B2 | 4/2011 | Tolle et al. |
| 7,948,209 B2 | 5/2011 | Jung |
| 7,952,322 B2 | 5/2011 | Partovi et al. |
| 7,963,941 B2 | 6/2011 | Wilk |
| 7,969,045 B2 | 6/2011 | Schmidt et al. |
| 7,994,880 B2 | 8/2011 | Chen et al. |
| 7,999,506 B1 | 8/2011 | Hollar et al. |
| 8,022,576 B2 | 9/2011 | Joannopoulos et al. |
| 8,035,255 B2 | 10/2011 | Kurs et al. |
| 8,076,800 B2 | 12/2011 | Joannopoulos et al. |
| 8,076,801 B2 | 12/2011 | Karalis et al. |
| 8,084,889 B2 | 12/2011 | Joannopoulos et al. |
| 8,097,983 B2 | 1/2012 | Karalis et al. |
| 8,106,539 B2 | 1/2012 | Schatz et al. |
| 8,115,448 B2 | 2/2012 | John |
| 8,131,378 B2 | 3/2012 | Greenberg et al. |
| 8,178,995 B2 | 5/2012 | Amano et al. |
| 8,193,769 B2 | 6/2012 | Azancot et al. |
| 8,212,414 B2 | 7/2012 | Howard et al. |
| 8,260,200 B2 | 9/2012 | Shimizu et al. |
| 8,304,935 B2 | 11/2012 | Karalis et al. |
| 8,324,759 B2 | 12/2012 | Karalis et al. |
| 8,334,620 B2 | 12/2012 | Park et al. |
| 8,362,651 B2 | 1/2013 | Hamam et al. |
| 8,395,282 B2 | 3/2013 | Joannopoulos et al. |
| 8,395,283 B2 | 3/2013 | Joannopoulos et al. |
| 8,400,017 B2 | 3/2013 | Kurs et al. |
| 8,400,018 B2 | 3/2013 | Joannopoulos et al. |
| 8,400,019 B2 | 3/2013 | Joannopoulos et al. |
| 8,400,020 B2 | 3/2013 | Joannopoulos et al. |
| 8,400,021 B2 | 3/2013 | Joannopoulos et al. |
| 8,400,022 B2 | 3/2013 | Joannopoulos et al. |
| 8,400,023 B2 | 3/2013 | Joannopoulos et al. |
| 8,400,024 B2 | 3/2013 | Joannopoulos et al. |
| 8,410,636 B2 | 4/2013 | Kurs et al. |
| 8,441,154 B2 | 5/2013 | Karalis et al. |
| 8,457,547 B2 | 6/2013 | Meskens |
| 8,461,719 B2 | 6/2013 | Kesler et al. |
| 8,461,720 B2 | 6/2013 | Kurs et al. |
| 8,461,721 B2 | 6/2013 | Karalis et al. |
| 8,461,722 B2 | 6/2013 | Kurs et al. |
| 8,461,817 B2 | 6/2013 | Martin et al. |
| 8,466,583 B2 | 6/2013 | Karalis et al. |
| 8,471,410 B2 | 6/2013 | Karalis et al. |
| 8,476,788 B2 | 7/2013 | Karalis et al. |
| 8,482,157 B2 | 7/2013 | Cook et al. |
| 8,482,158 B2 | 7/2013 | Kurs et al. |
| 8,487,480 B1 | 7/2013 | Kesler et al. |
| 8,497,601 B2 | 7/2013 | Hall et al. |
| 8,552,592 B2 | 10/2013 | Schatz et al. |
| 8,569,914 B2 | 10/2013 | Karalis et al. |
| 8,587,153 B2 | 11/2013 | Schatz et al. |
| 8,587,155 B2 | 11/2013 | Giler et al. |
| 8,598,743 B2 | 12/2013 | Hall et al. |
| 8,618,696 B2 | 12/2013 | Karalis et al. |
| 8,629,578 B2 | 1/2014 | Kurs et al. |
| 8,643,326 B2 | 2/2014 | Campanella et al. |
| 8,946,939 B2 | 2/2015 | Drennen |
| 9,281,706 B2 | 3/2016 | McFarthing |
| 9,608,480 B2 * | 3/2017 | Lee .................. H04B 5/0031 |
| 2002/0032471 A1 | 3/2002 | Loftin et al. |
| 2002/0105343 A1 | 8/2002 | Scheible et al. |
| 2002/0118004 A1 | 8/2002 | Scheible et al. |
| 2002/0130642 A1 | 9/2002 | Ettes et al. |
| 2002/0167294 A1 | 11/2002 | Odaohhara |
| 2003/0038641 A1 | 2/2003 | Scheible |
| 2003/0062794 A1 | 4/2003 | Scheible et al. |
| 2003/0062980 A1 | 4/2003 | Scheible et al. |
| 2003/0071034 A1 | 4/2003 | Thompson et al. |
| 2003/0124050 A1 | 7/2003 | Yadav et al. |
| 2003/0126948 A1 | 7/2003 | Yadav et al. |
| 2003/0160590 A1 | 8/2003 | Schaefer et al. |
| 2003/0199778 A1 | 10/2003 | Mickle et al. |
| 2003/0214255 A1 | 11/2003 | Baarman et al. |
| 2004/0000974 A1 | 1/2004 | Odenaal et al. |
| 2004/0026998 A1 | 2/2004 | Henriott et al. |
| 2004/0100338 A1 | 5/2004 | Clark |
| 2004/0113847 A1 | 6/2004 | Qi et al. |
| 2004/0130425 A1 | 7/2004 | Dayan et al. |
| 2004/0130915 A1 | 7/2004 | Baarman |
| 2004/0130916 A1 | 7/2004 | Baarman |
| 2004/0142733 A1 | 7/2004 | Parise |
| 2004/0150934 A1 | 8/2004 | Baarman |
| 2004/0189246 A1 | 9/2004 | Bulai et al. |
| 2004/0201361 A1 | 10/2004 | Koh et al. |
| 2004/0222751 A1 | 11/2004 | Mollema et al. |
| 2004/0227057 A1 | 11/2004 | Tuominen et al. |
| 2004/0232845 A1 | 11/2004 | Baarman |
| 2004/0233043 A1 | 11/2004 | Yazawa et al. |
| 2004/0267501 A1 | 12/2004 | Freed et al. |
| 2005/0007067 A1 | 1/2005 | Baarman et al. |
| 2005/0021134 A1 | 1/2005 | Opie |
| 2005/0027192 A1 | 2/2005 | Govari et al. |
| 2005/0033382 A1 | 2/2005 | Single |
| 2005/0085873 A1 | 4/2005 | Gord et al. |
| 2005/0093475 A1 | 5/2005 | Kuennen et al. |
| 2005/0104064 A1 | 5/2005 | Hegarty et al. |
| 2005/0104453 A1 | 5/2005 | Vanderelli et al. |
| 2005/0116650 A1 | 6/2005 | Baarman |
| 2005/0116683 A1 | 6/2005 | Cheng et al. |
| 2005/0122058 A1 | 6/2005 | Baarman et al. |
| 2005/0122059 A1 | 6/2005 | Baarman et al. |
| 2005/0125093 A1 | 6/2005 | Kikuchi et al. |
| 2005/0127849 A1 | 6/2005 | Baarman et al. |
| 2005/0127850 A1 | 6/2005 | Baarman et al. |
| 2005/0127866 A1 | 6/2005 | Hamilton et al. |
| 2005/0135122 A1 | 6/2005 | Cheng et al. |
| 2005/0140482 A1 | 6/2005 | Cheng et al. |
| 2005/0151511 A1 | 7/2005 | Chary |
| 2005/0156560 A1 | 7/2005 | Shimaoka et al. |
| 2005/0189945 A1 | 9/2005 | Reiderman |
| 2005/0194926 A1 | 9/2005 | DiStefano |
| 2005/0253152 A1 | 11/2005 | Klimov et al. |
| 2005/0288739 A1 | 12/2005 | Hassler, Jr. et al. |
| 2005/0288740 A1 | 12/2005 | Hassler, Jr. et al. |
| 2005/0288741 A1 | 12/2005 | Hassler, Jr. et al. |
| 2005/0288742 A1 | 12/2005 | Giordano et al. |
| 2006/0001509 A1 | 1/2006 | Gibbs |
| 2006/0010902 A1 | 1/2006 | Trinh et al. |
| 2006/0022636 A1 | 2/2006 | Xian et al. |
| 2006/0053296 A1 | 3/2006 | Busboom et al. |
| 2006/0061323 A1 | 3/2006 | Cheng et al. |
| 2006/0066443 A1 | 3/2006 | Hall |
| 2006/0090956 A1 | 5/2006 | Peshkovskiy et al. |
| 2006/0132045 A1 | 6/2006 | Baarman |
| 2006/0164866 A1 | 7/2006 | Vanderelli et al. |
| 2006/0181242 A1 | 8/2006 | Freed et al. |
| 2006/0184209 A1 | 8/2006 | John et al. |
| 2006/0184210 A1 | 8/2006 | Singhal et al. |
| 2006/0185809 A1 | 8/2006 | Elfrink et al. |
| 2006/0199620 A1 | 9/2006 | Greene et al. |
| 2006/0202665 A1 | 9/2006 | Hsu |
| 2006/0205381 A1 | 9/2006 | Beart et al. |
| 2006/0214626 A1 | 9/2006 | Nilson et al. |

(56) References Cited

U.S. PATENT DOCUMENTS

| | | |
|---|---|---|
| 2006/0219448 A1 | 10/2006 | Grieve et al. |
| 2006/0238365 A1 | 10/2006 | Vecchione et al. |
| 2006/0270440 A1 | 11/2006 | Shearer et al. |
| 2006/0281435 A1 | 12/2006 | Shearer et al. |
| 2007/0010295 A1 | 1/2007 | Greene et al. |
| 2007/0013483 A1 | 1/2007 | Stewart |
| 2007/0016089 A1 | 1/2007 | Fischell et al. |
| 2007/0021140 A1 | 1/2007 | Keyes, IV et al. |
| 2007/0024246 A1 | 2/2007 | Flaugher |
| 2007/0064406 A1 | 3/2007 | Beart |
| 2007/0069687 A1 | 3/2007 | Suzuki |
| 2007/0096875 A1 | 5/2007 | Waterhouse et al. |
| 2007/0105429 A1 | 5/2007 | Kohl et al. |
| 2007/0117596 A1 | 5/2007 | Greene et al. |
| 2007/0126650 A1 | 6/2007 | Guenther |
| 2007/0145830 A1 | 6/2007 | Lee et al. |
| 2007/0164839 A1 | 7/2007 | Naito |
| 2007/0171681 A1 | 7/2007 | Baarman |
| 2007/0176840 A1 | 8/2007 | Pristas et al. |
| 2007/0178945 A1 | 8/2007 | Cook et al. |
| 2007/0182367 A1 | 8/2007 | Partovi |
| 2007/0208263 A1 | 9/2007 | John et al. |
| 2007/0222542 A1 | 9/2007 | Joannopoulos et al. |
| 2007/0257636 A1 | 11/2007 | Phillips et al. |
| 2007/0267918 A1 | 11/2007 | Gyland |
| 2007/0276538 A1 | 11/2007 | Kjellsson et al. |
| 2008/0012569 A1 | 1/2008 | Hall et al. |
| 2008/0014897 A1 | 1/2008 | Cook et al. |
| 2008/0030415 A1 | 2/2008 | Homan et al. |
| 2008/0036588 A1 | 2/2008 | Iverson et al. |
| 2008/0047727 A1 | 2/2008 | Sexton et al. |
| 2008/0051854 A1 | 2/2008 | Bulkes et al. |
| 2008/0067874 A1 | 3/2008 | Tseng |
| 2008/0074268 A1* | 3/2008 | Shafer ............... G06K 7/0008 340/572.4 |
| 2008/0132909 A1 | 6/2008 | Jascob et al. |
| 2008/0154331 A1 | 6/2008 | John et al. |
| 2008/0176521 A1 | 7/2008 | Singh et al. |
| 2008/0191638 A1 | 8/2008 | Kuennen et al. |
| 2008/0197710 A1 | 8/2008 | Kreitz et al. |
| 2008/0197802 A1 | 8/2008 | Onishi et al. |
| 2008/0211320 A1 | 9/2008 | Cook et al. |
| 2008/0238364 A1 | 10/2008 | Weber et al. |
| 2008/0255901 A1 | 10/2008 | Carroll et al. |
| 2008/0265684 A1 | 10/2008 | Farkas |
| 2008/0266748 A1 | 10/2008 | Lee |
| 2008/0272860 A1 | 11/2008 | Pance |
| 2008/0273242 A1 | 11/2008 | Woodgate et al. |
| 2008/0278264 A1 | 11/2008 | Karalis et al. |
| 2008/0291277 A1 | 11/2008 | Jacobsen et al. |
| 2008/0300657 A1 | 12/2008 | Stultz |
| 2008/0300660 A1 | 12/2008 | John |
| 2009/0010028 A1 | 1/2009 | Baarmen et al. |
| 2009/0015075 A1 | 1/2009 | Cook et al. |
| 2009/0033280 A1 | 2/2009 | Choi et al. |
| 2009/0033564 A1 | 2/2009 | Cook et al. |
| 2009/0038623 A1 | 2/2009 | Farbarik et al. |
| 2009/0045772 A1 | 2/2009 | Cook et al. |
| 2009/0051224 A1 | 2/2009 | Cook et al. |
| 2009/0058189 A1 | 3/2009 | Cook et al. |
| 2009/0058361 A1 | 3/2009 | John |
| 2009/0067198 A1 | 3/2009 | Graham et al. |
| 2009/0072627 A1 | 3/2009 | Cook et al. |
| 2009/0072628 A1 | 3/2009 | Cook et al. |
| 2009/0072629 A1 | 3/2009 | Cook et al. |
| 2009/0072782 A1 | 3/2009 | Randall |
| 2009/0079268 A1 | 3/2009 | Cook et al. |
| 2009/0079387 A1 | 3/2009 | Jin et al. |
| 2009/0085408 A1 | 4/2009 | Bruhn |
| 2009/0085706 A1 | 4/2009 | Baarman et al. |
| 2009/0096413 A1 | 4/2009 | Patovi et al. |
| 2009/0102292 A1 | 4/2009 | Cook et al. |
| 2009/0108679 A1 | 4/2009 | Porwal |
| 2009/0108997 A1 | 4/2009 | Patterson et al. |
| 2009/0115628 A1 | 5/2009 | Dicks et al. |
| 2009/0127937 A1 | 5/2009 | Widmer et al. |
| 2009/0134712 A1 | 5/2009 | Cook et al. |
| 2009/0146892 A1 | 6/2009 | Shimizu et al. |
| 2009/0153273 A1 | 6/2009 | Chen |
| 2009/0160261 A1 | 6/2009 | Elo |
| 2009/0161078 A1 | 6/2009 | Wu et al. |
| 2009/0167449 A1 | 7/2009 | Cook et al. |
| 2009/0174263 A1 | 7/2009 | Baarman et al. |
| 2009/0179502 A1 | 7/2009 | Cook et al. |
| 2009/0188396 A1 | 7/2009 | Hofmann et al. |
| 2009/0189458 A1 | 7/2009 | Kawasaki |
| 2009/0195332 A1 | 8/2009 | Joannopoulos et al. |
| 2009/0195333 A1 | 8/2009 | Joannopoulos et al. |
| 2009/0212636 A1 | 8/2009 | Cook et al. |
| 2009/0213028 A1 | 8/2009 | Cook et al. |
| 2009/0218884 A1 | 9/2009 | Soar |
| 2009/0224608 A1 | 9/2009 | Cook et al. |
| 2009/0224609 A1 | 9/2009 | Cook et al. |
| 2009/0224723 A1 | 9/2009 | Tanabe |
| 2009/0224856 A1 | 9/2009 | Karalis et al. |
| 2009/0230777 A1 | 9/2009 | Baarman et al. |
| 2009/0237194 A1 | 9/2009 | Waffenschmidt et al. |
| 2009/0243394 A1 | 10/2009 | Levine |
| 2009/0243397 A1 | 10/2009 | Cook et al. |
| 2009/0251008 A1 | 10/2009 | Sugaya |
| 2009/0261778 A1 | 10/2009 | Kook |
| 2009/0267558 A1 | 10/2009 | Jung |
| 2009/0267709 A1 | 10/2009 | Joannopoulos et al. |
| 2009/0267710 A1 | 10/2009 | Joannopoulos et al. |
| 2009/0271047 A1 | 10/2009 | Wakamatsu |
| 2009/0271048 A1 | 10/2009 | Wakamatsu |
| 2009/0273242 A1 | 11/2009 | Cook |
| 2009/0273318 A1 | 11/2009 | Rondoni et al. |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284218 A1 | 11/2009 | Mohammadian et al. |
| 2009/0284220 A1 | 11/2009 | Toncich et al. |
| 2009/0284227 A1 | 11/2009 | Mohammadian et al. |
| 2009/0284245 A1 | 11/2009 | Kirby et al. |
| 2009/0284369 A1 | 11/2009 | Toncich et al. |
| 2009/0286470 A1 | 11/2009 | Mohammadian et al. |
| 2009/0286475 A1 | 11/2009 | Toncich et al. |
| 2009/0286476 A1 | 11/2009 | Toncich et al. |
| 2009/0289595 A1 | 11/2009 | Chen et al. |
| 2009/0299918 A1 | 12/2009 | Cook et al. |
| 2009/0308933 A1 | 12/2009 | Osada |
| 2009/0322158 A1 | 12/2009 | Stevens et al. |
| 2009/0322280 A1 | 12/2009 | Kamijo et al. |
| 2010/0015918 A1 | 1/2010 | Liu et al. |
| 2010/0017249 A1 | 1/2010 | Fincham et al. |
| 2010/0033021 A1 | 2/2010 | Bennett |
| 2010/0034238 A1 | 2/2010 | Bennett |
| 2010/0036773 A1 | 2/2010 | Bennett |
| 2010/0038970 A1 | 2/2010 | Cook et al. |
| 2010/0045114 A1 | 2/2010 | Sample et al. |
| 2010/0052431 A1 | 3/2010 | Mita |
| 2010/0052811 A1 | 3/2010 | Smith et al. |
| 2010/0060077 A1 | 3/2010 | Paulus et al. |
| 2010/0065352 A1 | 3/2010 | Ichikawa |
| 2010/0066349 A1 | 3/2010 | Lin et al. |
| 2010/0076524 A1 | 3/2010 | Forsberg et al. |
| 2010/0081379 A1 | 4/2010 | Cooper et al. |
| 2010/0094381 A1 | 4/2010 | Kim et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0104031 A1 | 4/2010 | Lacour |
| 2010/0109443 A1 | 5/2010 | Cook et al. |
| 2010/0109445 A1 | 5/2010 | Kurs et al. |
| 2010/0109604 A1 | 5/2010 | Boys et al. |
| 2010/0115474 A1 | 5/2010 | Takada et al. |
| 2010/0117454 A1 | 5/2010 | Cook et al. |
| 2010/0117455 A1 | 5/2010 | Joannopoulos et al. |
| 2010/0117456 A1 | 5/2010 | Karalis et al. |
| 2010/0117596 A1 | 5/2010 | Cook et al. |
| 2010/0123353 A1 | 5/2010 | Joannopoulos et al. |
| 2010/0123354 A1 | 5/2010 | Joannopoulos et al. |

(56) References Cited

U.S. PATENT DOCUMENTS

| | | |
|---|---|---|
| 2010/0123355 A1 | 5/2010 | Joannopoulos et al. |
| 2010/0123452 A1 | 5/2010 | Amano et al. |
| 2010/0123530 A1 | 5/2010 | Park et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0127660 A1 | 5/2010 | Cook et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0141042 A1 | 6/2010 | Kesler et al. |
| 2010/0148589 A1 | 6/2010 | Hamam et al. |
| 2010/0148723 A1 | 6/2010 | Cook et al. |
| 2010/0151808 A1 | 6/2010 | Toncich et al. |
| 2010/0156346 A1 | 6/2010 | Takada et al. |
| 2010/0156355 A1 | 6/2010 | Bauerle et al. |
| 2010/0156570 A1 | 6/2010 | Hong et al. |
| 2010/0164295 A1 | 7/2010 | Ichikawa et al. |
| 2010/0164296 A1 | 7/2010 | Kurs |
| 2010/0164297 A1 | 7/2010 | Kurs et al. |
| 2010/0164298 A1 | 7/2010 | Karalis et al. |
| 2010/0171368 A1 | 7/2010 | Schatz et al. |
| 2010/0171370 A1 | 7/2010 | Karalis et al. |
| 2010/0179384 A1 | 7/2010 | Hoeg et al. |
| 2010/0181843 A1 | 7/2010 | Schatz et al. |
| 2010/0181844 A1 | 7/2010 | Karalis et al. |
| 2010/0181845 A1 | 7/2010 | Fiorello et al. |
| 2010/0181961 A1 | 7/2010 | Novak et al. |
| 2010/0181964 A1 | 7/2010 | Huggins et al. |
| 2010/0184371 A1 | 7/2010 | Cook et al. |
| 2010/0187911 A1 | 7/2010 | Joannopoulos et al. |
| 2010/0187913 A1 | 7/2010 | Sample |
| 2010/0188183 A1 | 7/2010 | Shpiro |
| 2010/0190435 A1 | 7/2010 | Cook et al. |
| 2010/0190436 A1 | 7/2010 | Cook et al. |
| 2010/0194206 A1 | 8/2010 | Burdo et al. |
| 2010/0194207 A1 | 8/2010 | Graham |
| 2010/0194334 A1 | 8/2010 | Kirby et al. |
| 2010/0194335 A1 | 8/2010 | Kirby et al. |
| 2010/0201189 A1 | 8/2010 | Kirby et al. |
| 2010/0201201 A1 | 8/2010 | Mobarhan et al. |
| 2010/0201202 A1 | 8/2010 | Kirby et al. |
| 2010/0201203 A1 | 8/2010 | Schatz et al. |
| 2010/0201204 A1 | 8/2010 | Sakoda et al. |
| 2010/0201205 A1 | 8/2010 | Karalis et al. |
| 2010/0201310 A1 | 8/2010 | Vorenkamp et al. |
| 2010/0201312 A1 | 8/2010 | Kirby et al. |
| 2010/0201313 A1 | 8/2010 | Vorenkamp et al. |
| 2010/0201316 A1 | 8/2010 | Takada et al. |
| 2010/0201513 A1 | 8/2010 | Vorenkamp et al. |
| 2010/0207458 A1 | 8/2010 | Joannopoulos et al. |
| 2010/0210233 A1 | 8/2010 | Cook et al. |
| 2010/0213770 A1 | 8/2010 | Kikuchi |
| 2010/0213895 A1 | 8/2010 | Keating et al. |
| 2010/0217553 A1 | 8/2010 | Von Novak et al. |
| 2010/0219694 A1 | 9/2010 | Kurs et al. |
| 2010/0219695 A1 | 9/2010 | Komiyanria et al. |
| 2010/0219696 A1 | 9/2010 | Kojima |
| 2010/0222010 A1 | 9/2010 | Ozaki et al. |
| 2010/0225175 A1 | 9/2010 | Karalis et al. |
| 2010/0225270 A1 | 9/2010 | Jacobs et al. |
| 2010/0225271 A1 | 9/2010 | Oyobe et al. |
| 2010/0225272 A1 | 9/2010 | Kirby et al. |
| 2010/0231053 A1 | 9/2010 | Karalis et al. |
| 2010/0231163 A1 | 9/2010 | Mashinsky |
| 2010/0231340 A1 | 9/2010 | Fiorello et al. |
| 2010/0234922 A1 | 9/2010 | Forsell |
| 2010/0235006 A1 | 9/2010 | Brown |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0237709 A1 | 9/2010 | Hall et al. |
| 2010/0244576 A1 | 9/2010 | Hillan et al. |
| 2010/0244577 A1 | 9/2010 | Shimokawa |
| 2010/0244578 A1 | 9/2010 | Yoshikawa |
| 2010/0244579 A1 | 9/2010 | Sogabe et al. |
| 2010/0244580 A1 | 9/2010 | Uchida et al. |
| 2010/0244581 A1 | 9/2010 | Uchida |
| 2010/0244582 A1 | 9/2010 | Yoshikawa |
| 2010/0244583 A1 | 9/2010 | Shimokawa |
| 2010/0244767 A1 | 9/2010 | Turner et al. |
| 2010/0244839 A1 | 9/2010 | Yoshikawa |
| 2010/0248622 A1 | 9/2010 | Kirby et al. |
| 2010/0253152 A1 | 10/2010 | Karalis et al. |
| 2010/0253281 A1 | 10/2010 | Li |
| 2010/0256481 A1 | 10/2010 | Mareci et al. |
| 2010/0256831 A1 | 10/2010 | Abramo et al. |
| 2010/0259108 A1 | 10/2010 | Giler et al. |
| 2010/0259109 A1 | 10/2010 | Sato |
| 2010/0259110 A1 | 10/2010 | Kurs et al. |
| 2010/0264745 A1 | 10/2010 | Karalis et al. |
| 2010/0264746 A1 | 10/2010 | Kazama et al. |
| 2010/0264747 A1 | 10/2010 | Hall et al. |
| 2010/0276995 A1 | 11/2010 | Marzetta et al. |
| 2010/0277003 A1 | 11/2010 | Von Novak et al. |
| 2010/0277004 A1 | 11/2010 | Suzuki et al. |
| 2010/0277005 A1 | 11/2010 | Karalis et al. |
| 2010/0277120 A1 | 11/2010 | Cook et al. |
| 2010/0277121 A1 | 11/2010 | Hall et al. |
| 2010/0289341 A1 | 11/2010 | Ozaki et al. |
| 2010/0289449 A1 | 11/2010 | Elo |
| 2010/0295505 A1 | 11/2010 | Jung et al. |
| 2010/0295506 A1 | 11/2010 | Ichikawa |
| 2010/0308939 A1 | 12/2010 | Kurs |
| 2010/0314946 A1 | 12/2010 | Budde et al. |
| 2010/0327660 A1 | 12/2010 | Karalis et al. |
| 2010/0327661 A1 | 12/2010 | Karalis et al. |
| 2010/0328044 A1 | 12/2010 | Waffenschmidt et al. |
| 2011/0004269 A1 | 1/2011 | Strother et al. |
| 2011/0012431 A1 | 1/2011 | Karalis et al. |
| 2011/0018361 A1 | 1/2011 | Karalis et al. |
| 2011/0025131 A1 | 2/2011 | Karalis et al. |
| 2011/0031928 A1 | 2/2011 | Soar |
| 2011/0043046 A1 | 2/2011 | Joannopoulos et al. |
| 2011/0043047 A1 | 2/2011 | Karalis et al. |
| 2011/0043048 A1 | 2/2011 | Karalis et al. |
| 2011/0043049 A1 | 2/2011 | Karalis et al. |
| 2011/0049995 A1 | 3/2011 | Hashiguchi |
| 2011/0049996 A1 | 3/2011 | Karalis et al. |
| 2011/0049998 A1 | 3/2011 | Karalis et al. |
| 2011/0074218 A1 | 3/2011 | Karalis et al. |
| 2011/0074346 A1 | 3/2011 | Hall et al. |
| 2011/0074347 A1 | 3/2011 | Karalis et al. |
| 2011/0089895 A1 | 4/2011 | Karalis et al. |
| 2011/0095618 A1 | 4/2011 | Schatz et al. |
| 2011/0115303 A1 | 5/2011 | Baarman et al. |
| 2011/0115431 A1 | 5/2011 | Dunworth et al. |
| 2011/0121920 A1 | 5/2011 | Kurs et al. |
| 2011/0128015 A1 | 6/2011 | Dorairaj et al. |
| 2011/0140544 A1 | 6/2011 | Karalis et al. |
| 2011/0148219 A1 | 6/2011 | Karalis et al. |
| 2011/0162895 A1 | 7/2011 | Karalis et al. |
| 2011/0169339 A1 | 7/2011 | Karalis et al. |
| 2011/0181122 A1 | 7/2011 | Karalis et al. |
| 2011/0193416 A1 | 8/2011 | Campanella et al. |
| 2011/0193419 A1 | 8/2011 | Karalis et al. |
| 2011/0198939 A1 | 8/2011 | Karalis et al. |
| 2011/0215086 A1 | 9/2011 | Yeh |
| 2011/0221278 A1 | 9/2011 | Karalis et al. |
| 2011/0227528 A1 | 9/2011 | Karalis et al. |
| 2011/0227530 A1 | 9/2011 | Karalis et al. |
| 2011/0241618 A1 | 10/2011 | Karalis et al. |
| 2011/0248573 A1 | 10/2011 | Kanno et al. |
| 2011/0254377 A1 | 10/2011 | Wildmer et al. |
| 2011/0254503 A1 | 10/2011 | Widmer et al. |
| 2011/0266878 A9 | 11/2011 | Cook et al. |
| 2011/0278943 A1 | 11/2011 | Eckhoff et al. |
| 2012/0001492 A9 | 1/2012 | Cook et al. |
| 2012/0001593 A1 | 1/2012 | DiGuardo |
| 2012/0007435 A1 | 1/2012 | Sada et al. |
| 2012/0007441 A1 | 1/2012 | John et al. |
| 2012/0025602 A1 | 2/2012 | Boys et al. |
| 2012/0032522 A1 | 2/2012 | Schatz et al. |
| 2012/0038525 A1 | 2/2012 | Monsalve Carcelen et al. |

(56) References Cited

U.S. PATENT DOCUMENTS

| | | |
|---|---|---|
| 2012/0062345 A1 | 3/2012 | Kurs et al. |
| 2012/0068549 A1 | 3/2012 | Karalis et al. |
| 2012/0086284 A1 | 4/2012 | Campanella et al. |
| 2012/0086867 A1 | 4/2012 | Kesler et al. |
| 2012/0091794 A1 | 4/2012 | Campanella et al. |
| 2012/0091795 A1 | 4/2012 | Fiorello et al. |
| 2012/0091796 A1 | 4/2012 | Kesler et al. |
| 2012/0091797 A1 | 4/2012 | Kesler et al. |
| 2012/0091819 A1 | 4/2012 | Kulikowski et al. |
| 2012/0091820 A1 | 4/2012 | Campanella et al. |
| 2012/0091949 A1 | 4/2012 | Campanella et al. |
| 2012/0091950 A1 | 4/2012 | Campanella et al. |
| 2012/0098350 A1 | 4/2012 | Campanella et al. |
| 2012/0112531 A1 | 5/2012 | Kesler et al. |
| 2012/0112532 A1 | 5/2012 | Kesler et al. |
| 2012/0112534 A1 | 5/2012 | Kesler et al. |
| 2012/0112535 A1 | 5/2012 | Karalis et al. |
| 2012/0112536 A1 | 5/2012 | Karalis et al. |
| 2012/0112538 A1 | 5/2012 | Kesler et al. |
| 2012/0112691 A1 | 5/2012 | Kurs et al. |
| 2012/0119569 A1 | 5/2012 | Karalis et al. |
| 2012/0119575 A1 | 5/2012 | Kurs et al. |
| 2012/0119576 A1 | 5/2012 | Kesler et al. |
| 2012/0119698 A1 | 5/2012 | Karalis et al. |
| 2012/0139355 A1 | 6/2012 | Ganem et al. |
| 2012/0146575 A1 | 6/2012 | Armstrong et al. |
| 2012/0153732 A1 | 6/2012 | Kurs et al. |
| 2012/0153733 A1 | 6/2012 | Schatz et al. |
| 2012/0153734 A1 | 6/2012 | Kurs et al. |
| 2012/0153735 A1 | 6/2012 | Karalis et al. |
| 2012/0153736 A1 | 6/2012 | Karalis et al. |
| 2012/0153737 A1 | 6/2012 | Karalis et al. |
| 2012/0153738 A1 | 6/2012 | Karalis et al. |
| 2012/0153893 A1 | 6/2012 | Schatz et al. |
| 2012/0184338 A1 | 7/2012 | Kesler et al. |
| 2012/0206096 A1 | 8/2012 | John |
| 2012/0223573 A1 | 9/2012 | Schatz et al. |
| 2012/0228952 A1 | 9/2012 | Hall et al. |
| 2012/0228953 A1 | 9/2012 | Kesler et al. |
| 2012/0228954 A1 | 9/2012 | Kesler et al. |
| 2012/0235500 A1 | 9/2012 | Ganem et al. |
| 2012/0235501 A1 | 9/2012 | Kesler et al. |
| 2012/0235502 A1 | 9/2012 | Kesler et al. |
| 2012/0235503 A1 | 9/2012 | Kesler et al. |
| 2012/0235504 A1 | 9/2012 | Kesler et al. |
| 2012/0235505 A1 | 9/2012 | Schatz et al. |
| 2012/0235566 A1 | 9/2012 | Karalis et al. |
| 2012/0235567 A1 | 9/2012 | Karalis et al. |
| 2012/0235633 A1 | 9/2012 | Kesler et al. |
| 2012/0235634 A1 | 9/2012 | Hall et al. |
| 2012/0239117 A1 | 9/2012 | Kesler et al. |
| 2012/0242159 A1 | 9/2012 | Lou et al. |
| 2012/0242225 A1 | 9/2012 | Karalis et al. |
| 2012/0248884 A1 | 10/2012 | Karalis et al. |
| 2012/0248886 A1 | 10/2012 | Kesler et al. |
| 2012/0248887 A1 | 10/2012 | Kesler et al. |
| 2012/0248888 A1 | 10/2012 | Kesler et al. |
| 2012/0248891 A1* | 10/2012 | Drennen ............... H02J 7/025 307/104 |
| 2012/0248981 A1 | 10/2012 | Karalis et al. |
| 2012/0256494 A1 | 10/2012 | Kesler et al. |
| 2012/0267960 A1 | 10/2012 | Low et al. |
| 2012/0280765 A1 | 11/2012 | Kurs et al. |
| 2012/0313449 A1 | 12/2012 | Kurs et al. |
| 2012/0313742 A1 | 12/2012 | Kurs et al. |
| 2013/0007949 A1 | 1/2013 | Kurs et al. |
| 2013/0020878 A1 | 1/2013 | Karalis et al. |
| 2013/0033118 A1 | 2/2013 | Karalis et al. |
| 2013/0038402 A1 | 2/2013 | Karalis et al. |
| 2013/0057364 A1 | 3/2013 | Kesler et al. |
| 2013/0062959 A1* | 3/2013 | Lee ..................... H04B 5/0031 307/104 |
| 2013/0062966 A1 | 3/2013 | Verghese et al. |
| 2013/0069441 A1 | 3/2013 | Verghese et al. |
| 2013/0069753 A1 | 3/2013 | Kurs et al. |
| 2013/0099587 A1 | 4/2013 | Lou et al. |
| 2013/0154383 A1 | 6/2013 | Kasturi et al. |
| 2013/0154389 A1 | 6/2013 | Kurs et al. |
| 2013/0159956 A1 | 6/2013 | Verghese et al. |
| 2013/0175874 A1 | 7/2013 | Lou et al. |
| 2013/0175875 A1 | 7/2013 | Kurs et al. |
| 2013/0200716 A1 | 8/2013 | Kesler et al. |
| 2013/0200721 A1 | 8/2013 | Kurs et al. |
| 2013/0221744 A1 | 8/2013 | Hall et al. |
| 2013/0278073 A1 | 10/2013 | Kurs et al. |
| 2013/0278074 A1 | 10/2013 | Kurs et al. |
| 2013/0278075 A1 | 10/2013 | Kurs et al. |
| 2013/0300353 A1 | 11/2013 | Kurs et al. |
| 2013/0307349 A1 | 11/2013 | Hall et al. |
| 2013/0320773 A1 | 12/2013 | Schatz et al. |
| 2013/0334892 A1 | 12/2013 | Hall et al. |
| 2014/0002012 A1 | 1/2014 | McCauley et al. |
| 2014/0070764 A1 | 3/2014 | Keeling |
| 2016/0226311 A1 | 8/2016 | Kanno |

FOREIGN PATENT DOCUMENTS

| | | |
|---|---|---|
| CN | 102439669 | 5/2012 |
| CN | 103329397 | 9/2013 |
| DE | 38 24 972 | 1/1989 |
| DE | 100 29147 | 12/2001 |
| DE | 200 16 655 | 3/2002 |
| DE | 102 21 484 | 11/2003 |
| DE | 103 04 584 | 8/2004 |
| DE | 10 2005 036290 | 2/2007 |
| DE | 10 2006 044057 | 4/2008 |
| EP | 1 335 477 | 8/2003 |
| EP | 1 521 206 | 4/2005 |
| EP | 1 524 010 | 4/2005 |
| EP | 2 357 716 | 8/2011 |
| JP | 02-097005 | 4/1990 |
| JP | 4-265875 | 9/1992 |
| JP | 6-341410 | 12/1994 |
| JP | 9-182323 | 7/1997 |
| JP | 9-298847 | 11/1997 |
| JP | 10-164837 | 6/1998 |
| JP | 11-75329 | 3/1999 |
| JP | 11-188113 | 7/1999 |
| JP | 2001-309580 | 11/2001 |
| JP | 2002-010535 | 1/2002 |
| JP | 2003-179526 | 6/2003 |
| JP | 2004-166459 | 6/2004 |
| JP | 2004-201458 | 7/2004 |
| JP | 2004-229144 | 8/2004 |
| JP | 2005-57444 | 3/2005 |
| JP | 2005-149238 | 6/2005 |
| JP | 2006-074848 | 3/2006 |
| JP | 2007-505480 | 3/2007 |
| JP | 2007-266892 | 10/2007 |
| JP | 2007-537637 | 12/2007 |
| JP | 2008-508842 | 3/2008 |
| JP | 2008-206231 | 9/2008 |
| JP | 2008-206327 | 9/2008 |
| JP | 2011-072074 | 4/2011 |
| JP | 2012-504387 | 2/2012 |
| JP | 2013-543718 | 12/2013 |
| KR | 10-2007-0017804 | 2/2007 |
| KR | 10-2008-0007635 | 1/2008 |
| KR | 10-2009-0122072 | 11/2009 |
| KR | 10-2011-0050920 | 5/2011 |
| SG | 112842 | 7/2005 |
| WO | WO 92/17929 | 10/1992 |
| WO | WO 93/23908 | 11/1993 |
| WO | WO 94/28560 | 12/1994 |
| WO | WO 95/11545 | 4/1995 |
| WO | WO 96/02970 | 2/1996 |
| WO | WO 98/50993 | 11/1998 |
| WO | WO 00/77910 | 12/2000 |
| WO | WO 03/092329 | 11/2003 |
| WO | WO 03/096361 | 11/2003 |
| WO | WO 03/096512 | 11/2003 |
| WO | WO 2004/015885 | 2/2004 |
| WO | WO 2004/038888 | 5/2004 |
| WO | WO 2004/055654 | 7/2004 |

(56) References Cited

FOREIGN PATENT DOCUMENTS

| | | | |
|---|---|---|---|
| WO | WO 2004/073150 | 8/2004 | |
| WO | WO 2004/073166 | 8/2004 | |
| WO | WO 2004/073176 | 8/2004 | |
| WO | WO 2004/073177 | 8/2004 | |
| WO | WO 2004/112216 | 12/2004 | |
| WO | WO 2005/024865 | 3/2005 | |
| WO | WO 2005/060068 | 6/2005 | |
| WO | WO 2005/109597 | 11/2005 | |
| WO | WO 2005/109598 | 11/2005 | |
| WO | WO 2006/011769 | 2/2006 | |
| WO | WO 2007/008646 | 1/2007 | |
| WO | WO 2007/020583 | 2/2007 | |
| WO | WO 2007/042952 | 4/2007 | |
| WO | WO 2007/084716 | 7/2007 | |
| WO | WO 2007/084717 | 7/2007 | |
| WO | WO 2008/109489 | 9/2008 | |
| WO | WO 2008/118178 | 10/2008 | |
| WO | WO 2009/009559 | 1/2009 | |
| WO | WO 2009/018568 | 2/2009 | |
| WO | WO 2009/023155 | 2/2009 | |
| WO | WO 2009/023646 | 2/2009 | |
| WO | WO 2009/033043 | 3/2009 | |
| WO | WO 2009/062438 | 5/2009 | |
| WO | WO 2009/070730 | 6/2009 | |
| WO | WO 2009/126963 | 10/2009 | |
| WO | WO 2009/140506 | 11/2009 | |
| WO | WO 2009/149464 | 12/2009 | |
| WO | WO 2009/155000 | 12/2009 | |
| WO | WO 2010/030977 | 3/2010 | |
| WO | WO 2010/036980 | 4/2010 | |
| WO | WO 2010/039967 | 4/2010 | |
| WO | WO 2010/090538 | 8/2010 | |
| WO | WO 2010/090539 | 8/2010 | |
| WO | WO 2010/093997 | 8/2010 | |
| WO | WO 2010/104569 | 9/2010 | |
| WO | WO 2011/061388 | 5/2011 | |
| WO | WO 2011/061821 | 5/2011 | |
| WO | WO 2011/062827 | 5/2011 | |
| WO | WO 2011/112795 | 9/2011 | |
| WO | WO 2012/037279 | 3/2012 | |
| WO | WO 2012/170278 | 12/2012 | |
| WO | WO 2013/013235 | 1/2013 | |
| WO | WO 2013/020138 | 2/2013 | |
| WO | WO 2013/036947 | 3/2013 | |
| WO | WO 2013/059441 | 4/2013 | |
| WO | WO 2013/067484 | 5/2013 | |
| WO | WO 2013/113017 | 8/2013 | |
| WO | WO 2013/142840 | 9/2013 | |
| WO | WO 2014/004843 | 1/2014 | |
| WO | WO 2014/148315 | 9/2014 | ............ H02J 17/00 |

OTHER PUBLICATIONS

"Intel CTO Says Gap between Humans, Machines Will Close by 2050", Intel News Release, (See intel.com/.../20080821comp.htm?iid=S . . . ) (Printed Nov. 6, 2009).

"Physics Update, Unwired Energy", Physics Today, pp. 26, (Jan. 2007) (See http://arxiv.org/abs/physics/0611063.).

"In pictures: A year in technology", BBC News, (Dec. 28, 2007).

"Next Little Thing 2010 Electricity without wires", CNN Money (See money.cnn.com/galleries/2009/smallbusiness/0911/gallery.next_little_thing_2010. smb/) (dated Nov. 30, 2009).

Abe et al. "A Noncontact Charger Using a Resonant Converter with Parallel Capacitor of the Secondary Coil". IEEE, 36(2):444-451, Mar./Apr. 2000.

Ahmadian, M. et al., "Miniature Transmitter for Implantable Micro Systems", Proceedings of the 25th Annual International Conference of the IEEE EMBS Cancun, Mexico, pp. 3028-3031 (Sep. 17-21, 2003).

Aoki, T. et al., "Observation of strong coupling between one atom and a monolithic microresonator", Nature, vol. 443:671-674 (2006).

Apneseth et al. "Introducing wireless proximity switches" ABB Review Apr. 2002.

Aristeidis Karalis et al., "Efficient Wireless non-radiative mid-range energy transfer", Annals of Physics, vol. 323, pp. 34-48 (2008).

Baker et al., "Feedback Analysis and Design of RF Power Links for Low-Power Bionic Systems," IEEE Transactions on Biomedical Circuits and Systems, vol. 1(1):28-38 (Mar. 2007).

Balanis, C.A., "Antenna Theory: Analysis and Design," 3rd Edition, Sections 4.2, 4.3, 5.2, 5.3 (Wiley, New Jersey, 2005).

Berardelli, P., "Outlets Are Out", ScienceNOW Daily News, Science Now, http://sciencenow.sciencemag.org/ cgi/content/full/2006/1114/2, (Nov. 14, 2006) 2 pages.

Biever, C., "Evanescent coupling' could power gadgets wirelessly", NewScientistsTech.com, http://www. newscientisttech.com/article.ns?id=dn1 0575&print=true, (Nov. 15, 2006) 2 pages.

Borenstein, S., "Man tries wirelessly boosting batteries", (The Associated Press), USA Today, (Nov. 16, 2006) 1 page.

Borenstein, S., "Man tries wirelessly boosting batteries", AP Science Writer, Boston.com, (See http://www.boston.com/business/technology/articles/2006/11/15/man_tries_wirelessly_b . . . ) (Nov. 15, 2006).

Boyle, A., "Electro-nirvana? Not so fast", MSNBC, http:/lcosmiclog.msnbc.msn.com/_news/2007/06/08/4350760- electro-nirvana-not-so-fast, (Jun. 8, 2007) 1 page.

Budhia, M. et al., "A New IPT Magnetic Coupler for Electric Vehicle Charging Systems", IECON 2010—36th Annual Conference on IEEE Industrial Electronics Society, Glendale, AZ, pp. 2487-2492 (Nov. 7-10, 2010).

Budhia, M. et al., "Development and evaluation of single sided flux couplers for contactless electric vehicle charging", 2011 IEEE Energy Conversion Congress and Exposition (ECCE), Phoenix, AZ, pp. 614-621 (Sep. 17-22, 2011).

Budhia, M. et al.,"Development of a Single-Sided Flux Magnetic Coupler for Electric Vehicle IPT", IEEE Transactions on Industrial Electronics, vol. 60:318-328 (Jan. 2013).

Bulkeley, W. M., "MIT Scientists Pave the Way for Wireless Battery Charging", The Wall Street Journal (See http://online.wsj.com/article/SB118123955549228045.html?mod=googlenews_wsj), (Jun. 8, 2007) 2 pages.

Burri et al., "Invention Description", (Feb. 5, 2008).

Cass, S., "Air Power—Wireless data connections are common—now scientists are working on wireless power", Sponsored by IEEE Spectrum, http://spectrum.ieee.org/computing/hardware/air-power, (Nov. 2006) 2 pages.

Castelvecchi, Davide, "The Power of Induction—Cutting the last cord could resonate with our increasingly gadget dependent lives", Science News Online, vol. 172, No. 3, Jul. 21, 2007, 6 pages.

Chang, A., "Recharging the Wireless Way—Even physicists forget to recharge their cell phones sometimes.", PC Magazine, ABC News Internet Ventures, (Dec. 12, 2006) 1 page.

Chinaview"Scientists light bulb with 'wireless electricity' ",www.Chinaview.cn, http://news.xinhuanet.com/english/2007-06/08/content_6215681.htm,Jun. 2007,1 page.

Cooks, G., "The vision of an MIT physicist: Getting rid of pesky rechargers", Boston.com, (Dec. 11, 2006) 1 page.

Derbyshire, D., "The end of the plug? Scientists invent wireless device that beams electricity through your home", Daily Mail, http://www.dailymail.co.uk/pages/live/articles/technology/technology.html?in_article_id=4 . . . ), (Jun. 7, 2007) 3 pages.

Eisenberg, Anne, "Automatic Recharging, From a Distance", The New York Times, (see www.nytimes.com/2012/03/11/businessibuilt-in-wireless-chargeing-for-electronic-devices.html?_r=0) (published on Mar. 10, 2012).

Esser et al., "A New Approach to Power Supplies for Robots", IEEE, vol. 27(5):872-875, (Sep./Oct. 1991).

Fan, Shanhui et al., "Rate-Equation Analysis of Output Efficiency and Modulation Rate of Photomic-Crystal Light-Emitting Diodes", IEEE Journal of Quantum Electronics, vol. 36(10):1123-1130 (Oct. 2000).

Fenske et al., "Dielectric Materials at Microwave Frequencies", Applied Microwave & Wireless, pp. 92-100 (2000).

Fernandez, C. et al., "A simple dc-dc converter for the power supply of a cochlear implant", IEEE, pp. 1965-1970 (2003).

(56) References Cited

OTHER PUBLICATIONS

Ferris, David, "How Wireless Charging Will Make Life Simpler (And Greener)", Forbes (See forbes.com/sites/davidferris/2012/07/24/how-wireless-charging-will-make-life-simpler-and-greener/print/) (dated Jul. 24, 2012).
Fildes, J., "Physics Promises Wireless Power", (Science and Technology Reporter), BBC News, (Nov. 15, 2006) 3 pages.
Fildes, J., "The technology with impact 2007", BBC News, (Dec. 27, 2007) 3 pages.
Fildes, J., "Wireless energy promise powers up", BBC News, http://news.bbc.co.uk/2/hi/technology/6725955.stm, (Jun. 7, 2007) 3 pages.
Finkenzeller, Klaus, "RFID Handbook—Fundamentals and Applications in Contactless Smart Cards", Nikkan Kohgyo-sya, Kanno Taihei, first version, pp. 32-37, 253 (Aug. 21, 2001).
Finkenzeller, Klaus, "RFID Handbook (2nd Edition)", The Nikkan Kogyo Shimbun, Ltd., pp. 19, 20, 38, 39, 43, 44, 62, 63, 67, 68, 87, 88, 291, 292 (Published on May 31, 2004).
Freedman, D.H., "Power on a Chip", MIT Technology Review, (Nov. 2004).
Gary Peterson, "MIT WiTricity Not So Original After All", *Feed Line No. 9*, (See http://www.tfcbooks.com/articles/witricity.htm) printed Nov. 12, 2009.
Geyi, Wen, "A Method for the Evaluation of Small Antenna Q", IEEE Transactions on Antennas and Propagation, vol. 51(8):2124-2129 (Aug. 2003).
Hadley, F., "Goodbye Wires—MIT Team Experimentally Demonstrates Wireless Power Transfer, Potentially Useful for Power Laptops, Cell-Phones Without Cords", Massachusetts Institute of Technology, Institute for Soldier D Nanotechnologies, http://web.mit.edu/newsoffice/2007/wireless-0607.html, (Jun. 7, 2007) 3 pages.
Haus, H.A., "Waves and Fields in Optoelectronics," Chapter 7 "Coupling of Modes—Reasonators and Couplers" (Prentice-Hall, New Jersey, 1984).
Heikkinen et al., "Performance and Efficiency of Planar Rectennas for Short-Range Wireless Power Transfer at 2.45 GHz", Microwave and Optical Technology Letters, vol. 31(2):86-91, (Oct. 20, 2001).
Highfield, R., "Wireless revolution could spell end of plugs-",(Science Editor), Telegraph.co.uk, http://www.telegraph.co.uk/news/main.jhtml?xml=/news/2007/06/07/nwirelessl 07.xml, (Jun. 7, 2007) 3 pages.
Hirai et al., "Integral Motor with Driver and Wireless Transmission of Power and Information for Autonomous Subspindle Drive", IEEE, vol. 15(1):13-20, (Jan. 2000).
Hirai et al., "Practical Study on Wireless Transmission of Power and Information for Autonomous Decentralized Manufacturing System", IEEE, vol. 46(2):349-359, Apr. 1999.
Hirai et al., "Study on Intelligent Battery Charging Using Inductive Transmission of Power and Information", IEEE, vol. 15(2):335-345, (Mar. 2000).
Hirai et al., "Wireless Transmission of Power and Information and Information for Cableless Linear Motor Drive", IEEE, vol. 15(1):21-27, (Jan. 2000).
Hirayama, M., "Splashpower—World Leaders in Wireless Power", PowerPoint presentation, Splashpower Japan, (Sep. 3, 2007) 30 pages.
Ho, S. L. et al., "A Comparative Study Between Novel Witricity and Traditional Inductive Magnetic Coupling in Wireless Charging", IEEE Transactions on Magnetics, vol. 47(5):1522-1525 (May 2011).
InfoTech Online, "Recharging gadgets without cables", infotech.indiatimes.com, (Nov. 17, 2006) 1 page.
Jackson, J. D., "Classical Electrodynamics", 3rd Edition, Wiley, New York, 1999, pp. 201-203.
Jackson, J.D., "Classical Electrodynamics," 3rd Edition, Sections 1.11, 5.5, 5.17, 6.9, 8.1, 8.8, 9.2, 9.3 (Wiley, New York, 1999).
Jacob, M. V. et al., "Lithium Tantalate—A High Permittivity Dielectric Material for Microwave Communication Systems", *Proceedings of IEEE TENCON—Poster Papers*, pp. 1362-1366, 2003.
Karalis, Aristeidis, "Electricity Unplugged", Feature: Wireless Energy Physics World, physicsworld.com, pp. 23-25 (Feb. 2009).
Kawamura et al., "Wireless Transmission of Power and Information Through One High-Frequency Resonant AC Link Inverter for Robot Manipulator Applications", IEEE, vol. 32(3):503-508, (May/Jun. 1996).
Kurs, A. et al., "Wireless Power Transfer via Strongly Coupled Magnetic Resonances", *Science* vol. 317, pp. 83-86 (Jul. 6, 2007).
Kurs, A. et al., "Simultaneous mid-range power transfer to multiple devices", *Applied Physics Letters*, vol. 96, No. 044102 (2010).
Kurs, A. et al.,"Optimized design of a low-resistance electrical conductor for the multimegahertz range", *Applied Physics Letters*, vol. 98:172504-172504-3 (Apr. 2011).
Lamb, Gregory M. ,"Look Ma—no wires!—Electricity broadcast through the air may someday run your home",The Christian Science Monitor,http://www.csmonitor.com/2006/1116/p14s01-stct.html,Nov. 15, 2006,2 pages.
Lee, "Antenna Circuit Design for RFID Applications," Microchip Technology Inc., AN710, 50 pages (2003).
Lee, "RFID Coil Design," Microchip Technology Inc., AN678, 21 pages (1998).
Liang et al., "Silicon waveguide two-photon absorption detector at 1.5 μm wavelength for autocorrelation measurements," Applied Physics Letters, 81(7):1323-1325 (Aug. 12, 2002).
Markoff, J. ,"Intel Moves to Free Gadgets of Their Recharging Cords", The New York Times—nytimes.com, Aug. 21, 2008, 2 pages.
Median, A. et al. "Design of class E amplifier with nonlinear and linear shunt capacitances for any duty cycle", IEEE Trans. Microwave Theor. Tech., vol. 55, No. 3, pp. 484-492, (2007).
Microchip Technology Inc., "microID 13.56 MHz Design Guide—MCRF355/360 Reader Reference Design," 24 pages (2001).
Minkel, J R. ,"Wireless Energy Lights Bulb from Seven Feet Away—Physicists vow to cut the cord between your laptop battery and the wall socket—with just a simple loop of wire",Scientific American,http://www.scientificamerican.com/article.cfm?id=wireless-energy-lights-bulb-from-seven-feet-away,Jun. 7, 2007,1 page.
Minkel, J R. ,"Wireless Energy Transfer May Power Devices at a Distance",Scientific American,Nov. 14, 2006,1 page.
Morgan, J., "Lab report: Pull the plug for a positive charge", The Herald, Web Issue 2680, (Nov. 16, 2006) 3 pages.
Moskvitch, Katia, "Wireless charging—the future for electric cars? ", BBC News Technology (See www.bbc.co.uk/news/technology-14183409) (dated Jul. 21, 2011).
O'Brien et al., "Analysis of Wireless Power Supplies for Industrial Automation Systems", IEEE, pp. 367-372 (Nov. 2-6, 2003).
O'Brien et al., "Design of Large Air-Gap Transformers for Wireless Power Supplies", IEEE, pp. 1557-1562 (Jun. 15-19, 2003).
Pendry, J. B., "A Chiral Route to Negative Refraction", Science, vol. 306:1353-1355 (2004).
Physics Today, "Unwired energy questions asked answered", Sep. 2007, pp. 16-17.
Powercast LLC. "White Paper" Powercast simply wire free, 2003.
PR News Wire, "The Big Story for CES 2007: The public debut of eCoupled Intelligent Wireless Power", Press Release, Fulton Innovation LLC, Las Vegas, NV, (Dec. 27, 2006) 3 pages.
Press Release, "The world's first sheet-type wireless power transmission system: Will a socket be replaced by e-wall?",Public Relations Office, School of Engineering, University of Tokyo, Japan,Dec. 12, 2006,4 pages.
PressTV, "Wireless power transfer possible", http://edition.presstv.ir/detail/12754.html, Jun. 11, 2007, 1 page.
Reidy, C. (Globe Staff), "MIT discovery could unplug your iPod forever", Boston.com, http://www.boston.com/business/ticker/2007/06/mit_discoverry_c.html, (Jun. 7, 2007) 3 pages.
Risen, C., "Wireless Energy", The New York Times, (Dec. 9, 2007) 1 page.
Sakamoto et al., "A Novel Circuit for Non-Contact Charging Through Electro-Magnetic Coupling", IEEE, pp. 168-174 (1992).
Scheible, G. et al., "Novel Wireless Power Supply System for Wireless Communication Devices in Industrial Automation Systems", IEEE, pp. 1358-1363, (Nov. 5-8, 2002).
Schneider, D. "A Critical Look at Wireless Power", *IEEE Spectrum*, pp. 35-39 (May 2010).

(56) References Cited

OTHER PUBLICATIONS

Schneider, David, "Electrons Unplugged. Wireless power at a distance is still far away", *IEEE Spectrum*, pp. 35-39 (May 2010).
Schuder, J. C. et al., "An Inductively Coupled RF System for the Transmission of 1 kW of Power Through the Skin", *IEEE Transactions on Bio-Medical Engineering*, vol. BME-18, No. 4, pp. 265-273 (Jul. 1971).
Schuder, J. C., "Powering an Artificial Heart: Birth of the Inductively Coupled-Radio Frequency System in 1960", *Artificial Organs*, vol. 26:909-915 (2002).
Schuder, J.C. et al., "Energy Transport Into the Closed Chest From a Set of Very-Large Mutually Orthogonal Coils", Communication Electronics, vol. 64:527-534 (Jan. 1963).
Schutz, J. et al., "Load Adaptive Medium Frequency Resonant Power Supply", IEEE, pp. 282-287 (Nov. 2002).
Sekitani et al. "A large-area wireless power-transmission sheet using printed organic transistors and plastic MEMS switches" www.nature.com/naturematerials. Published online Apr. 29, 2007.
Sekitani et al., "A large-area flexible wireless power transmission sheet using printed plastic MEMS switches and organic field-effect transistors", IEDM '06, International Electron Devices Meeting, (Dec. 11-13, 2006) 4 pages.
Sekiya, H. et al., "FM/PWM control scheme in class DE inverter", IEEE Trans. Circuits Syst. I, vol. 51(7) (Jul. 2004).
Senge, M., "MIT's wireless electricity for mobile phones", Vanguard, http://www.vanguardngr.com/articles/2002/features/gsm/gsm211062007.htm, (Jun. 11, 2007) 1 page.
Sensiper, S., "Electromagnetic wave propogation on helical conductors", Technical Report No. 194 (based on PhD Thesis), Massachusetts Institute of Technology, (May 16, 1951) 126 pages.
Soljacic, M., "Wireless Non-Radiative Energy Transfer—PowerPoint presentation". Massachusetts Institute of Technology, (Oct. 6, 2005).
Soljacic, M. et al., "Wireless Energy Transfer Can Potentially Recharge Laptops Cell Phones Without Cords", (Nov. 14, 2006) 3 pages.
Soljacic, M. et al., "Photonic-crystal slow-light enhancement of nonlinear phase sensitivity", *J. Opt. Soc. Am B*, vol. 19, No. 9, pp. 2052-2059 (Sep. 2002).
Soljacic, M., "Wireless nonradiative energy transfer", *Visions of Discovery New Light on Physics, Cosmology, and Consciousness*, Cambridge University Press, New York, NY pp. 530-542 (2011).
Someya, Takao. "The world's first sheet-type wireless power transmission system". University of Tokyo, (Dec. 12, 2006).
Staelin, David H. et al., Electromagnetic Waves, Chapters 2, 3, 4, and 8, pp. 46-176 and 336-405 (Prentice Hall Upper Saddle River, New Jersey 1998).
Stark III, Joseph C., "Wireless Power Transmission Utilizing a Phased Array of Tesla Coils", Master Thesis, Massachusetts Institute of Technology (2004).
Stewart, W., "The Power to Set you Free", Science, vol. 317:55-56 (Jul. 6, 2007).
Tang, S.C. et al., "Evaluation of the Shielding Effects on Printed-Circuit-Board Transformers Using Ferrite Plates and Copper Sheets", *IEEE Transactions on Power Electronics*, vol. 17:1080-1088 (Nov. 2002).
Tesla, Nikola, "High Frequency Oscillators for Electro-Therapeutic and Other Purposes", *Proceedings of the IEEE*, vol. 87:1282-1292 (Jul. 1999).
Tesla, Nikola, "High Frequency Oscillators for Electro-Therapeutic and Other Purposes", *The Electrical Engineer*, vol. XXVI, No. 50 (Nov. 17, 1898).
Texas Instruments, "HF Antenna Design Notes—Technical Application Report," Literature No. 11-08-26-003, 47 pages (Sep. 2003).
Thomsen et al., "Ultrahigh speed all-optical demultiplexing based on two-photon absorption in a laser diode," Electronics Letters, 34(19):1871-1872 (Sep. 17, 1998).
UPM Rafsec, "Tutorial overview of inductively coupled RFID Systems," 7 pages (May 2003).
Valtchev et al. "Efficient Resonant Inductive Coupling Energy Transfer Using New Magnetic and Design Criteria". IEEE, pp. 1293-1298, 2005.
Vandevoorde et al., "Wireless energy transfer for stand-alone systems: a comparison between low and high power applicability", Sensors and Actuators, vol. 92:305-311 (2001).
Vilkomerson, David et al., "Implantable Doppler System for Self-Monitoring Vascular Grafts", *IEEE Ultrasonics Symposium*, pp. 461-465 (2004).
Villeneuve, Pierre R. et al., "Microcavities in photonic crystals: Mode symmetry, tunability, and coupling efficiency", *Physical Review B*, vol. 54:7837-7842 (Sep. 15, 1996).
Yariv, Amnon et al., "Coupled-resonator optical waveguide: a proposal and analysis", *Optics Letters*, vol. 24(11):711-713 (Jun. 1, 1999).
Yates, David C. et al., "Optimal Transmission Frequency for Ultralow-Power Short-Range Radio Links", IEEE Transactions on Circuits and Systems—1, Regular Papers, vol. 51:1405-1413 (Jul. 2004).
Yoshihiro Konishi, *Microwave Electronic Circuit Technology*, Chapter 4, pp. 145-197 (Marcel.Dekker, Inc., New York, NY 1998).
Ziaie, Babak et al., "A Low-Power Miniature Transmitter Using a Low-Loss Silicon Platform for Biotelemetry", *Proceedings—19th International Conference IEEE/EMBS*, pp. 2221-2224, (Oct. 30-Nov. 2, 1997) 4 pages.
Zierhofer, Clemens M. et al., "High-Efficiency Coupling-Insensitive Transcutaneous Power and Data Transmission Via an Inductive Link", *IEEE Transactions on Biomedical Engineering*, vol. 37, No. 7, pp. 716-722 (Jul. 1990).
International Search Report and the Written Opinion of the International Searching Authority for International Application No. PCT/US2016/055790 dated Jan. 3, 2017.
International Preliminary Report on Patentability for International Application No. PCT/US2016/055790 dated Apr. 19, 2018 (8 pages).

\* cited by examiner

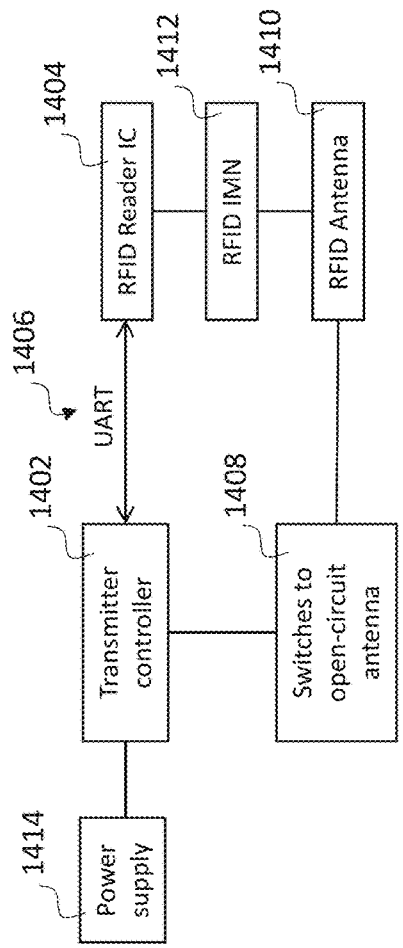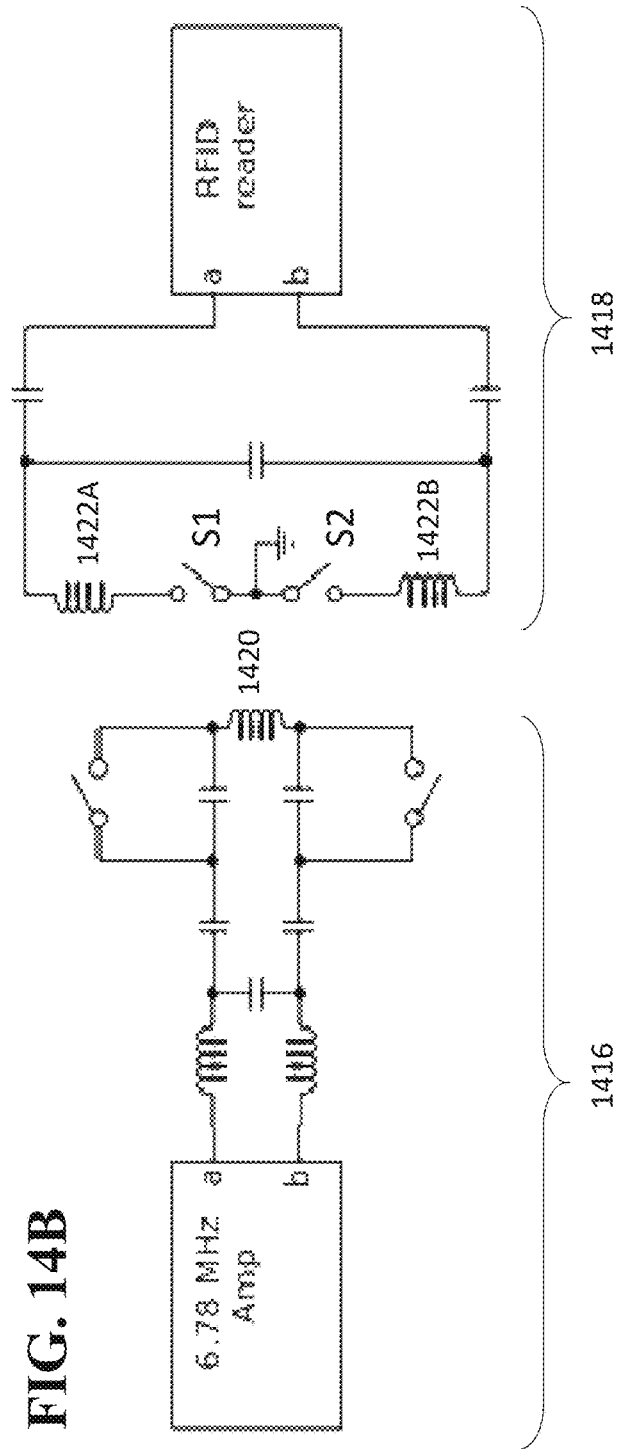
FIG. 14A
FIG. 14B

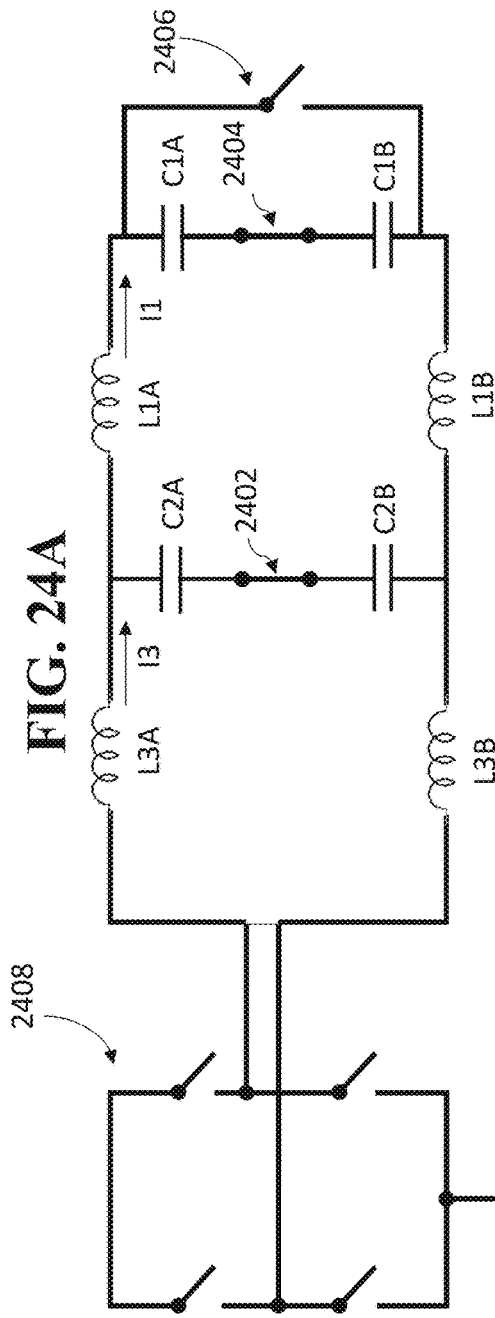
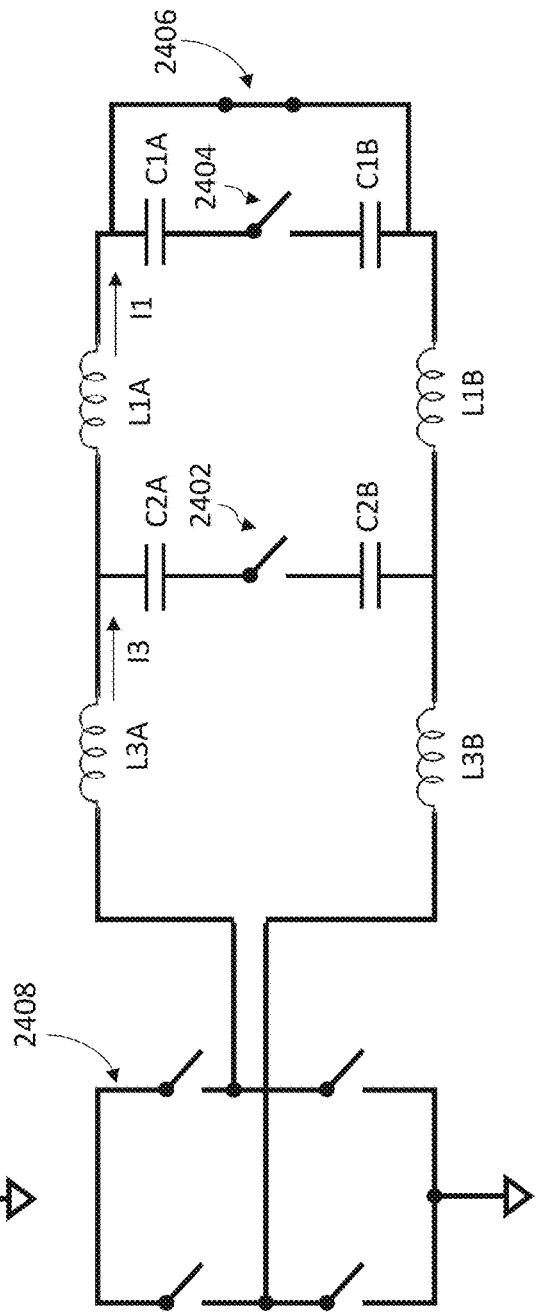

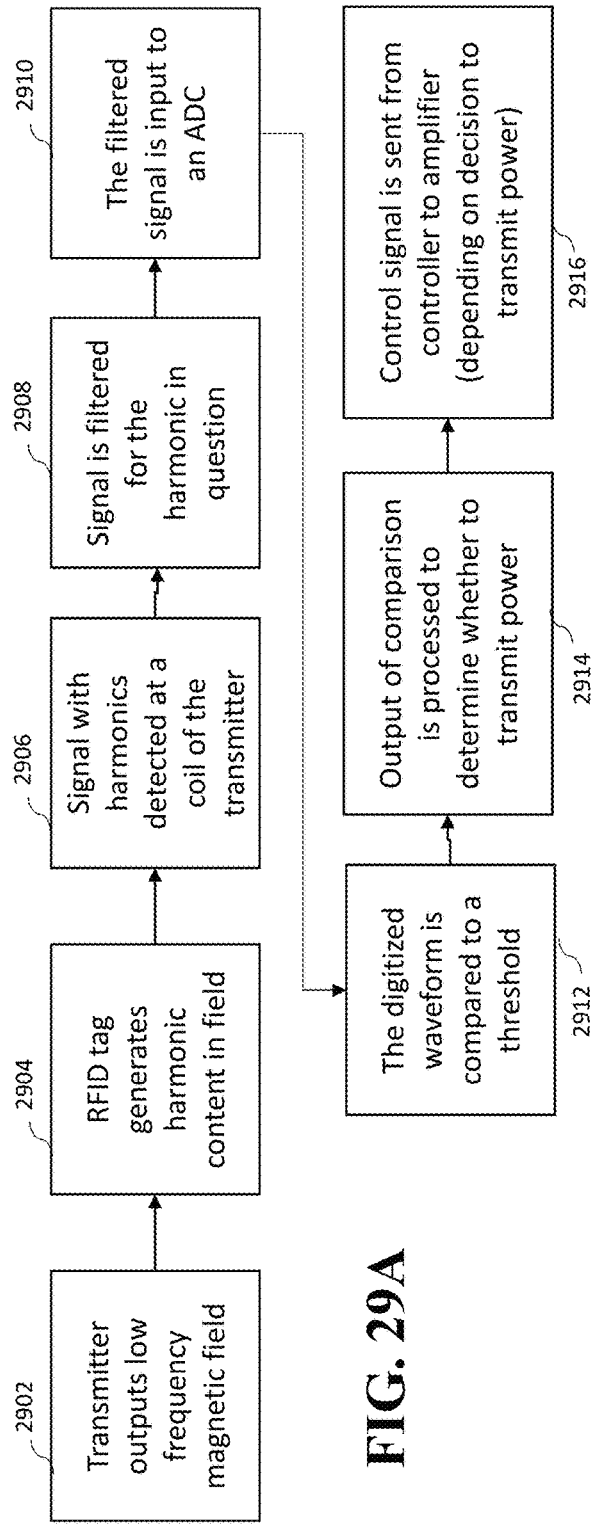
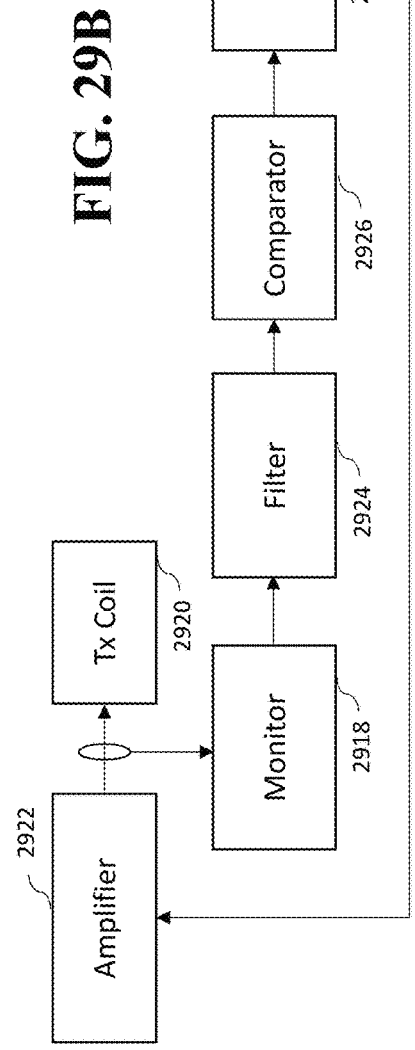
FIG. 29A
FIG. 29B

RFID TAG AND TRANSPONDER DETECTION IN WIRELESS ENERGY TRANSFER SYSTEMS

CROSS-REFERENCE TO RELATED APPLICATIONS

This application claims priority to the following U.S. Provisional Patent Applications, the entire contents of each of which are incorporated herein by reference: 62/237,676, filed on Oct. 6, 2015; 62/246,971, filed on Oct. 27, 2015; 62/264,305, filed on Dec. 7, 2015; and 62/371,009, filed on Aug. 4, 2016.

TECHNICAL FIELD

This disclosure relates to wireless energy transfer systems.

BACKGROUND

Radio frequency identification (RFID) tags are used for a variety of applications including product tracking, identification, information storage and encryption, and authentication. Passive RFID tags receive energy from electromagnetic waves generated by a tag reader. Active RFID tags include a power source such as a battery that delivers power to circuit elements within the tags. RFID tags are in ubiquitous use through a wide range of industries and products.

SUMMARY

Resonators that generate magnetic fields in wireless power transfer systems can couple to RFID tags. Because the magnetic fields generated in power transfer systems are large, even relatively weak coupling to resonators in RFID tags can induce currents in a tag's circuit elements that lead to heating of the elements and ultimately, possible damage to the tags. Given the ubiquitous use of RFID tags, it is preferable to take measures to ensure that wireless power transfer systems do not damage or inactivate tags attached to articles in proximity to such systems.

The present disclosure features methods and systems for detecting RFID tags in the vicinity of resonators used for wireless power transfer. A variety of different techniques can be implemented for RFID tag detection. In some embodiments, for example, RFID tags can be detected by generating oscillating magnetic fields within a band of frequencies, and detecting changes in the reflected impedance to the field-generating resonator. Impedance changes of a certain type—such as a relatively sharp peak in the real part of the reflected impedance—can be indicative of the presence of a RFID tag to which the magnetic fields generated by the resonator couple.

In a first aspect, the disclosure features wireless power transmitters configured to detect a radio frequency identification (RFID) tag, the transmitters including a transmitter resonator, a transmitter impedance matching network coupled to the transmitter resonator, an amplifier coupled to the transmitter impedance matching network, a detection subsystem connected to the transmitter resonator, and a controller coupled to the amplifier and to the detection subsystem and configured so that during operation of the transmitter, the controller is configured to control the transmitter resonator, the amplifier, and the impedance matching network to cycle the transmitter between a power transmission mode and a RFID tag detection mode, where in the power transmission mode the RFID tag detection mode is interrupted and the transmitter resonator generates a power magnetic field at a frequency $f_{power}$ to transfer power to a wireless power receiver, where in the RFID tag detection mode the power transmission mode is interrupted, the transmitter resonator generates at least one detection magnetic field at a frequency between $f_1$ and $f_2$ to excite a RFID tag, the detection subsystem measures a reflected impedance of the transmitter resonator at each frequency, and the controller determines whether a RFID tag is present in proximity to the transmitter based on the reflected impedance of the transmitter resonator, and where $f_1$ and $f_2$ are greater than $f_{power}$.

Embodiments of the wireless power transmitters can include any one or more of the following features.

The detection subsystem can measure a real part of the reflected impedance of the transmitter resonator, and the controller can determine whether a RFID tag is present in proximity to the transmitter based on the real part of the reflected impedance of the transmitter resonator. The detection subsystem can measure an imaginary part of the reflected impedance of the transmitter resonator, and the controller can determine whether a RFID tag is present in proximity to the transmitter based on the imaginary part of the reflected impedance of the transmitter resonator.

In the RFID detection mode, the transmitter resonator can generate detection magnetic fields at frequencies of 11 MHz, 12.5 MHz, 14 MHz, 15.5 MHz, 17 MHz, and 18.5 MHz. The transmitter resonator can first generate detection magnetic fields at frequencies of 12.5 MHz, 15.5 MHz, and 18.5 MHz, and then can generate detection magnetic fields at frequencies of 11 MHz, 14 MHz, and 17 MHz. Values of $f_1$ and $f_2$ can each be between 8 MHz and 22 MHz.

The amplifier can provide one or more driving currents corresponding to the frequency of the at least one detection magnetic field to generate the at least one detection magnetic field. The transmitter resonator can include a resonator coil and the transmitters can include a first capacitor $C_1$ connected in series with the resonator coil and one or more capacitors each connected to $C_1$ through a different associated switch, where the controller is configured to activate the transmitter resonator to generate each detection magnetic field by activating the amplifier to provide a driving current corresponding to a frequency of the detection magnetic field to the transmitter resonator, and closing one of the associated switches to connect one of the capacitors to $C_1$ through a continuous circuit pathway.

The transmitters can include a tunable capacitor connected to the controller, and the controller can be configured to activate the transmitter resonator to generate each detection magnetic field by activating the amplifier to provide a driving current corresponding to a frequency of the detection magnetic field to the transmitter resonator, and adjusting a capacitance value of the tunable capacitor based on the frequency of the detection magnetic field.

The transmitter resonator can include a resonator coil and the transmitters can include a first capacitor $C_1$ connected in series with the resonator coil, where the detection subsystem is configured to measure a first voltage across a combination of the first capacitor and the resonator coil and a second voltage across the first capacitor, and where the controller is configured to determine the reflected impedance based on the measured first and second voltages. The controller can be configured to determine a current through the resonator coil based on the second voltage, and to determine the reflected impedance based on the first voltage and the current through the resonator coil.

The controller can be configured to determine whether a RFID tag is present in proximity to the transmitter by identifying one or more local maximum values in the reflected impedance of the transmitter resonator at frequencies between $f_1$ and $f_2$. The controller can be configured to determine whether a RFID tag is present in proximity to the transmitter by determining frequencies associated with the one or more local maximum values, and comparing the determined frequencies to reference information that includes resonance frequencies associated with RFID tags. The controller can be configured to determine whether a RFID tag is present in proximity to the transmitter by comparing the determined frequencies to one or more threshold frequency values corresponding to resonance frequency limits for RFID tags.

The controller can be configured to reduce an amplitude of the power magnetic field if a RFID tag is determined to be present in proximity to the transmitter. In a single cycle, the transmitters can operate for a first time period $t_1$ in the power transmission mode and for a second time period $t_2$ in the RFID tag detection mode, and wherein $t_2$ is 500 microseconds or less (e.g., 300 microseconds or less). A total cycle time corresponding to a sum of $t_1$ and $t_2$ can be between 0.5 seconds and 2 seconds.

In the RFID tag detection mode, the controller can be configured to adjust a bus voltage in the amplifier to maintain a constant current in the transmitter resonator as each detection magnetic field is generated.

Embodiments of the transmitters can also include any of the other features disclosed herein, including any combination of features disclosed in connection with different embodiments, unless stated otherwise.

In another aspect, the disclosure features methods for detecting a radio frequency identification (RFID) tag, the methods including: operating a wireless power transmitter in a power transmission mode, where the operating features using a transmitter resonator of the transmitter to generate a power magnetic field at a frequency $f_{power}$ to transfer power to a wireless power receiver; operating the wireless power transmitter in a RFID tag detection mode, where the operating includes using the transmitter resonator to generate at least one detection magnetic field at a frequency between $f_1$ and $f_2$ to excite a RFID tag; measuring a reflected impedance of the transmitter resonator at each frequency; determining whether a RFID tag is present in proximity to the transmitter based on the measured reflected impedance of the transmitter resonator; and cycling the wireless power transmitter between the power transmission mode and the RFID tag detection mode, where $f_1$ and $f_2$ are greater than $f_{power}$.

Embodiments of the methods can include any one or more of the following features.

The methods can include measuring a real part of the reflected impedance of the transmitter resonator, and determining whether a RFID tag is present in proximity to the transmitter based on the real part of the reflected impedance of the transmitter resonator. Values of $f_1$ and $f_2$ can each be between 8 MHz and 22 MHz.

The methods can include activating an amplifier of the wireless power transmitter to provide one or more driving currents corresponding to the frequency of the at least one detection magnetic field to generate the at least one detection magnetic field. The methods can include, for each detection magnetic field, activating the amplifier to provide a driving current corresponding to a frequency of the detection magnetic field to the transmitter resonator, and connecting at least one capacitor with a capacitor $C_1$ of the wireless power transmitter through a continuous circuit pathway, where $C_1$ is connected in series with a coil of the transmitter resonator.

The transmitter resonator can include a resonator coil and the transmitter can include a first capacitor $C_1$ connected in series with the resonator coil, and the methods can include measuring a first voltage across a combination of the first capacitor and the resonator coil and a second voltage across the first capacitor, and determining the reflected impedance based on the measured first and second voltages.

The methods can include determining whether a RFID tag is present in proximity to the transmitter by identifying one or more local maximum values in the reflected impedance of the transmitter resonator at frequencies between $f_1$ and $f_2$, determining frequencies associated with the one or more local maximum values, and comparing the determined frequencies to reference information that includes resonance frequencies associated with RFID tags.

Embodiments of the methods can also include any of the other features disclosed herein, including any combination of features disclosed in connection with different embodiments, unless stated otherwise.

Unless otherwise defined, all technical and scientific terms used herein have the same meaning as commonly understood by one of ordinary skill in the art to which this disclosure belongs. Although methods and materials similar or equivalent to those described herein can be used in the practice or testing of the subject matter herein, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments are set forth in the accompanying drawings and the description below. Other features and advantages will be apparent from the description, drawings, and claims.

DESCRIPTION OF DRAWINGS

FIGS. 14A and 14B are schematic diagrams that show examples of a wireless power transmitter coupled to a RFID reader.

FIGS. 24A-24B are schematic diagrams that show examples of portions of a wireless power transmitter.

FIG. 29A is a flowchart that shows a series of steps for detecting RFID tags using low frequency signals.

FIG. 29B is a schematic diagram of an example of a system that can be used to detect harmonic signals generated by a RFID tag.

DETAILED DESCRIPTION

Figure 1A:
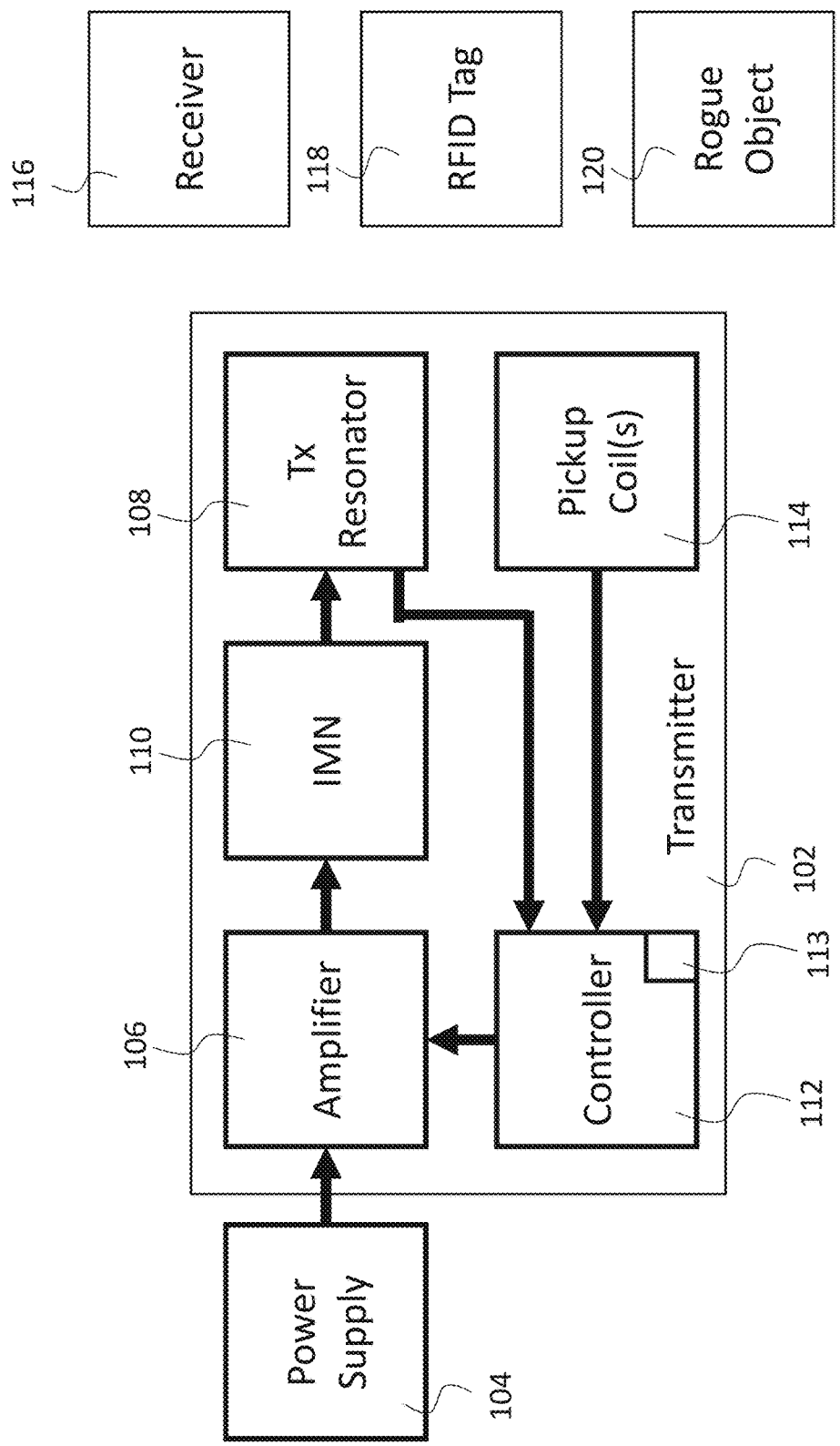
FIG. 1A is a schematic diagram of an example of a wireless power transfer system that includes a wireless power transmitter and a wireless power receiver.

I. Introduction to Wireless Energy Transfer Systems

Energy or power may be transferred wirelessly using a variety of known radiative, or far-field, and non-radiative, or near-field, techniques as detailed, for example, in commonly owned U.S. patent application Ser. No. 12/613,686, published on May 6, 2010 as US2010/010909445 and entitled "Wireless Energy Transfer Systems," U.S. patent application Ser. No. 12/860,375, published on Dec. 9, 2010 as US2010/0308939 and entitled "Integrated Resonator-Shield Structures," U.S. patent application Ser. No. 13/222,915, published on Mar. 15, 2012 as US2012/0062345 and entitled "Low Resistance Electrical Conductor," U.S. patent application Ser. No. 13/283,854, published on Oct. 4, 2012 as US2012/0248887 and entitled "Multi-Resonator Wireless Energy Transfer for Sensors," and U.S. patent application Ser. No. 13/534,966, published on Jan. 2, 2014 as US2014/0002012 and entitled "Wireless Energy Transfer for Rechargeable Batteries," the entire contents of each of which are incorporated herein by reference.

In exemplary embodiments, a wireless energy transfer system may be configured to transfer energy directly to, or charge a battery of, a mobile electronic device. Mobile electronic devices can include cell phones, smartphones, laptops, notebooks, tablets, watches, smartwatches, Bluetooth headsets, activity trackers, and the like. A wireless energy transfer system can include a wireless energy transmitter and receiver. The transmitter can include at least one transmitter resonator and transmitter electronics, and the receiver can include at least one receiver resonator and receiver electronics. In embodiments, the transmitter can transfer power to one or more receivers via an oscillating magnetic field.

II. Radio Frequency Identification Tags

Radio frequency identification (RFID) technology has been used in many applications and industries, including cards, packaging, and implanted microchips among others. In general, an RFID system can include a reader that produces a magnetic field such that when a tag enters the field, the field induces a current in the tag's circuitry that causes the tag to transmit electronically stored information to the reader. The reader and/or tag can be active or passive.

The tag can include an antenna and circuitry including a rectifier coupled to a load. RFID-equipped cards or tokens in many common applications are tuned to operate at frequencies from 8 MHz to 20 MHz, such as 13.56 MHz. However, they can absorb energy at many other frequencies and field intensities, for example, at 6.78 MHz.

For wireless energy transfer systems with an operating frequency of 6.78 MHz, coupling between the magnetic field generated by the power transmitter of such systems and an RFID tag can occur, and may cause damage to the RFID tag via dissipated heat. For example, in a situation where an RFID tag is placed in a magnetic field intended for power transfer, the relatively strong magnetic field can induce a voltage high enough in the RFID tag antenna to cause the tag's circuitry to overheat. Ultimately, this may lead to irreversible damage to the tag circuitry and packaging.

In some embodiments, an RFID reader can be used with a wireless power transmitter to detect the presence of RFID tags within an "impact zone". The "impact zone" can be defined as a volume around the wireless power transmitter within which an RFID tag can experience overheating. However, conventional RFID readers may not function properly in the presence of a strong magnetic field (caused by a wireless power transmitter) since RFID tags may not be able to interpret a request from the reader and thus, may not modulate their load in response. In other words, the RFID tag circuitry may be saturated by the strong field and thus unable to produce a suitable response.

While there are many RFID standards that are used globally, there are a handful that appear commonly in everyday items such as transit passes, hotel key cards, credit cards, and toll passes. One such standard is ISO 15693, which allows for magnetic fields up to 5 A/m rms at 13.56 MHz. Another standard, ISO 14443, allows for fields up to 7.5 A/m rms at 13.56 MHz. However, typical magnetic fields for charging a consumer electronic device, such as a smartphone, tablet, or laptop, are around 30 A/m or higher at 6.78 MHz. Note that some RFID tags may operate around 13.56 MHz without strictly conforming to a particular standard.

If the magnetic field to which a RFID tag is exposed (i.e. within the "impact zone") is too high (i.e., higher than the tag's specified limit according to a standard, for examples), a clamping circuit in the RFID tag may prevent over-voltage in the tag's circuitry. This reaction in turn can lower the quality factor $Q_{RFID}$ and widen the frequency response of the RFID tag antenna. As the frequency response widens, power can be absorbed not only at 13.56 MHz but also at 6.78 MHz. The absorbed power may then be dissipated as heat which can damage the RFID tag.

This disclosure features systems and methods for detecting RFID tags in proximity to wireless power transfer systems. The power from a wireless power transmitter of such a system can be turned down or shut off in response to detecting an RFID tag in proximity to the system. In some embodiments, the user of the wireless power system can be notified so that they may remove the RFID tag from the "impact zone" and so that the wireless power transmitter can proceed to transmit power.

In some embodiments, RFID tags are "queried" to detect and identify the tags. When queried, a small amount of power is coupled to a tag to generate a response, which is then measured and used for detection purposes. However, querying a tag in this manner is different from transferring operating power to a receiver which is then used to perform useful work such as powering an electronic device and/or charging a battery. When transmitting power to perform useful work in an electronic device, the amount of power transferred is typically 2.5 W or more (e.g., 5 W or more, 7.5 W or more, 10 W or more, 50 W or more, 100 W or more). Further, when a wireless power transmitter couples to a receiver to transmit power to perform useful work, the efficiency with which power is transferred between transmitter and receiver is generally 65% or higher (e.g., 75% or higher, 80% or higher, 85% or higher, 90% or higher, 95% or higher).

III. RFID Tag Detection by Modulation of a Power Transmission Field

FIG. 1A shows a schematic diagram of an exemplary embodiment of a wireless power transmitter 102 with a receiver 116, a RFID tag 118, and a rogue object 120 in its vicinity. The transmitter 102 is coupled to a power supply 104 such as a battery, AC mains, or solar cell. The transmitter 102 includes an amplifier 106 providing current to a transmitter resonator 108 via an impedance matching network 110. The amplifier 106 may be controlled by a controller 112. The transmitter 102 can optionally include one or more pick-up coils 114. In some embodiments, a transmitter resonator coil can be a planar coil with an active area on a surface of the planar coil.

Figure 1C:
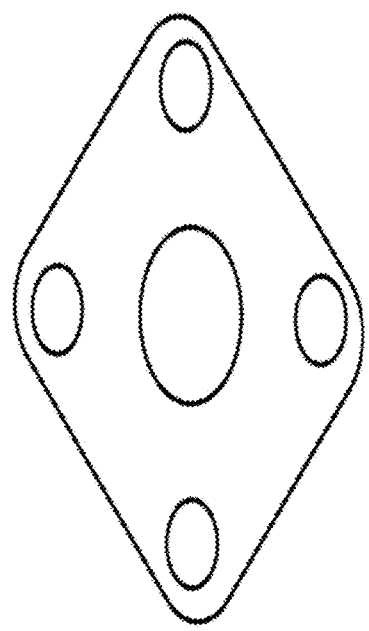
FIG. 1C is a schematic diagram of another example of an array of pickup coils.
Figure 1B:
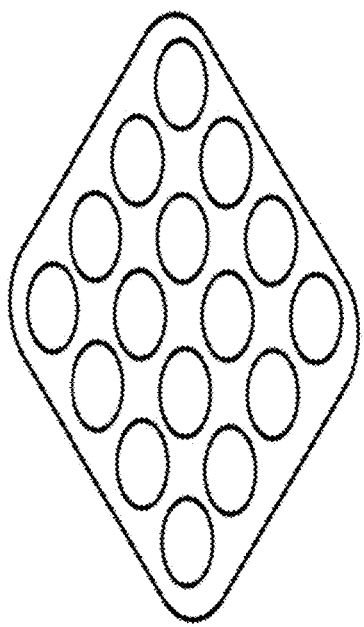
FIG. 1B is a schematic diagram of an example of an array of pickup coils.

The optional pick-up coil(s) can be positioned on or near the surface of the planar coil. FIGS. 1B-1C show schematic diagrams of exemplary embodiments of pick-up coils arranged in an array at a surface of a planar resonator coil of the transmitter resonator. FIG. 1B shows pick-up coils arranged in an evenly distributed array at the surface of the transmitter resonator coil. FIG. 1C shows pick-up coils arranged on the transmitter coil surface such that a larger pick-up coil is positioned near the center of the transmitter coil surface and smaller pick-up coils are positioned near the corners.

In general, a RFID tag can approach to within only a certain distance of a transmitter before the amplitude of the field generated by the transmitter causes thermal damage to the tag. Because the field at the center of the transmitter's resonator coil is larger than the field near the edges of the resonator coil, a tag can approach the edges of the resonator coil more closely than the center before damage occurs. The distribution of field amplitude above the surface of the transmitter's resonator coil creates a three-dimensional "damage bubble" within which damage to a tag can occur. As a result, detection of a tag occurs before the tag enters the damage bubble. As an example, for a given duration of exposure, a RFID tag approaching the center of an exemplary transmitter's resonator coil may only be able to approach to within about 7 cm before damage occurs; accordingly, detection of the tag occurs at distances of 7 cm and larger to prevent tag damage. A RFID tag approaching the edge of the same resonator coil may be able to approach to within 5 cm before damage occurs, and therefore detection of the tag can occur at distances of 5 cm and larger.

Different arrangements of pick-up coils as shown in FIGS. 1B and 1C can be used to implement RFID tag detection at different distances from a transmitter resonator coil. For example, as shown in FIG. 1C, in some embodiments pick-up coils with higher sensitivity (e.g., due to a larger radius, larger effective size, and/or greater number of loops) can be positioned at the center of the transmitter resonator coil to detect RFID tags at larger distances from the resonator coil. Pick-coils with lower sensitivity (e.g., due to a smaller radius, smaller effective size, and/or smaller number of loops) can be positioned nearer to the edges of the transmitter resonator coil, since RFID tags can be closer to the resonator coil at these locations before damage occurs.

In addition to having different radii, effective sizes, and numbers of loops, pick-up coils can also be positioned in different orientations relative to one another and/or to the transmitter resonator coil to provide for detection of RFID tags at different distances (e.g., with different sensitivities).

Returning to FIG. 1A, transmitter 102 can wirelessly transmit power to one or more receivers 116 to provide power to a load, such as the battery of a mobile phone, laptop, tablet, etc. Other objects such as RFID tags 118 and rogue objects 120, for example, metal objects including coins, cans, compact discs, etc. may be positioned near the transmitter 102. In certain embodiments, to avoid damaging an RFID tag as discussed above, the transmitter can detect its presence. In some embodiments, transmitter 102 is configured to detect and differentiate an RFID tag 118 from a receiver 116 and/or a rogue object 120.

Figure 2:
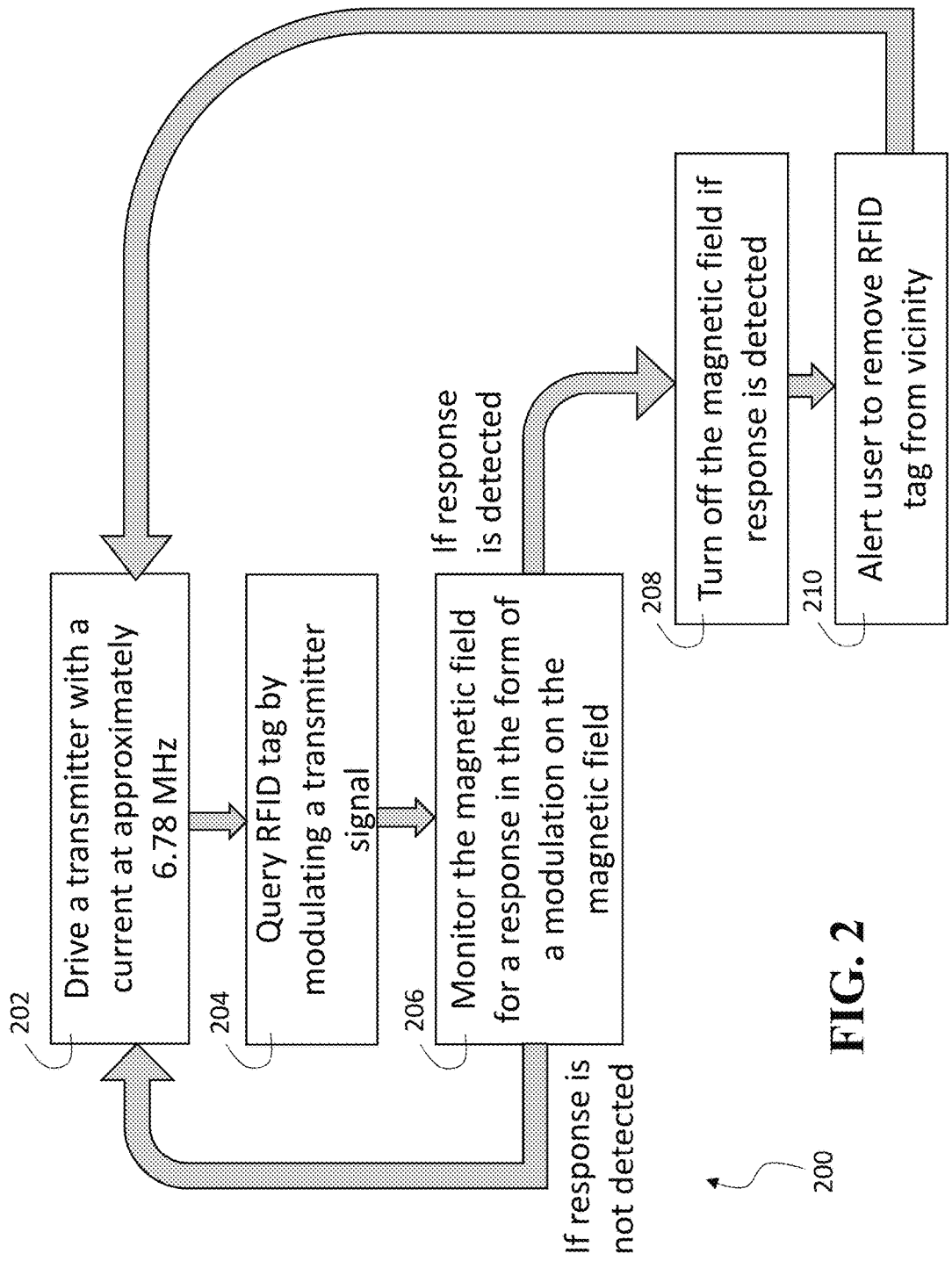
FIG. 2 is a flowchart showing a series of steps that can be performed to detect the presence of an RFID tag in a magnetic field.

FIG. 2 is a flowchart 200 that shows a series of example steps for detecting a RFID tag in proximity to a wireless power transmitter. In step 202, a transmitter is driven with an oscillating current at approximately 6.78 MHz. In step 204, the transmitter queries an RFID tag by modulating the magnetic field that it generates. For example, the transmitter can turn off, decrease, or modulate the magnetic field for short periods of time and/or in a specific pattern to query the RFID tag. The pattern of modulation to query the RFID tag can be specific to the RFID standard that the tag employs. Examples of RFID standards are ISO 15693, ISO 14443 (Types A and B), ISO 18000-3 (Modes 1, 2, 3), FeliCa, and the like.

To modulate the magnetic field of the transmitter, controller 112 can control the switches of the transmitter amplifier 106 via, for example, pulse width modulated (PWM) signals. The controller 112 can modulate the duty cycle and/or the phase of the switches. Alternatively, or in addition, controller 112 can be coupled to IMN 110 and can tune elements of IMN 110 (such as adjustable capacitors and/or inductors) to generate a modulated magnetic field at the transmitter resonator 108.

Transmitter 102 can monitor any change or modulation in its magnetic field (step 206) in response to the query. In some embodiments, for example, the RFID tag can modulate the carrier frequency fc=6.78 MHz of the power transmission field with a subcarrier field component at a frequency of, for example, fsc=fc/16, fc/32, and/or fc/64. In certain embodiments, the modulation may be in the 100-500 kHz range.

Figure 19:
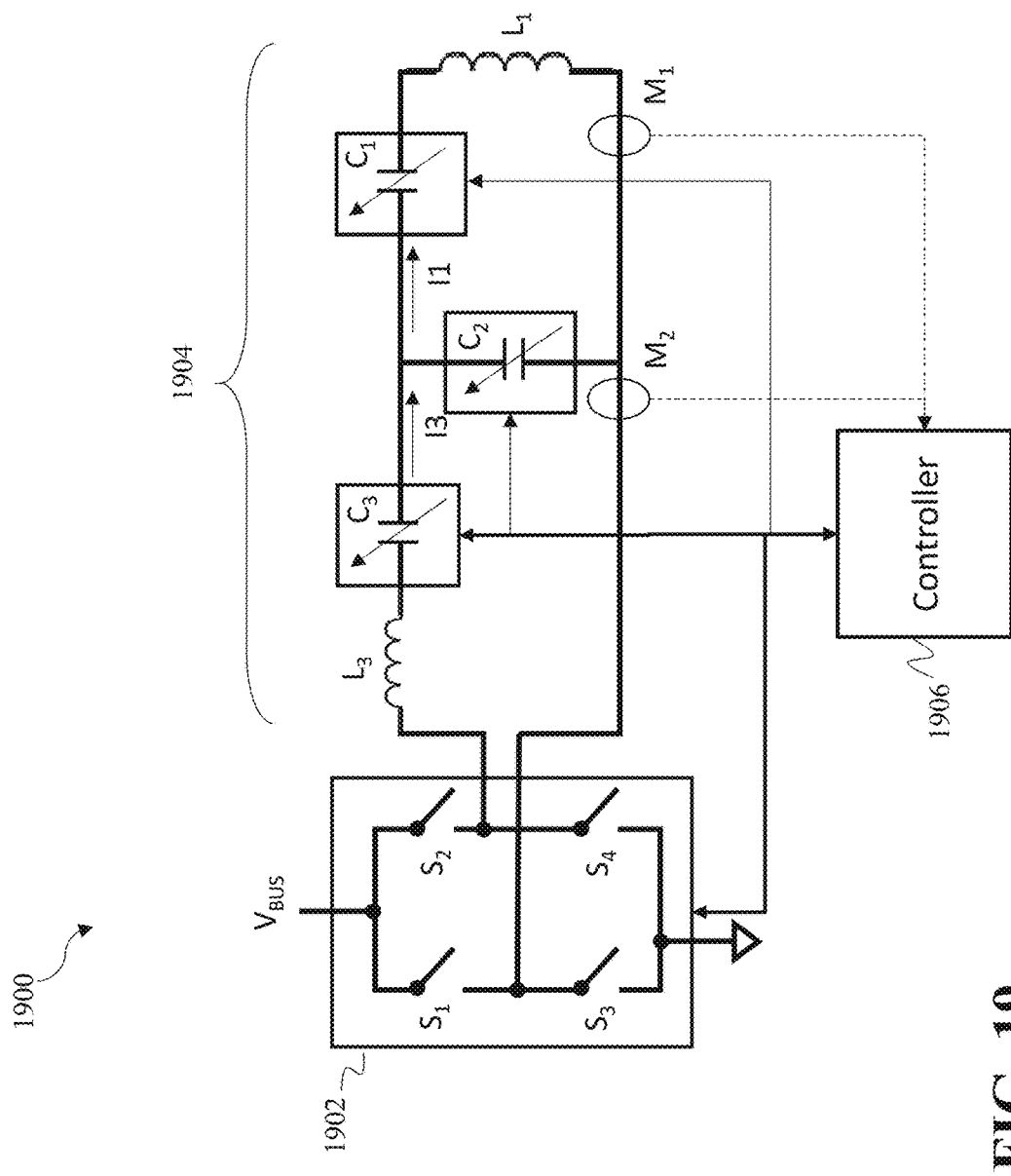
FIG. 19 is a schematic diagram of an example of a wireless power transmitter.

To detect changes or modulation in the magnetic field, one or more sensors (e.g., sensors 113 in FIG. 1A) can be present in transmitter 102. For example, one or more current, voltage, power, or impedance sensors can be coupled to the transmitter to monitor signals such as transmitter resonator coil current, voltage on the resonator coil, voltage on a resonator capacitor, and/or impedance shifts. Examples of such sensors are also shown in FIG. 19 (e.g., monitors M1 and M2), which is discussed in greater detail below.

Returning to FIG. 2, if a sensor detects a change or modulation in any of these signals, the magnetic field may be turned off or decreased (step 208). The user of the system may optionally be alerted to remove any RFID tags in the vicinity of the charging system (step 210). The transmitter may then resume generating a magnetic field to power or charge electronic devices.

IV. Querying for RFID Tags

Figure 3:
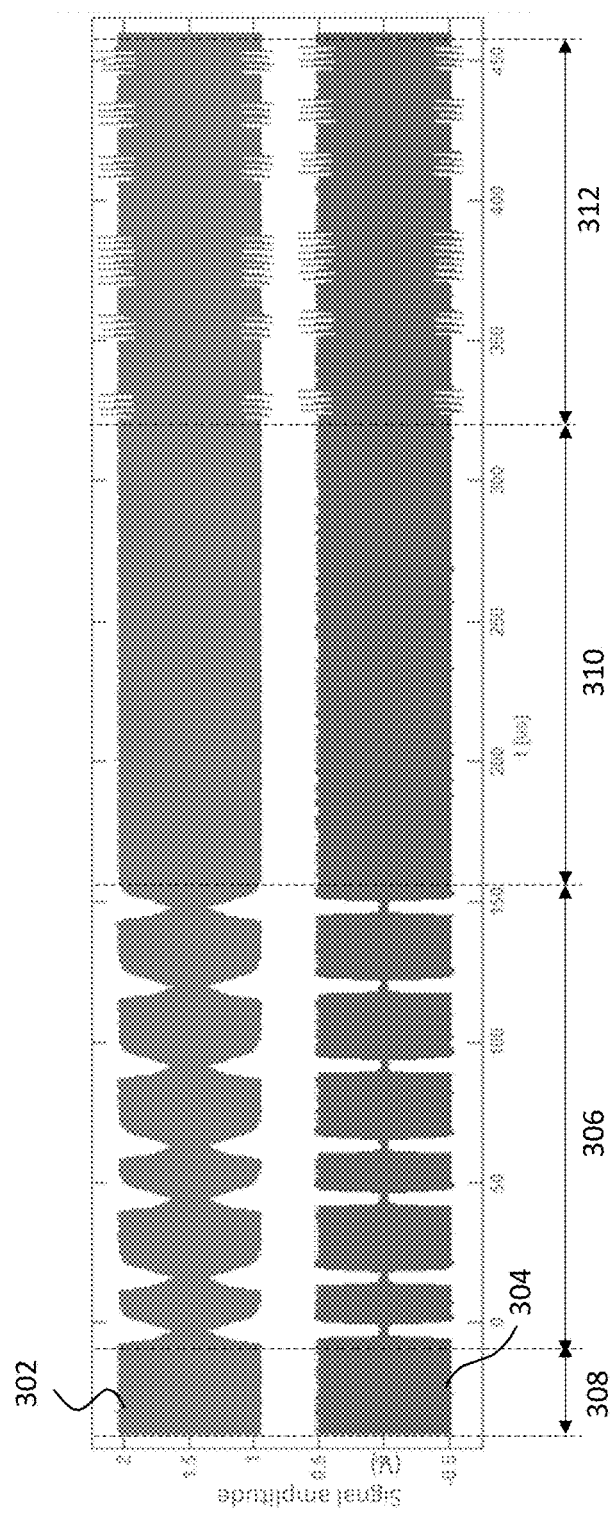
FIG. 3 is a plot showing measured impedance as a function of time, where the measured signals can be used to detect the presence of an RFID tag in a magnetic field.

FIG. 3 is a plot showing examples of measured signals corresponding to the magnetic field generated by a transmitter resonator. In some embodiments, the signal can be a voltage on the transmitter resonator coil and/or a probe or pick-up coil. The top waveform 302 corresponds to a transmitter resonator coil with quality factor Q of approximately 200 while the bottom waveform 304 corresponds to a transmitter resonator coil with a quality factor Q of approximately 16.

There is a duration 308 of sustained field amplitude generated by the transmitter, followed by a duration 306 in which the magnetic field is modulated to query an RFID tag. The duration of sustained amplitude 308 can be, for example, approximately 1 millisecond or more (e.g., approximately 2 milliseconds or more, approximately 5 milliseconds or more, approximately 10 milliseconds or more). Duration 306 is followed by a duration 310 of sustained field amplitude before a modulation of the field due to the response of the RFID tag is detected in duration 312.

Note that the duration 306 of the modulation pattern in the waveform is extended in time when using an approximate carrier frequency of 6.78 MHz as compared to the duration of the modulation pattern at the normal operating frequency of 13.56 MHz. In this case, the duration 306 of the modulation pattern is approximately twice as long at 6.78 MHz as compared to a modulation pattern at 13.56 MHz. This "slowing down" of the modulation pattern occurs to properly generate a response from an RFID tag in the vicinity of the transmitter. A RFID tag may respond to a modulation in a 6.78 MHz field at this "slowed down" rate due to the slowing down of the clock of the RFID tag, which is usually generated from the carrier magnetic field. Further, the dynamic range of field to which RFID tags may respond at 6.78 MHz is less than the dynamic range of field to which RFID tags respond at 13.56 MHz. For example, at 13.56 MHz, an RFID tag may respond in magnetic field levels of approximately 1.5-7.5 A/m, or a dynamic range of 5. At 6.78 MHz, an RFID tag may respond in magnetic field levels of approximately 2.5-5.0 A/m, or a dynamic range of 2. To successfully detect multiple types of RFID tags at 6.78 MHz, each standard can be queried at several different field strengths.

To increase the probability that an RFID tag responds to the magnetic field created by a transmitter resonator, the power level of the transmitter modulated signal can be configured to be lower so that certain electronic protective components, such as the rectifier, converter, and/or clamp circuitry, in the RFID tag does not engage. These protective components may prevent the RFID tag from responding. The modulation response of the RFID tag may be reduced if a voltage is present that is large enough to cause this circuitry to engage. As will be discussed in greater detail subsequently, in some embodiments, detection of RFID tags can occur by measuring changes in the complex impedance of the transmitter coil. Thus, the sensitivity of detection is closely related to coupling between the detection coil (in some cases, the transmitter coil) and the RFID tag. However, when the above circuit components engage, the extent to which the RFID tag modulates the real part of the reflected impedance can be significantly reduced. This is a natural consequence of the engagement of these components, as they function to protect the RFID tag against over-voltage and/or over-current conditions that can damage the tag. But because the engagement of these components can significantly reduce the modulation in the real part of the reflected impedance by the RFID tag (and can also increase nonlinearities in the modulation by the RFID tag), detecting RFID tags using techniques based on measurement of the real part of the reflected impedance may become more challenging. For this reason, the power level of the transmitter field can be maintained relatively low.

Due to the high quality factor $Q_{TX}$ of the transmitter resonator coil, the magnetic field may not be able to turn off quickly enough to create the distinct modulations seen in duration 306. For example, the fall time, rise time, and overshoot of the field transients during modulation may be too large using a high $Q_{TX}$ transmitter resonator coil. Thus, in certain embodiments, a resistor can be switched in to temporarily lower the quality factor $Q_{TX}$ of the resonator coil. The resistor can be switched in for most or all of duration 306. This can lower the quality factor $Q_{TX}$ of the transmitter resonator and allow fast modulation of the transmitter current. In certain embodiments, the transmitter can be configured to generate a magnetic field at low power to prevent the RFID tag from saturating and to allow for fast modulation by the resistor.

In some embodiments, the transmitter can generate a magnetic field at a normal power level (i.e. to transmit an expected amount of power to a device such as 1 W, 5 W, 10 W, 30 W or more). In this case, the resistor can be configured to be switched in and out quickly in duration 306 to temporarily lower the quality factor while still allowing receiver to 'ride through' and receive power uninterrupted.

Typically, during a modulation period, the magnetic field is only off or decreased for a few microseconds at a time, for example, in the range of 1 microsecond to 10 microseconds (e.g., 1 microsecond to 8 microseconds, 1 microsecond to 6 microseconds, 1 microsecond to 4 microseconds) per modulation. The specific durations for which the magnetic field is off or decreased can be adjusted based on a RFID tag's standard and on the modulation sequences for "waking up", "querying", "taking inventory" and the like of RFID tags. However, a receiver that expects to receive uninterrupted power via an uninterrupted magnetic field may not be able to continuously deliver power to its load during periods of modulated or "interrupted" magnetic field. Accordingly, in certain embodiments, one or more capacitors is coupled to the receiver to "carry" the electronic load through periods of reduced magnetic field without any effective charging interruptions.

Figure 4:
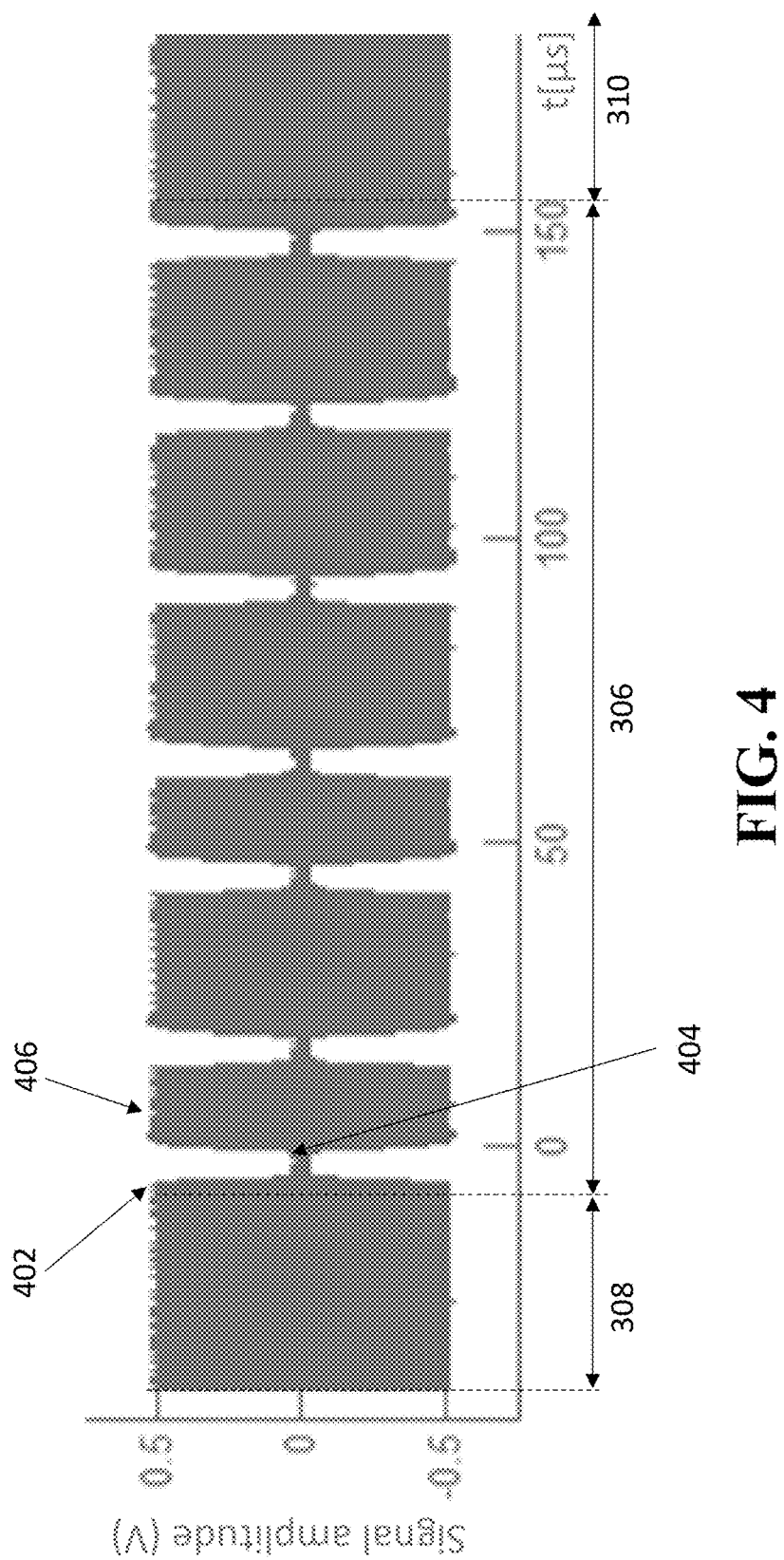
FIG. 4 shows an enlarged view of the plot shown in FIG. 3.

FIG. 4 shows an expanded view of waveform 304 from FIG. 3. After an initial duration 308 of sustained amplitude, duration 306 of modulated transmission field amplitude is initiated by switching a resistor R at time 402 into the circuitry of the power transmitter; at the same time, the amplifier of the power transmitter is turned off. Depending upon the RFID tag standard, the period during which the amplifier is off can be sustained for several microseconds, for example, between 5 and 10 microseconds, before the amplifier is turned on again (at time 404). A short time later, at time 406, the resistor is switched out of the transmitter circuitry. The foregoing cycle can be repeated for each modulation in duration 306.

Figure 5:
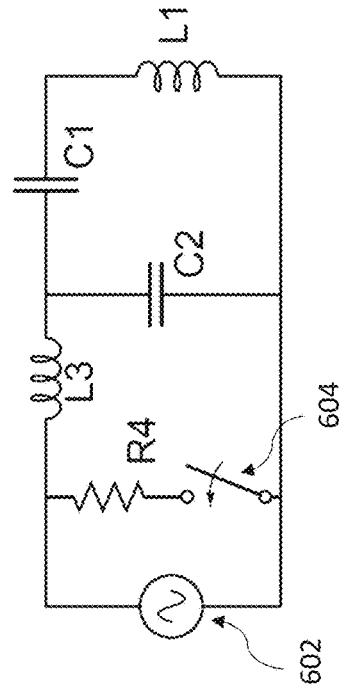
FIG. 5 is a schematic diagram showing an example of a switchable resistor that is used to modulate a wireless power transmitter signal.

FIG. 5 is a schematic diagram that shows an example of a portion of transmitter circuitry in which resistor R1 is connected in parallel to capacitor C1 in the resonator circuit of the transmitter. L1 is an inductive element that corresponds to the coil in the transmitter's resonator that generates the magnetic field for wireless power transfer. Amplifier 504 is connected to and drives L1 to generate the magnetic field. Resistor R1 is configured to be switched in and out of the circuit via switch 502. Controller 112 can be configured to control the switch 502 and/or amplifier 504. Switching R1 in and out of the circuit may cause some transient behavior, which can be corrected, for example, by using filtering techniques.

Figure 6:
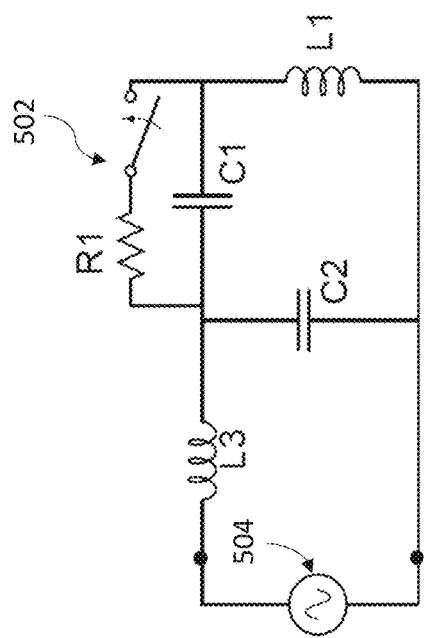
FIG. 6 is a schematic diagram showing another showing an example of a switchable resistor that is used to modulate a wireless power transmitter signal.
Figure 7:
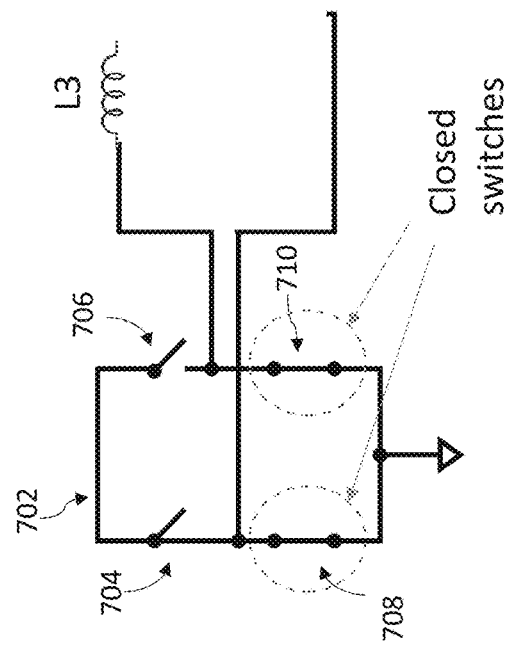
FIG. 7 is a schematic diagram showing an example of an amplifier state during modulation of a transmitter signal.

FIG. 6 is a schematic diagram that shows another example of a portion of transmitter circuitry in which resistor R4 is connected in parallel with amplifier 602. In some embodiments, resistor R4 is connected in parallel with lower switches or FETs 708, 710 (as shown in FIG. 7 and described below). When the amplifier 602 is turned off, current flows through R4 into L3, thereby damping the current in the transmitting coil L1 more quickly. Similarly, by activating switch 604, R4 can be switched in and out from the transmitter circuitry. In certain embodiments, resistor R4 can be switched out when the amplifier 602 is turned on as R4 does not affect rise time (as R1 does). Controller 112 can be configured to control switch 604 and/or amplifier 602.

FIG. 7 shows a schematic diagram of an exemplary embodiment of a full-bridge Class-D amplifier 702 that has been turned off. Top switches 704, 706 are open while bottom switches 708, 710 are closed, effectively shorting the path to ground and preventing voltage transients due to interruption of L3 current. In embodiments utilizing R4 switching, as shown in FIG. 6, some or all of the switches of the amplifier can be open-circuited to force current through resistor R4.

In certain embodiments, the values of resistor R1 and/or R4 are selected according to the transmitter circuitry's modes and decay constants. For example, in some embodiments, the resistors are chosen so that the slowest decaying mode conforms to the decay times specified in one or more RFID standards. Thus, the resistance value for R1 can be in the approximate range of 10 to 75Ω or more. The resistance value for R4 can be in the approximate range of 5 to 25Ω or more.

In general, the resistance value can be dependent on the quality factor of the transmitter resonator coil, the extent of modulation of the magnetic field, and/or the resonator coil inductance. For certain configurations, the quality factor can be proportional to cycles of magnetic field decay:

$$Q \propto \frac{T_{decay}}{T_{cycle}}$$

where $T_{decay}$ is the time duration for 1/e reduction of current and $T_{cycle}$ is the time duration of each cycle of magnetic field oscillation.

In some embodiments, the charge rate or effective rate of energy delivery may decrease with the duty cycle of the amplifier. For example, if the magnetic field generated by the transmitter has zero amplitude for 25% of the modulation duration, then 75% of the expected amount of power can be delivered to a receiving device.

V. Power Transmission and RFID Reader Systems

Figure 8:
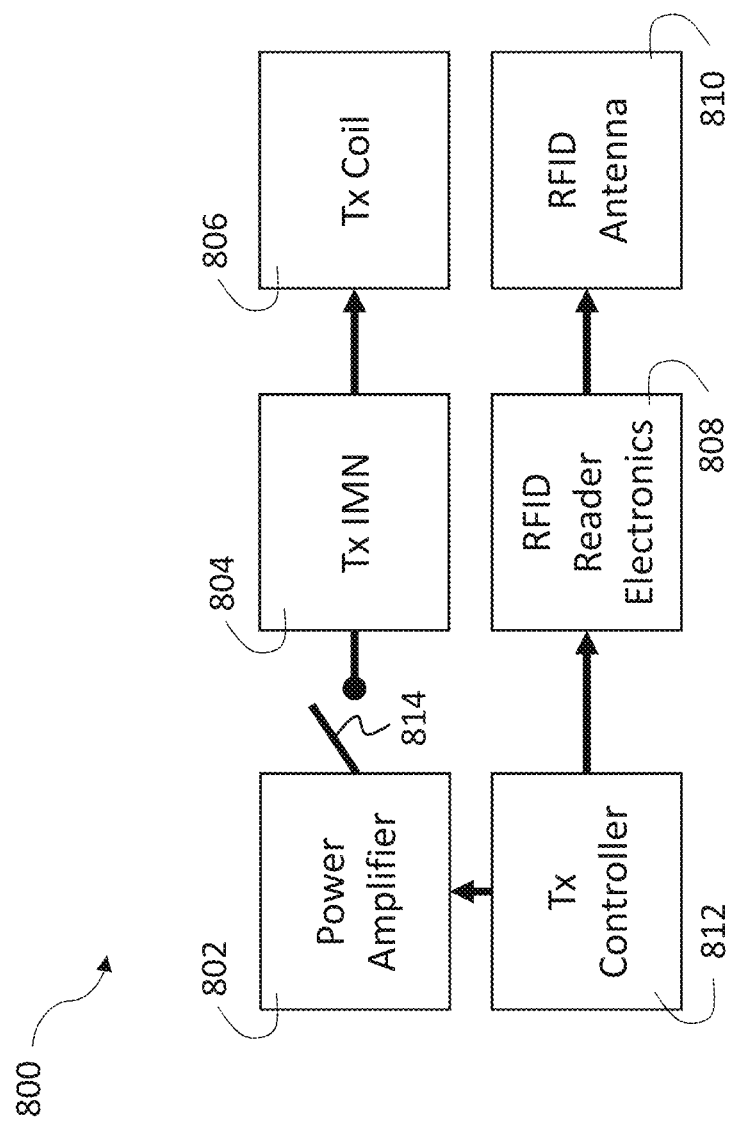
FIG. 8 is a schematic diagram of an example of a wireless power transfer system that includes a wireless power transmitter and an RFID reader.

FIG. 8 is a schematic diagram of an example of a wireless power transmitter 800 that includes a RFID reader system. In FIG. 8, wireless power transmitter 800 includes a power amplifier 802 selectively coupled to a transmitter impedance matching network 804 and resonator coil 806. The transmitter controller 812 can control the activation of the RFID reader electronics 808 and antenna coil 810. In some embodiments, some or all of the RFID reader system components can be contained within the transmitter packaging or housing. For instance, the controller 812 can switch out (via switch 814) the transmitter IMN 804 and resonator coil 806 and activate the RFID reader electronics 808 and antenna coil 810. This causes the power transmission to be temporarily interrupted while the RFID reader queries for RFID tags.

Figure 9B:
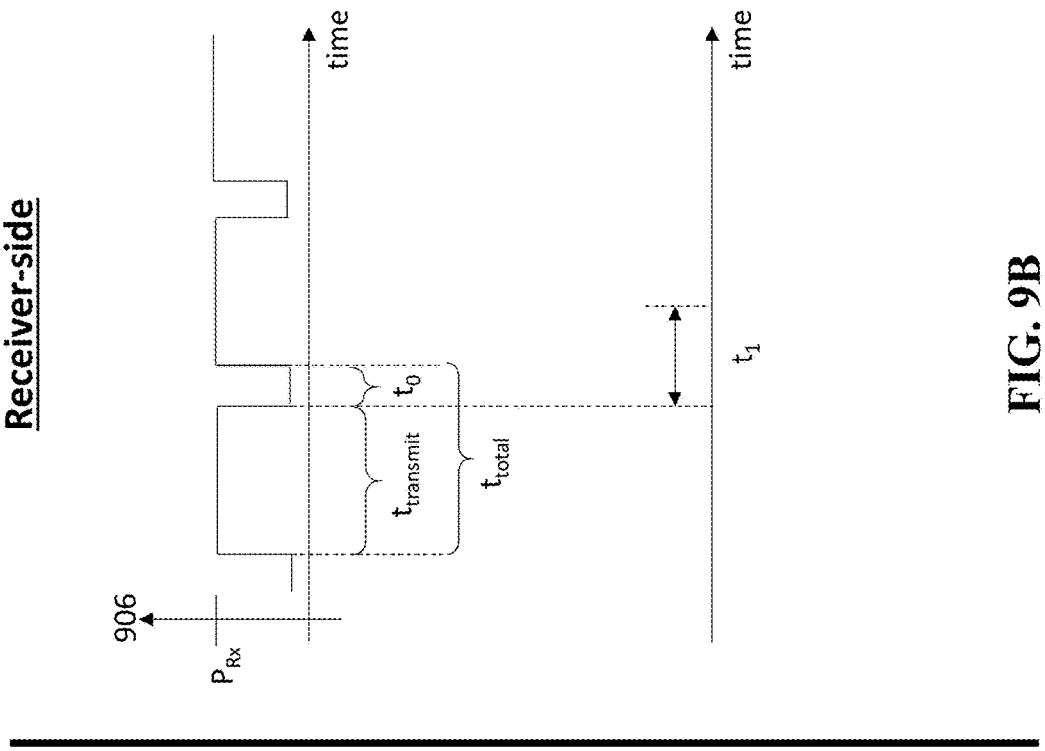
FIG. 9B is a schematic diagram that shows an example of power and/or communication signals at a receiver.
Figure 9A:
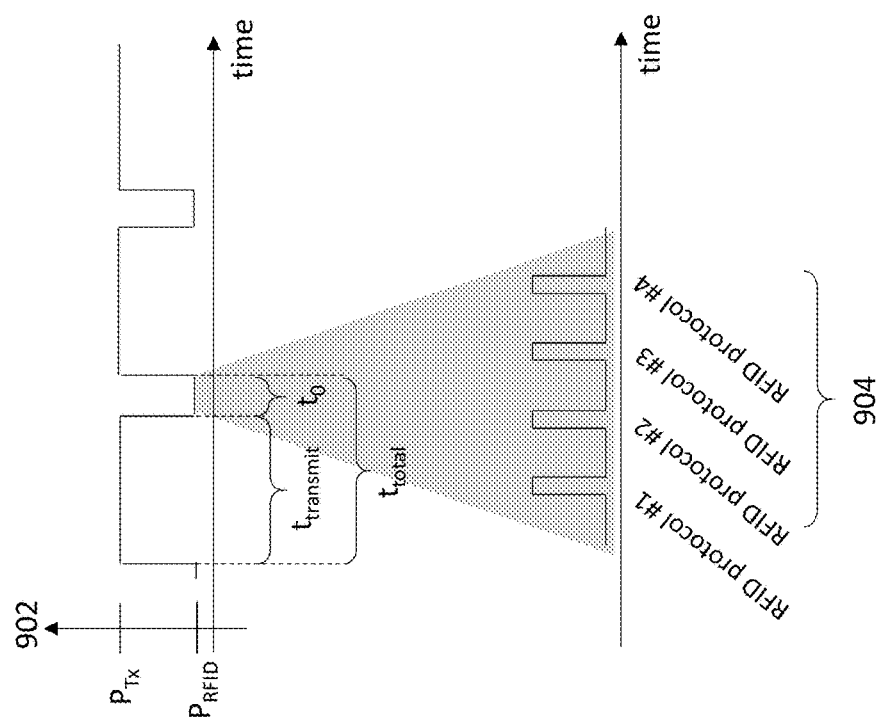
FIG. 9A is a schematic diagram that shows an example of power and/or communication signals at a transmitter.

FIG. 9A shows a representation of a waveform at the transmitter resonator coil (e.g., a magnetic field generated by the transmitter resonator coil) as a function of time. The power level 902 shown is a representation of the level of power transmitted to a receiver though current, voltage, or output power or another operating parameter that can also be measured. During the period of time $t_{transmit}$, the transmitter outputs a power level $P_{Tx}$ sufficient to power or charge the load at the receiver. The load can be a battery of the receiver such as a laptop, tablet, or mobile phone battery. For example, a power level $P_{Tx}$ sufficient to charge the battery of a mobile phone may be at least 1 W (e.g., at least 2 W, at least 5 W, at least 10 W, or even more). In the example of a laptop, a power level $P_{Tx}$ to charge its battery may be at least 5 W (e.g., at least 10 W, at least 20 W, at least 40 W, at least 50 W, or even more). In general, the power level $P_{Tx}$ may be any power level that keeps certain functions (e.g., core functions and/or essential functions) of the receiver active, and/or a power level that charges the battery of the receiver (e.g., a mobile phone or laptop battery). Control over the output power level can be determined by the controller 112 adjusting any of the converters, amplifiers, impedance matching components, or other components of the transmitter.

For period of time $t_0$, the power level at the transmitter is decreased to below the power level $P_{Tx}$ to $P_{RFID}$ to allow the querying of one or more RFID protocols to check for RFID tags. When the power level is decreased to $P_{RFID}$ allowing the RFID reader to operate, the power level is typically not sufficient to power or charge the load. In some embodiments, $P_{RFID}$ may be zero or near zero (e.g., 0.1 W or less, 0.05 W or less, 0.01 W or less, 0.005 W or less, 0.001 W or less, 0.0001 W or less, 0.00001 W or less, or even less). Time $t_{total}$ indicates a single cycle of $t_{transmit}$ and $t_0$.

In some embodiments, an RFID reader or the power transmitter itself (using techniques described above) may query according to the RFID and/or near-field communication (NFC) protocols 904, as shown in FIG. 9A. The number of protocols 904 may depend on the period of time $t_0$ allowable by a power transmission standard and/or the amount of time a receiver's charging electronics can remain on without receiving power. In certain embodiments, the number of protocols 904 may depend on a chosen number of RFID read/interrogation protocols based on popularity of particular type(s) of RFID tags. In certain embodiments, different sets of RFID protocols can be queried at each time period to. In other words, a first set of RFID protocols can be queried at the first instance of to and a second set of RFID protocols can be queried at the second instance of to and so on.

In some embodiments, the period of time $t_0$ may be approximately 5 ms to approximately 100 ms (e.g., less than 90 ms, less than 80 ms, less than 70 ms, less than 60 ms, less than 50 ms, less than 30 ms, less than 20 ms, less than 15 ms, less than 10 ms), though $t_0$ can be higher or lower depending on the application. In certain embodiments, the duration $t_{total}$ may be approximately 1 second long. In some embodiments, the duration $t_{total}$ may be approximately 0.25 seconds or more (e.g., 0.5 seconds or more, 0.75 seconds or more, 1.0 second or more, 1.5 seconds or more, 2.0 seconds or more, 3.0 seconds or more).

The length of time period $t_{total}$ may be selected reduce harm to an RFID tag that is within an active area of power transmission, which is an area within which a receiver couples to a transmitter to transmit power wirelessly from the transmitter to the receiver at an efficiency (as measured by the ratio of power transmitted to the receiver to power supplied to the transmitter resonator) of at least 5%. For example, it was found that it took approximately 1 second for some RFID tags to reach a harmful temperature level. In other cases, it was found that it took less than 1 second for certain RFID tags to reach a harmful temperature level. A "harmful" level of temperature is defined as a temperature reached by the RFID tag—due to the coupling of energy into the RFID tag—such that the RFID tag electronics are irreversibly damaged or their expected lifetime is reduced.

In some embodiments, a transmitter can initiate an RFID query period to after the receiver sends a value of a measured parameter, such as a measured current, voltage, or power value, to the transmitter. Such a measurement may be sent from the receiver to the transmitter, for example, approximately every 250 milliseconds. Below in Table 1 is a summary of a sample of RFID standards and time needed for query cycle time, using the following formula:

$$\text{reader query} + \text{wait} + \text{card response} = \text{query cycle time}$$

TABLE 1

Summary of sample RFID standards that may be queried during power transmission.

| Standard | Reader query (ms) | Wait (ms) | Card response (ms) | Query cycle time (ms) |
|---|---|---|---|---|
| ISO 14443A | 0.094 | 0.091 | 0.151 | 0.337 |
| ISO 14443B | 0.708 | 0.170 | 1.321 | 2.199 |
| ISO 15693 | 2.275 | 0.321 | 3.927 | 6.523 |
| FeliCa | 0.604 | 2.417 | 1.057 | 4.078 |
| Total* | 3.681 | | | 13.137 |

*Sum of all of the query cycle times. Does not include delay between each standard query cycle.
**Total including a delay between each standard query cycle. Delay = 5 ms (set by ISO 14443 standards).

It should be noted that in Table 1 above, the query cycle time and other times are not inflexible, and can be adjusted, for example, to account for communication speed between the transmitter and receiver.

FIG. 9B shows a representative measurement 906 of power at the receiver resonator coil, though a voltage, current, or another operating parameter value can be measured instead to provide an indication of the received power level $P_{Rx}$. Such a measurement 906 may also be made at the matching network, rectifier, load, or battery of the receiver.

In some embodiments, the load may experience a drop in power below a power level $P_{Rx}$ needed to power its load or charge its battery, reflecting a drop in power $P_{Tx}$ at the transmitter side. If power transmission drops or decreases, the receiver controller may signal to the user interface of the mobile electronic device that power transmission has indeed dropped and a notification can be delivered to the user (e.g., may appear to the user in the form of LED lights, vibration, or a notification on the screen of the laptop, mobile phone, etc.).

However, to avoid notifying the user every time RFID query occurs (and cause an undesirable user experience), a controller in the receiver can be configured to wait until the end of duration $t_1$ after determining that $P_{Rx}$ has decreased below a threshold level. After $t_1$, if the power level has not resumed to the expected $P_{Rx}$ level, the receiver controller can signal to the user interface that power transmission has dropped. After $t_1$, if the power level has resumed to PTx, the user will not be notified of any power interruptions. This notification time duration $t_1$ can be longer than time $t_0$ that is taken to query RFID protocols.

Figure 10:
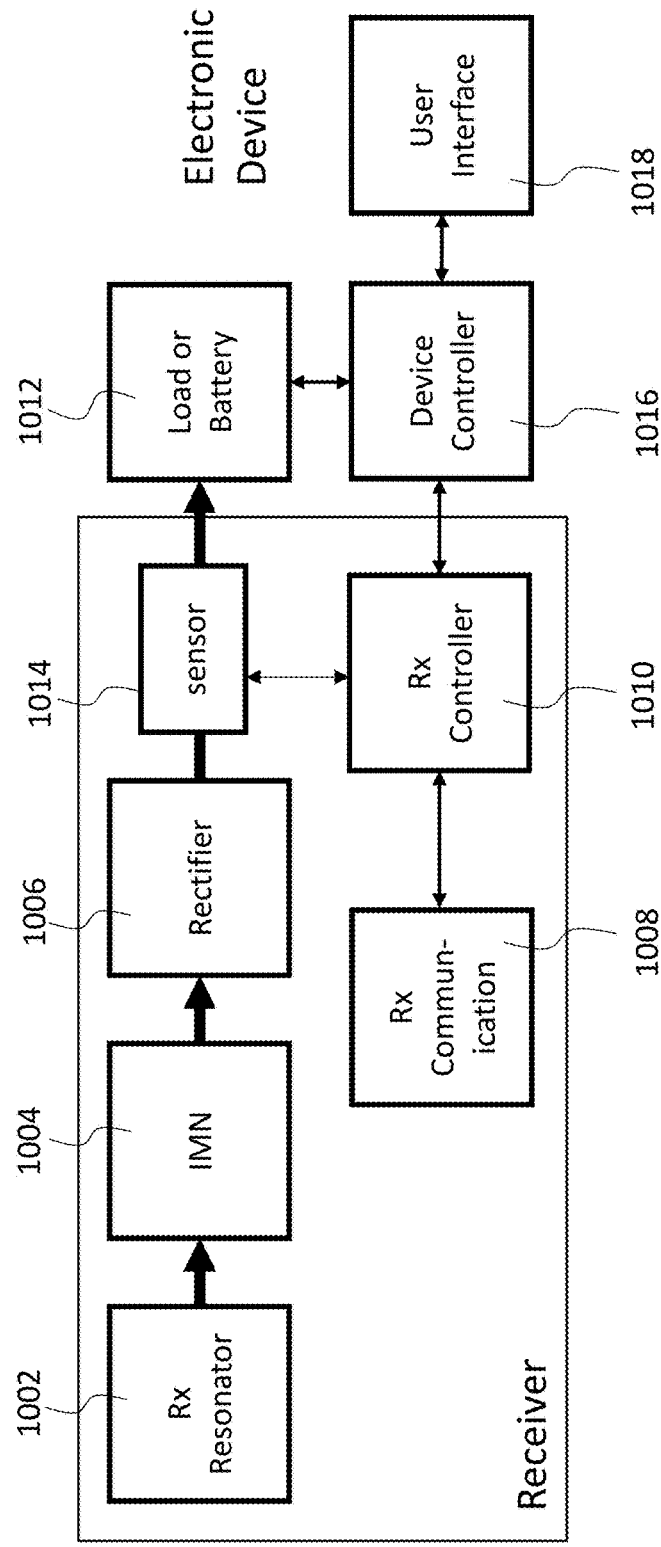
FIG. 10 is a schematic diagram that shows an example of a wireless power receiver coupled to a mobile electronic device.

FIG. 10 shows a schematic diagram of an embodiment of a wireless power receiver coupled to device electronics. The receiver includes a receiver resonator 1002, impedance matching network 1004, rectifier 1006, communication circuit 1008, and a receiver controller 1010. The output of the rectifier 1006 is coupled to a load or battery 1012. Between the rectifier 1006 and load 1012 can be a DC-to-DC converter and/or a voltage clamp (not shown).

In certain embodiments, a parameter measurement sensor 1014 can be positioned at the output of the rectifier 1006. The receiver controller 1010 can detect a change in a parameter measured by sensor 1014, for example, due to the power decrease associated with interrupted power transmission for RFID detection.

In some embodiments, receiver controller 1010 can communicate with the device controller 1016 to indicate that the power has dropped and that notification to the user interface 1018 of the device should be delayed by time duration $t_1$. In some embodiments, the device controller 1016 can be configured to delay communicating with the user interface 1018 by time duration $t_1$ once detecting that the power to the load 1012 has decreased.

Figure 11:
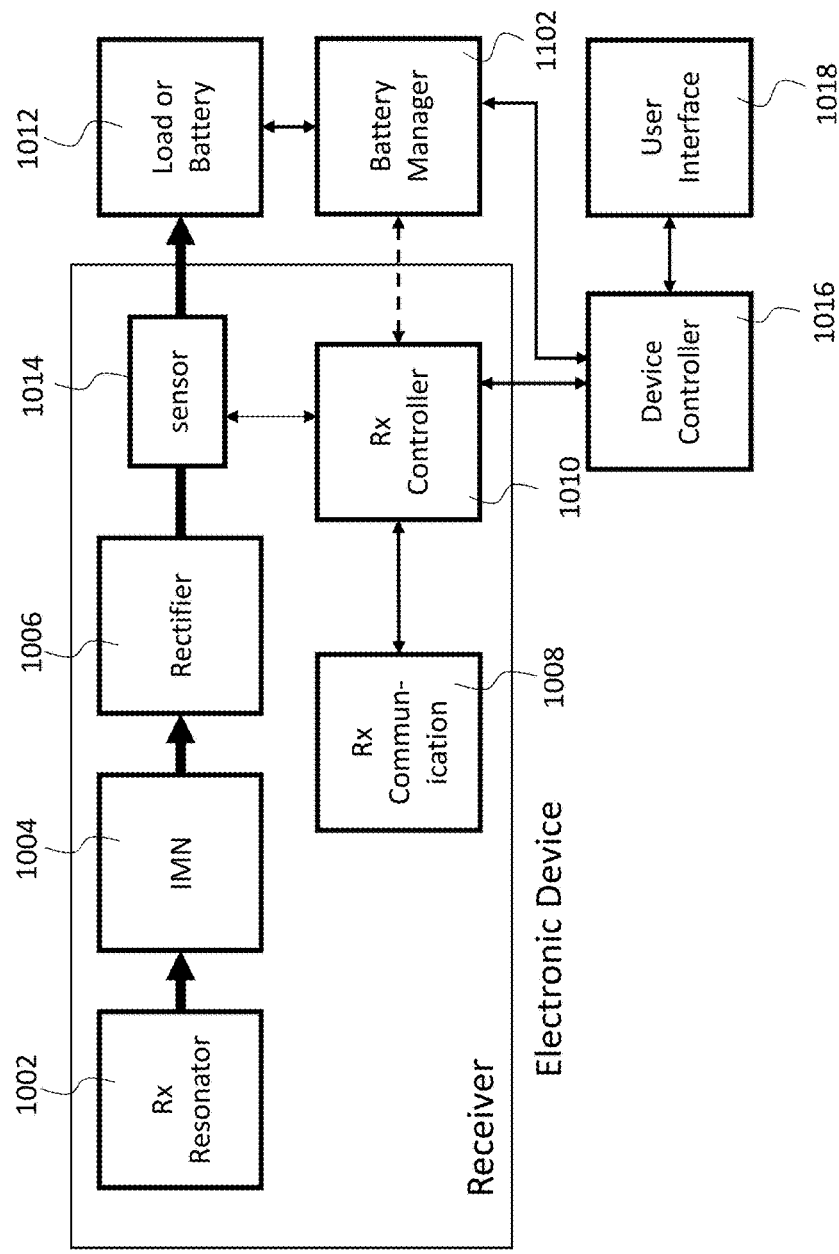
FIG. 11 is a schematic diagram that shows another example of a wireless power receiver coupled to a mobile electronic device.

FIG. 11 shows a schematic diagram of an embodiment of a wireless power receiver coupled to device electronics. The device electronics include a battery manager 1102 that manages the battery 1012. The receiver controller 1010 can optionally be coupled to the battery manager 1102. The battery manager 1102 may signal to the receiver controller 1010 and/or to the device controller 1016 that power has decreased. The receiver controller 1010 may then communicate to the device controller 1016 to delay, by time duration $t_1$, notifying the user interface 1018 that power transmission has dropped. In some embodiments, the battery manager 1102 can be positioned in the power path between the rectifier 1006 and battery 1012. The battery manager 1102 can control or regulate the amount of current delivered to the battery 1012. In certain embodiments, the device controller 1016 itself can delay communicating with the user interface 1018 by time duration $t_1$ once detecting that the power to the load 1012 has decreased via the battery manager 1102.

Figure 12A:
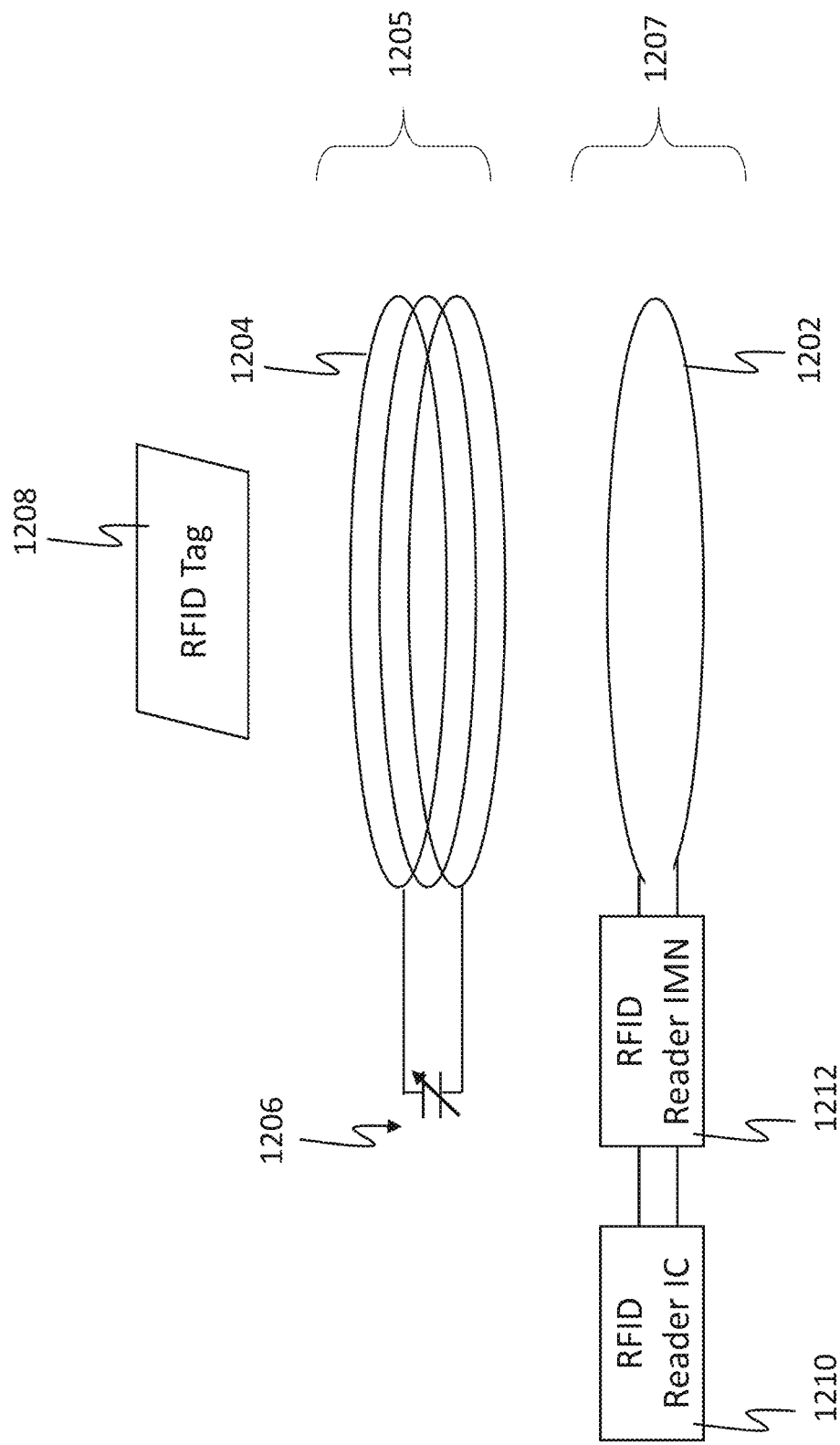
FIGS. 12A and 12B are schematic diagrams that show examples of a wireless power transmitter that couples to a RFID reader system.

FIG. 12A shows an embodiment of a wireless power transmitter coupled to a RFID reader system. The RFID antenna 1202 is inductively coupled to the transmitter resonator coil 1204. This allows for the detection of RFID tags both above and below the transmitter resonator coil (e.g., up to 16 cm above the top surface of the transmitter resonator coil 1204 and 1.5 cm below the bottom surface of the transmitter resonator coil 1204). The transmitter resonator 1205, including the transmitter resonator coil 1204, is configured to resonate at approximately 13.56 MHz. This configuration can be achieved, for example, by changing the capacitance value of the transmitter resonator capacitor 1206. Thus, by inductively coupling to the transmitter resonator 1205, the RFID reader system 1207 can drive the transmitter resonator coil 1204 at approximately 13.56 MHz to effectively detect RFID tags 1208 in its vicinity. This arrangement can increase the detection range of the RFID reader and reduce undesirable interactions between the RFID reader system and the transmitter. For example, if the transmitter system and the RFID system are not inductively coupled, a current induced in the transmitter resonator can cancel some or all of the magnetic field generated by the RFID reader antenna. In some embodiments, the transmitter resonator can be a repeater resonator.

The magnetic field (generated at frequency 13.56 MHz) strength depends on the power from the RFID reader integrated circuit (IC) 1210. In some embodiment, for example, RFID IC 1210 delivers 3 W or more (e.g., 4 W or more, 5 W or more, 6 W or more, 8 W or more, 10 W or more) of power to the transmitter resonator coil 1204.

In certain embodiments, the RFID reader IC 1210 is coupled to the RFID antenna 1202 via the RFID reader impedance matching network (IMN) 1212. Note that, in some embodiments, the transmitter amplifier is switched out from the transmitter circuit to avoid back-driving current and damaging transmitter components.

Figure 12B:
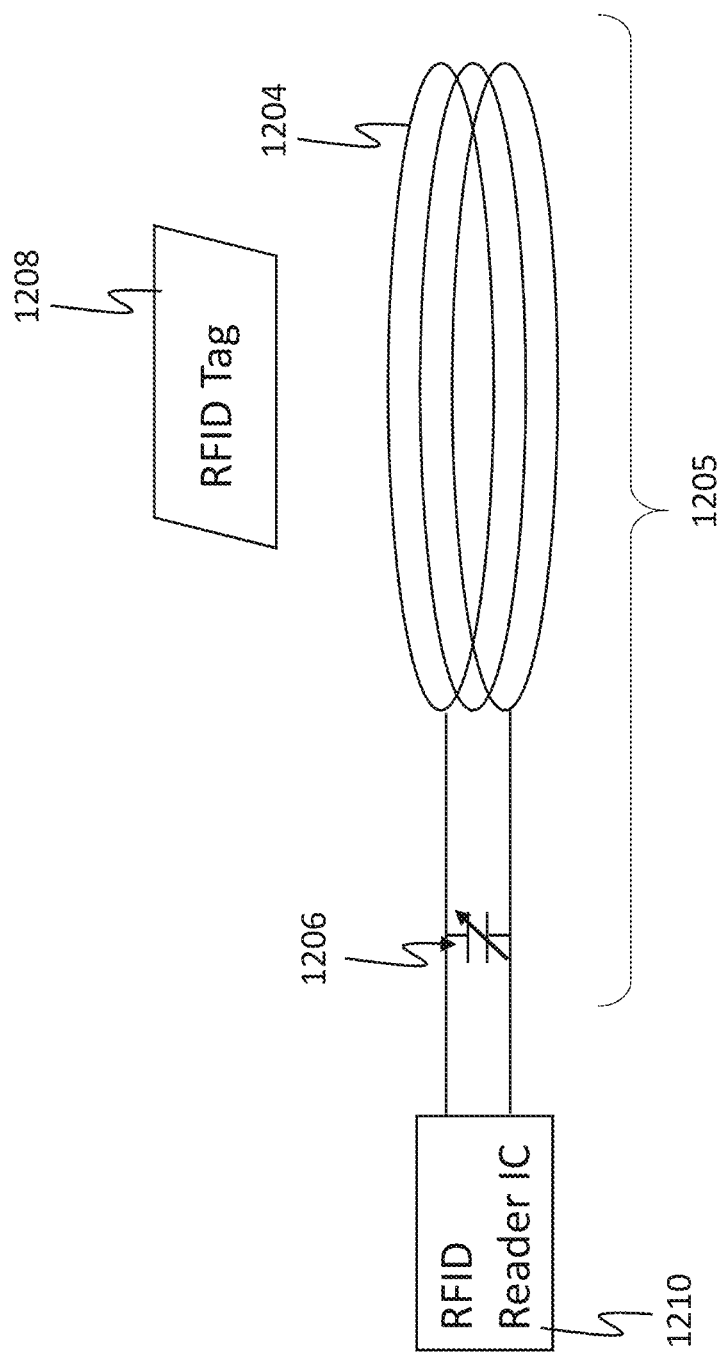

FIG. 12B is a schematic diagram that shows an embodiment of a transmitter resonator 1205 coupled to an RFID reader IC 1210. The RFID reader IC 1210 can directly drive the transmitter resonator 1205 at a frequency to detect RFID tags. For example, the frequency can be 13.56 MHz or any frequency between and including approximately 8-20 MHz or more. In certain embodiments, the transmitter capacitor 1206 can be tuned so that the transmitter resonator 1205 can resonate at 13.56 MHz (or at frequencies within the band 8-20 MHz). Note that a receiver or another object may detune the transmitter resonator 1205 from transmitting power or detecting RFID tags. In such a case, the transmitter capacitor 1206 can also be used to retune the transmitter resonator in response to detuning. Transmitter capacitor 1206 can be adjusted by controller 112, for example.

Figure 13:
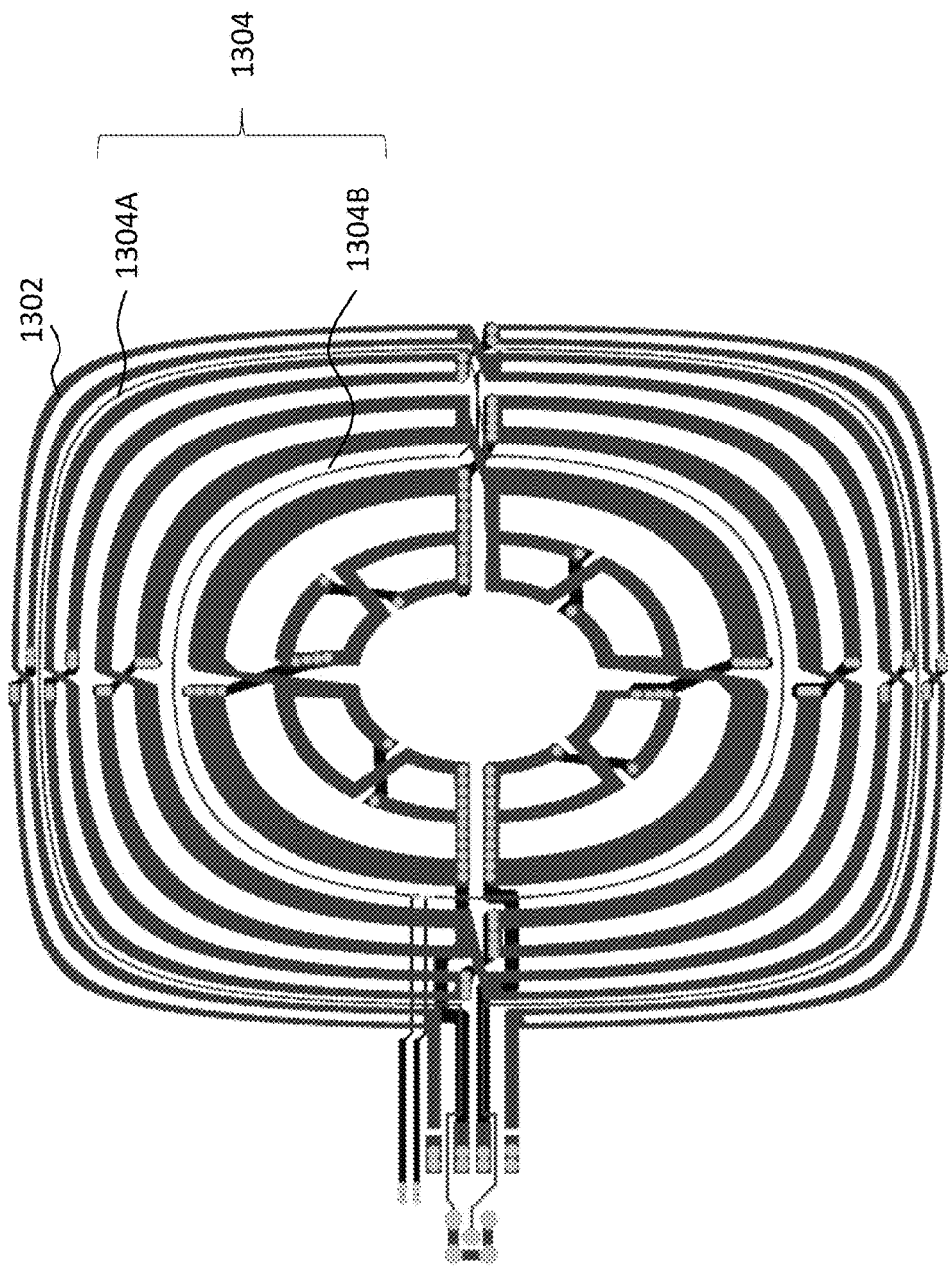
FIG. 13 is a schematic diagram that shows an example of a transmitter resonator coil.

FIG. 13 shows a schematic diagram of a transmitter resonator coil 1302, shown in thicker coil traces. Also shown are the loops belonging to a RFID antenna coil 1304 as thinner traces 1304A, 1304B positioned in between the thicker coil traces of the resonator coil 1302. Note that the RFID antenna coil traces 1304A and 1304B closely follow the shape of the transmitter resonator coil 1302 which allows for high coupling, for example k greater than 0.4, between the two inductively coupled coils 1302 and 1304. In some embodiments, the number of turns of the RFID antenna coil can be determined by the number of turns, $N_{turns}$, in the transmitter resonator coil. For example, the RFID antenna coil can have 1 to $N_{turns}$. In certain embodiments, the number of turns of the antenna coil affects the strength of coupling between the antenna coil and the transmitter resonator coil.

In some embodiments, the resonant frequency $\omega_{RFID}$ of the RFID detection system may be approximately equal to the resonant frequency $\omega_{Tx}$ of the tuned transmitter resonator coil. In certain embodiments, the difference between $\omega_{RFID}$ and $\omega_{Tx}$ may be maintained at 500 Hz or less (e.g., 300 Hz or less, 100 Hz or less, 50 Hz or less, 25 Hz or less) to avoid additional resonances at a frequency $\omega_{RFID}$ and $\omega_{Tx}$.

FIG. 14A shows a schematic diagram of an embodiment of a transmitter controller coupled to a RFID reader. The controller 1402 controls switches 1408 to switch in and out the RFID antenna 1410. In some embodiments, the transmitter controller 1402 is coupled to a RFID reader electronics (including a reader integrated circuit (IC) 1404) via a universal asynchronous receiver/transmitter (UART) connection. The switching mechanism may be a relay or transistors (such as FETs) and may be employed to avoid loading the transmitter resonator and to avoid damage to the RFID reader IC 1404 during power transmission. The RFID reader IC 1404 is coupled to the RFID antenna 1410 via the RFID IMN 1412. In certain embodiments, there may a power supply 1414 (5V, approximately 120 mA) is connected to the RFID reader IC 1404 via the transmitter controller 1402. In some embodiments, a direct power supply is connected to the RFID reader IC 1404. The power supplied may be 10 mW or more (e.g., 50 mW or more, 100 mW or more, 500 mW or more, 1 W or more, 2 W or more, 5 W or more, 10 W or more, or even more).

FIG. 14B shows a schematic diagram of an example of a power transmitter 1416 and RFID reader system 1418. Note that transmitter resonator coil 1420 and the RFID antennas 1422A, 1422B are inductively coupled (as shown in FIG. 13). Switches S1 and S2 are used to control which of the RFID antennas 1422A and 1422B are used to inductively drive the transmitter resonator coil 1420. As shown in FIG. 14A, controller 1402 can control these switches 1408 (S1, S2).

Figures 15A, 15B:
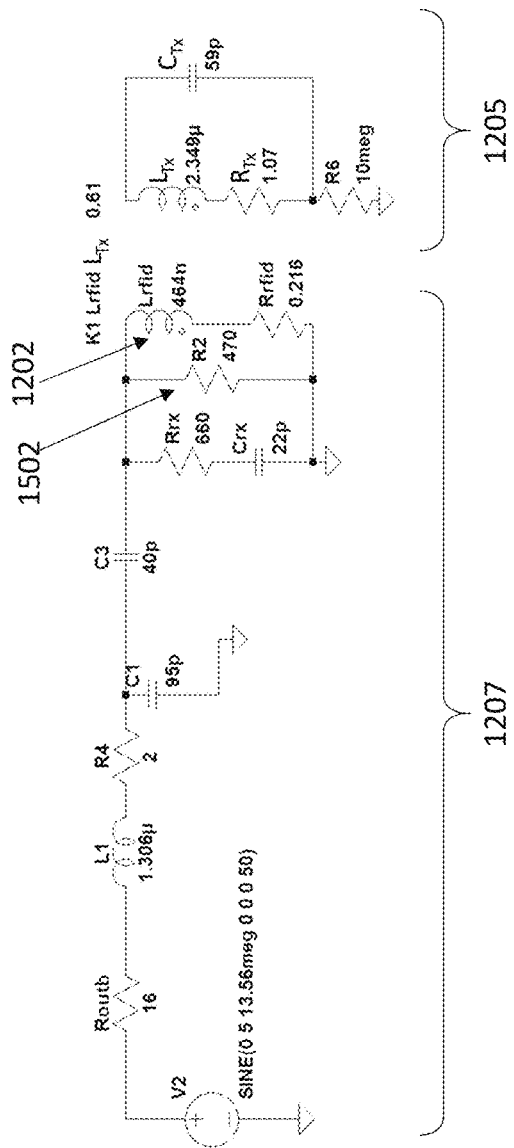
FIGS. 15A and 15B are schematic diagrams that show examples of a RFID reader circuit and a transmitter resonator.

FIG. 15A shows a schematic diagram of an example of the transmitter 1205 and RFID reader 1207 systems shown in FIG. 12A. In certain embodiments, the quality factor $Q_{Tx}$ of the transmitter resonator 1205 may be too high to effectively query and detect RFID tags, as it may be difficult to switch transmitter resonator 1205 quickly enough to properly modulate the power transmission field to query the tags. The reduction of the Q of the overall system (and thus, the transmitter resonator $Q_{Tx}$) can be achieved by connecting in parallel a resistor 1502 to the RFID antenna 1202.

For example, the detection system (including the RFID reader system and the transmitter system) can detect a sample RFID tag at approximately 4.5 cm above the center of the transmitter resonator coil. The magnetic field at 4.5 cm away from the center of the top surface of the transmitter resonator coil is approximately 2.3 A/m. For comparison, the magnetic field level at the top surface of the center of the transmitter resonator coil (e.g., at a spacing of zero cm) is approximately 8.9 A/m. The field strength at the top surface may be too high for an RFID tag to occupy without sustaining damage.

Near the edge of the surface of the transmitter resonator coil, the lowest field level is approximately 1.5 A/m. Accordingly, closer to the edge of the transmitter resonator coil, detection is possible to a spacing between the transmitter resonator coil and the RFID tag of approximately 3.5 cm. In certain embodiments, RFID tags can respond to queries from the system shown in FIG. 14 up to 7.5 cm from the transmitter resonator coil surface.

FIG. 15B is a schematic diagram showing the transmitter and RFID reader systems of FIG. 12A. In FIG. 15B, to lower the overall system Q, resistor 1504 can be coupled to the transmitter resonator 1205. The current in the transmitter resonator coil is also low enough (approximately 106 mA) to prevent back-driving of transmitter power electronics. In certain embodiments, the resistor can be switched out (e.g., by opening a switch connected to a transmitter controller) when the transmitter returns to transmitting working power to a receiver.

Figure 16:
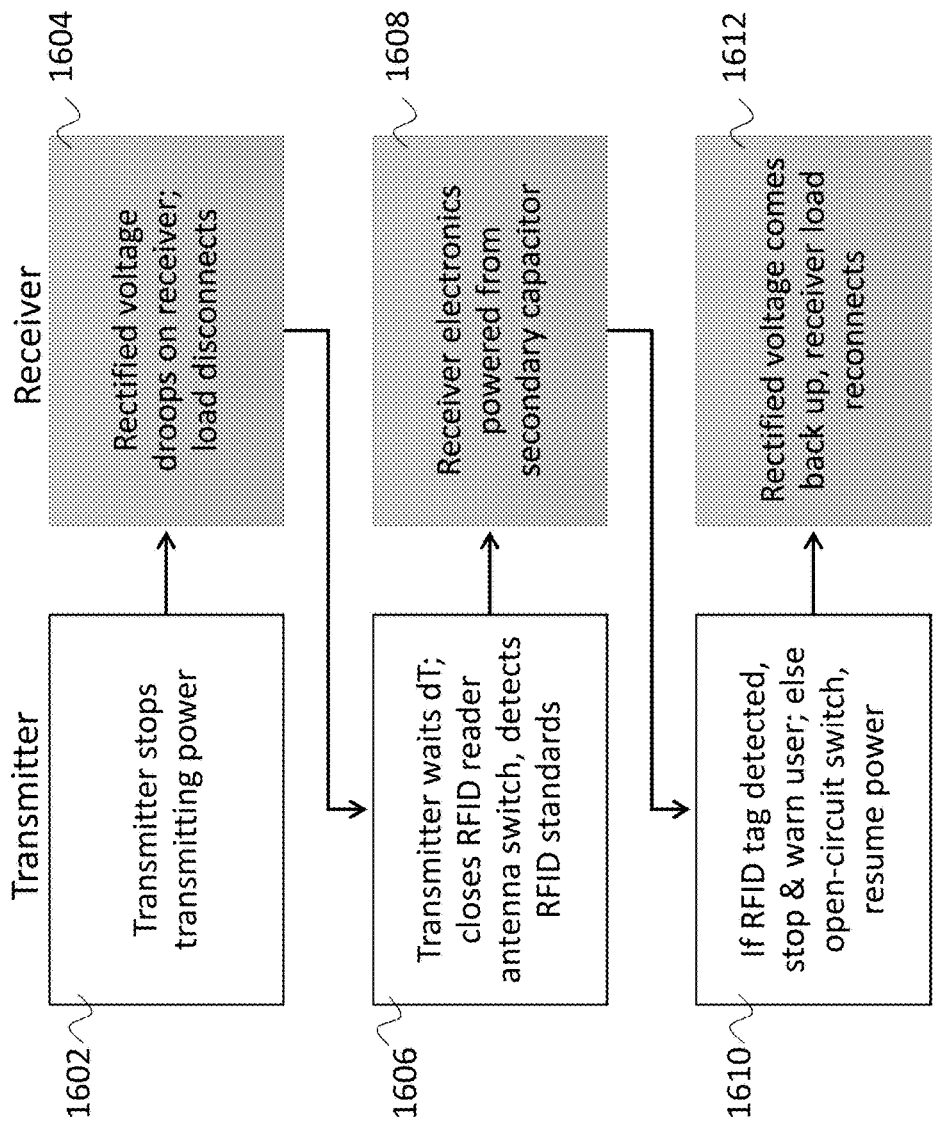
FIG. 16 is a flowchart showing a series of steps for detecting a RFID tag.

FIG. 16 is a flow chart that includes a series of steps for implementing RFID tag querying. In this example, the transmitter determines when to stop power transmission to query for RFID tags. At first step 1602, the transmitter stops transmitting power, sometimes after receiving a control signal from the transmitter controller 112. At step 1604, the rectified voltage at the receiver "droops" (decreases) and the load disconnects due to the suspension of power transmission. Next, at step 1606, the transmitter waits for a time period dT. The RFID reader coil is switched in and the RFID standards are queried by the RFID reader IC, as discussed previously.

During this time, at step 1608, the receiver electronics can optionally be powered from a capacitor within or connected to the receiver. The capacitance value of this capacitor is typically selected to be large enough to "ride" the receiver electronics through the drop in transmitted power. At step 1610, if an RFID tag is detected, the system does not continue to transmit power and warns the user. If an RFID tag is not detected, the RFID reader antenna is switched out and power transmission is resumed. At step 1612, the rectified voltage returns to a range that is expected for power transmission and the receiver load reconnects. In certain embodiments, the load at the receiver may not be electrically disconnected.

Figure 17A:
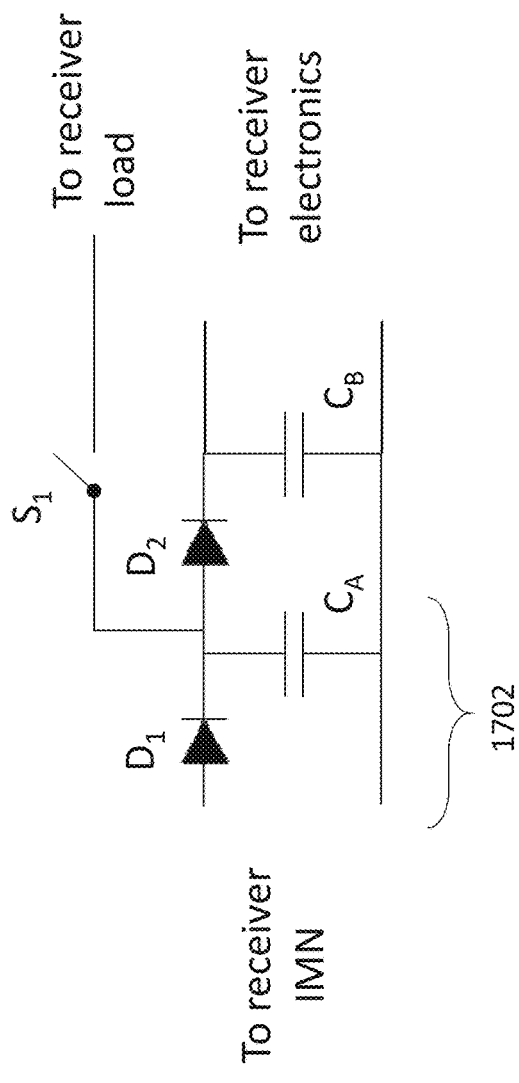
FIGS. 17A and 17B are schematic diagrams that show examples of portions of a wireless power receiver.
Figure 17B:
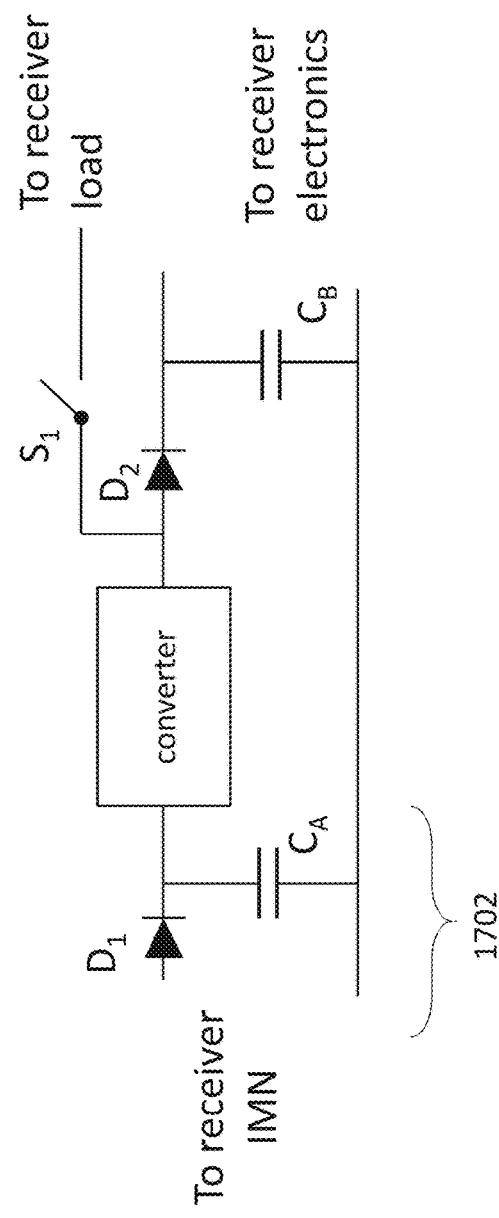

FIGS. 17A and 17B are schematic diagrams of portions of the receiver circuitry in which a capacitor is connected to the receiver to reduce or prevent "drooping" of the voltage powering the receiver electronics. Components $D_1$ and $C_A$ represent the rectifier 1702 of the receiver. As the voltage at capacitor $C_A$ drops below a threshold level, the receiver load (such as the battery of a mobile device) is not able to draw power and stops charging. Meanwhile, $C_B$ provides a reserve of voltage for certain electronics of the receiver, such as a wireless communication transmission/receiving interface (examples include Bluetooth, WiFi, and radio) and controller. Diode $D_2$ prevents the back-driving of the rectifier 1702, and prevents the draining of energy from capacitor $C_B$, which is used to power the receiver electronics through power interruption. FIG. 17B includes a converter positioned between the rectifier and the switchable load connection. In embodiments, the transmission/receiving interface and/or controller, along with $D_2$ and $C_B$, can be connected directly after $D_1$.

Figure 18:
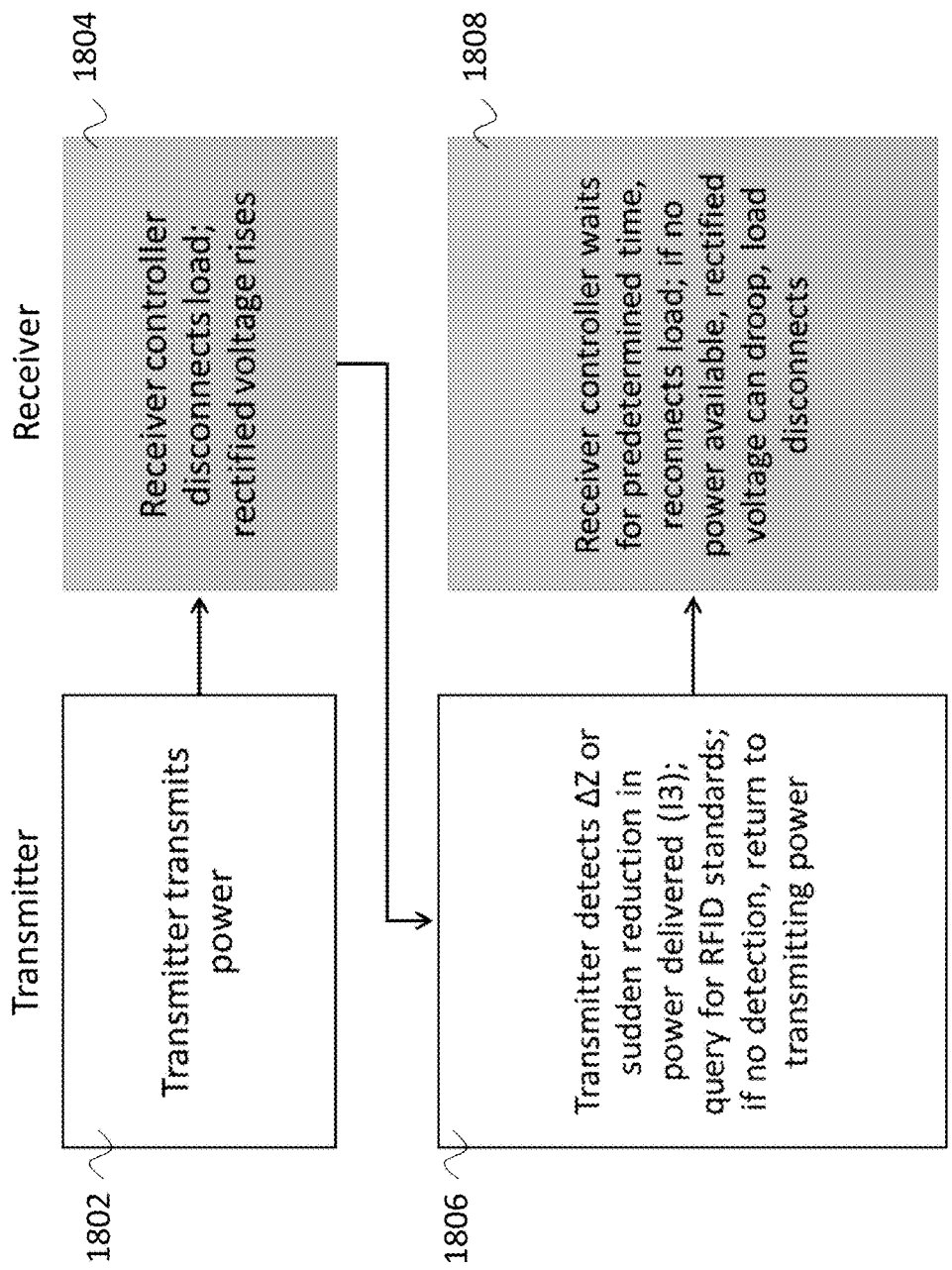
FIG. 18 is a flowchart showing a series of steps of a receiver initiated RFID detection scheme.

In some embodiments, power interruptions to the receiver may be triggered by the receiver. For example, the transmitter may monitor for an impedance shift or a change in power draw to trigger an interruption to power transmission. During this time, an out-of-band signaling connection (such as Bluetooth, WiFi, or a radio channel signaling between the transmitter and receiver) can be maintained. FIG. 18 shows a flowchart that shows a series of steps for implementing RFID tag querying in which the receiver determines when power transmission should stop to query for RFID tags. At step 1802, the transmitter transmits power to the receiver. At step 1804, the receiver controller disconnects its load. At this stage, the rectified voltage can rise due to a lack of draw from the load. At step 1806, the transmitter detects a change in impedance ($\Delta Z$) or a reduction in delivered power. In some embodiments, the transmission system can be configured to query for RFID tags periodically, for example, every 500 milliseconds or more (e.g., every 750 milliseconds or more, every 1 second or more, every 2 seconds or more, every 5 seconds or, or even more).

If a change in impedance or a reduction in delivered power is detected, then the transmitter can warn the user and cease transmitting any further power. If there is no such detection, the transmitter can return to transmitting power. At step 1808, the receiver controller waits for a predetermined time and then reconnects the load. If no power is available for reception, then the voltage can droop. At this time, the load disengages. Note that if, as a part of the above sequence, the receiver reports zero (or nearly zero) current at its output when the transmitter stops transmitting power and/or the receiver disconnects the load, the transmitter can be configured to treat this information as part of the routine of checking for RFID tags and not as an indication of an error state or the receiver being removed away from the transmitter's vicinity.

In certain embodiments, RFID tags may be detected by RFID readers pre-installed on mobile devices. For example, smartphones can have NFC or RFID readers installed on the back side of the phone. Thus, an RFID tag positioned between the phone back and the transmitter resonator can be detected. This includes scenarios where the RFID tags are positioned in phone sleeves. In a situation where the mobile device detects an RFID tag, the device can send a signal to the transmitter to prevent the start of power transmission (for example, using the method shown in FIG. 18). In some embodiments, the mobile device can notify the user that an RFID tag is present in the vicinity of power transmission. In certain embodiments, the transmitter, having received an affirmative signal from the receiver, can notify the user that an RFID tag is present by, for example, LED indicators, sounds, etc.

In certain embodiments, receivers can include RFID reader circuitry to detect RFID tags. For example, a RFID reader integrated circuit, components such as capacitors, inductors, and switches, and an antenna can be positioned at the back and inside the housing of a mobile electronic device, such as a smartphone or laptop. The RFID reader circuitry may be co-located with the receiver circuitry. In some embodiments, the RFID reader IC and components may be switchably connected to the receiver coil to interrogate RFID tags. This can decrease the number of components, such as antennae, in the mobile electronic device.

In some embodiments, mobile devices internally equipped with RFID or NFC tags may be detected using any of the techniques described herein by either the transmitter or the RFID reader system. For such mobile devices that are not expected to be damaged in strong magnetic fields, the mobile device can communicate with the wireless power transmitter, indicating that the mobile device is within the active area of the power transmitter and that it is equipped with an RFID or NFC tag. This indication can allow the power transmitter to "white list" the mobile device. In other words, the power transmitter can continue to transmit power in the presence of such a mobile device. Note that, in some embodiments, the mobile device can also be equipped with a wireless power receiver, and can be configured to receive operating and/or charging power wirelessly from the transmitter while not sustaining damage to other components such as the internal RFID or NFC tag.

VI. Detecting and Identifying RFID Tag Signatures

Another method for detecting and identifying RFID tags in proximity to wireless power transfer systems involves measuring reflected impedance at the transmitter, and determining whether the reflected impedance has properties that match a signature of an RFID tag.

To detect RFID tags in this manner, the frequency of the transmitter resonator is varied to excite the RFID tag's resonance. The measurement of one or more parameters (e.g., voltage, current, power) of the transmitter resonator reflect the effect of exciting the tag's resonance, and function effectively as a "signature" of the RFID tag.

To excite an RFID tag, the transmitter controller 112 can drive the transmitter resonator from between approximately 12-16 MHz (or any other RFID tag resonant frequency, including 8-20 MHz). FIG. 19 shows a wireless power transmitter 1900 including an amplifier 1902 (with switches S1, S2, S3, and S4) driving a transmitter resonator and impedance matching circuit 1904. The transmitter resonator and impedance matching circuit 1904 includes inductor L1 coupled in series to capacitor C1 and in parallel to capacitor C2. The circuit 1904 includes in series an inductor L3. The controller 1906 can be coupled to any or all of these components to vary their values or switches. Further, current, voltage, or power can be monitored at various points in the circuit. For example, the current monitor M1 positioned near L1 and C1 and current monitor M2 positioned between C2 and the amplifier. In some embodiments, switches of the transmitter amplifier 1902 can be driven such that the operating frequency of the amplifier can be varied.

In certain embodiments, the transmitter resonator may be driven by a switching amplifier (either half-bridge or full-bridge), such as the amplifier 1902 shown in FIG. 19, including transistors acting as switches. The controller can switch these transistors at frequencies such that currents and/or voltages at harmonic frequencies are generated. For example, for a switching amplifier that is designed to switch at 6.78 MHz, the switching frequency can be decreased to 6 MHz. The controller 1906 can control the switches of this amplifier 1902 at 6 MHz such that some energy oscillates at its 2nd harmonic, 12 MHz. In another example, in order to drive the transmitter resonator with 15 MHz of alternating current, the switching frequency may be decreased to 5 MHz and the switching can be configured such that some energy oscillates at the 3rd harmonic, 15 MHz.

In certain embodiments, the transmitter can control the switches such that frequencies from 6.78 MHz and lower are "scanned" to excite nearby objects. Note that the energy needed to cause a detectable change in reflected impedance in the transmitter from an object in its vicinity may be microwatts to milliwatts in magnitude. The reflected impedance can then be measured at the transmitter; for example, currents I1 at the resonator and I3 in the transmitter impedance matching network can be measured. In some embodiments, impedance may be measured by calculating the ratio of voltage at the output of the amplifier and the current at the output of the amplifier. The measurement of the "signature" reflected impedance for a suspected RFID tag can be compared against known signatures or determined to fall within a range indicative of or associated with RFID tags. In certain embodiments, the transmitter controller 112 can determine if the reflected impedance is the signature of an RFID tag, a receiver, a foreign object, etc. by performing the above comparison to known reflected impedance signatures and/or reflected impedance ranges.

Figures 20A, 20B:
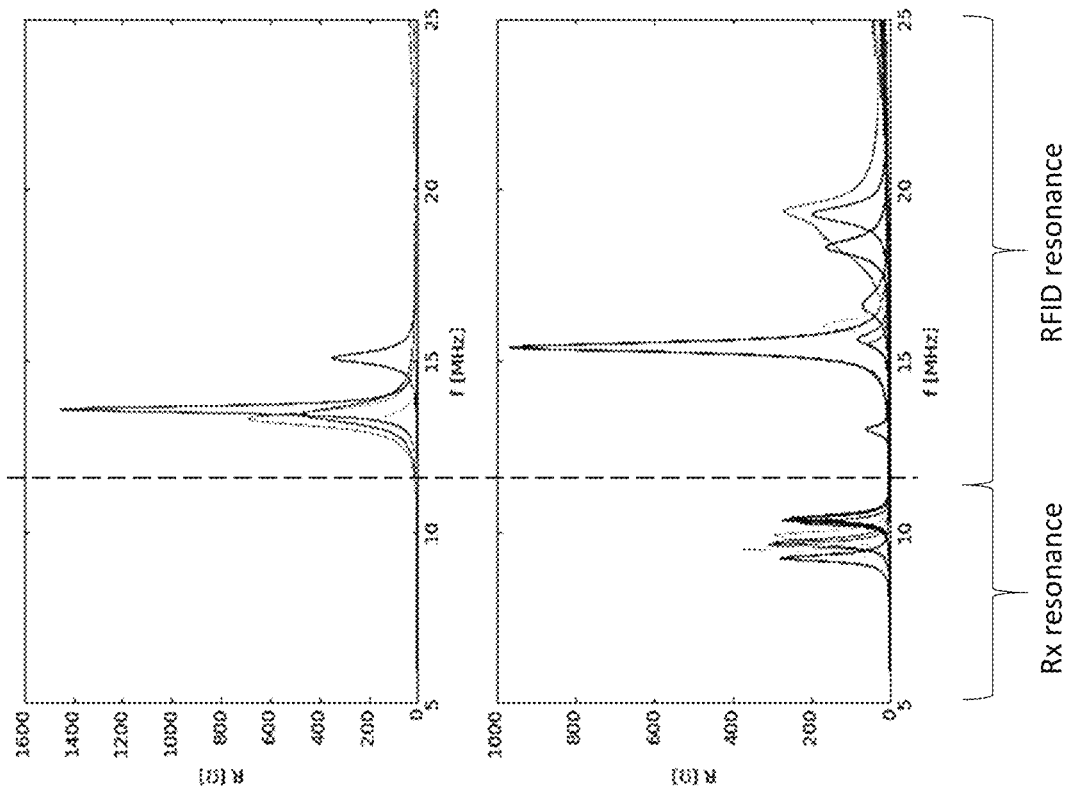
FIGS. 20A and 20B are plots showing measured reflected impedance as a function of frequency for various RFID tags and wireless power receivers at a short distance from a wireless transmitter.

FIGS. 20A and 20B show the reflected resistance R[Ω] measurements of various RFID tags and wireless power receivers at 5 mm distance from the transmitter and/or antenna coil (example shown in FIG. 13) as a function of frequency (MHz). For example, FIG. 20A shows that several RFID tags have resonances within a range of approximately 12 MHz to 17 MHz. FIG. 20B shows a delineation between the resonance frequencies of receiver resonators and RFID tag antennas. For example, the receiver resonances are within an approximate range of 8 to 12 MHz while the RFID tag resonances are in the approximate range of 12 to 22 MHz. Thus, by scanning a band of resonant frequencies, the transmitter can differentiate a receiver from an RFID tag.

Figures 21A, 21B:
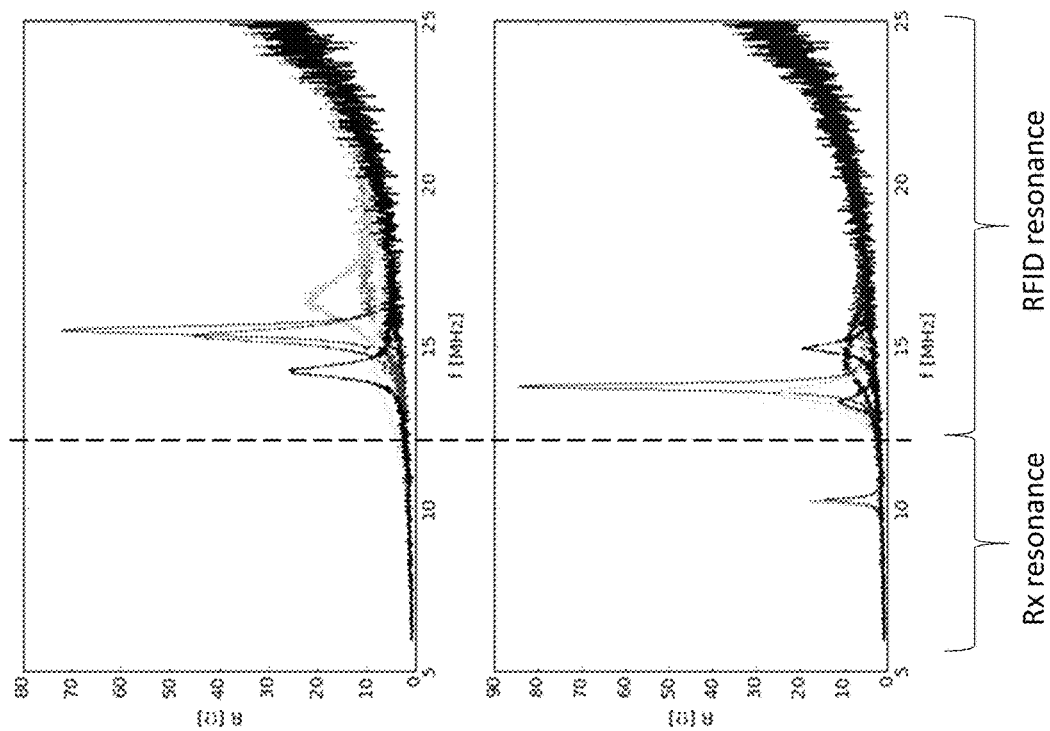
FIGS. 21A and 21B are plots showing measured reflected impedance as a function of frequency for various RFID tags and wireless power devices at a longer distance from a wireless power transmitter.

FIGS. 21A and 21B show the reflected resistance R[Ω] measurements of various RFID tags and wireless power receiver at 50 mm distance from the transmitter and/or antenna coil (example shown in FIG. 13) as a function of frequency (MHz). For example, FIG. 21A shows that several RFID tags have resonances within a range of approximately 12 MHz to 18 MHz. FIG. 21B shows a delineation between the resonances of receiver resonators and RFID tags. For example, the device resonances are within an approximate range of 10 to 12 MHz while the RFID tag resonances are in the approximate range of 12 to 17 MHz. Note that the measurements of FIGS. 21A and 21B can be noisier than those shown in FIG. 20A-20B due to the measurements being made at 50 mm from the coil(s) as compared to 5 mm from the coil(s).

Figure 22A:
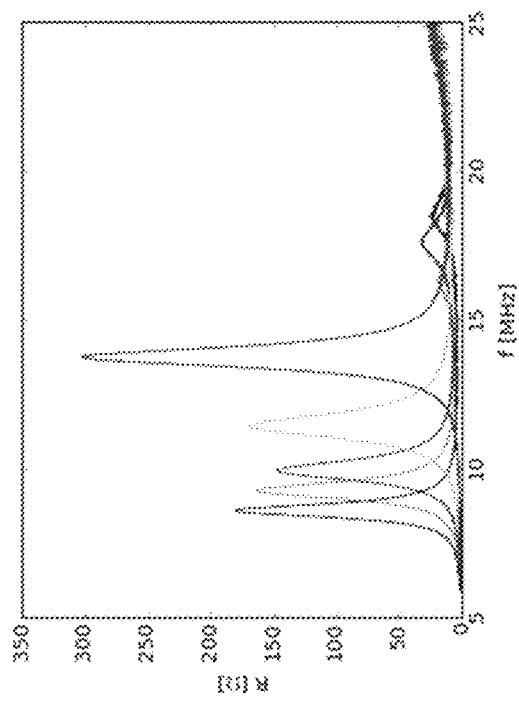
FIGS. 22A and 22B are plots showing impedance as a function of frequency for various RFID tags.
Figure 22B:
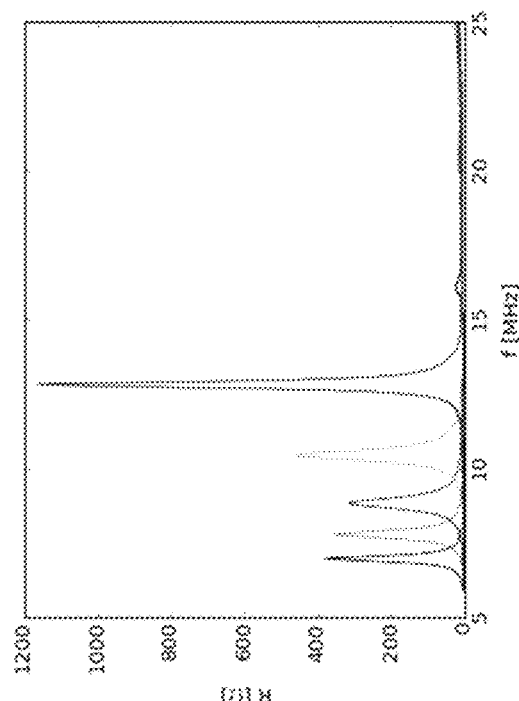

FIGS. 22A and 22B show resistance R[Ω] measurements of stacks of RFID tags at a distance of 5 mm from the transmitter and/or antenna coil. As shown in FIG. 22A (stack of ISO 14443A RFID cards) and FIG. 22B (stack of FeliCa RFID cards), the resonance frequencies of the RFID tags are in the range of 7 to 20 MHz and 7 to 17 MHz, respectively. Note that these ranges overlap with the receiver resonance frequencies given in FIGS. 20A and 20B and FIGS. 21A and 21B.

Figure 23A:
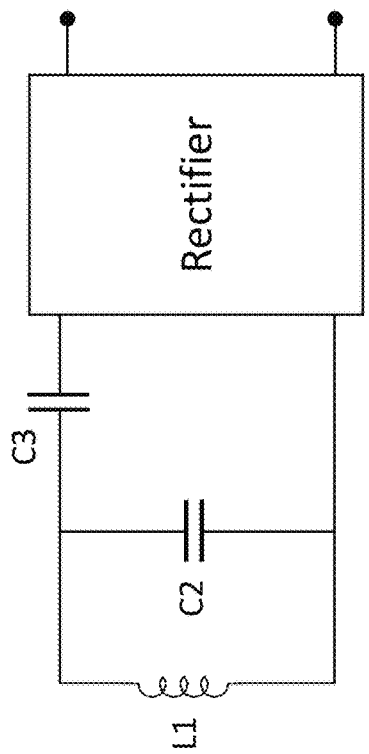
FIGS. 23A and 23B are schematic diagrams that show examples of receiver circuitry.
Figure 23B:
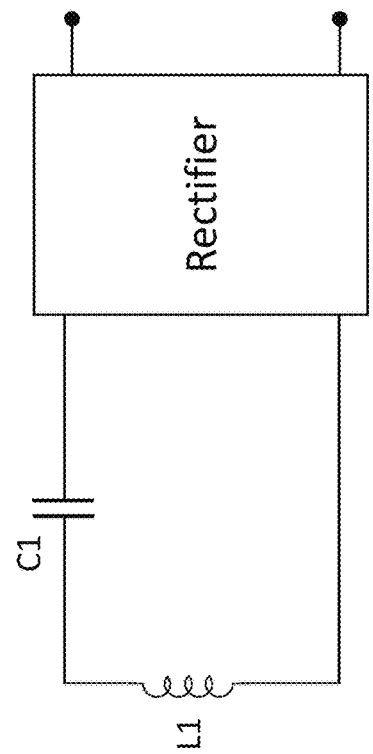

Certain types of impedance matching in the receiver may appear similar in "signature" as RFID tags. For example, C2-C3 matching on the receiver may be such a case. As shown in FIG. 23A, C2-C3 matching includes a capacitor C2 coupled in parallel to resonator coil L1 and a capacitor C3 coupled in series between C2 and the rectifier. In order to differentiate this case from an RFID tag, C2 of the receiver matching network may be assigned a minimal value or the receiver may be series matched (as shown in FIG. 23B). In the series matched receiver example, capacitor C1 is coupled in series to the resonator coil L1. At low power, there is little to no current induced in the receiver resonator. At higher power levels, resonance can be near 6.78 MHz. In some embodiments, it may be desirable to keep the receiver resonator resonance at a frequency other than the RFID tag resonance. The below relationship sets a resonant frequency $\omega_{Rx}$ for the receiver resonator below approximately 10 MHz:

$$\omega_{Rx}=1/\sqrt{L_1 C_1}<1.5\times\omega_0$$

where $\omega_0=2\eta\times 6.78$ MHz.

An advantage of this method is that extra components such as RFID reader IC and/or antenna are not required to detect RFID tags. In other words, a wireless power transmitter configured to scan multiple resonance frequencies can excite RFID tags without additional circuitry and measure their resonance frequencies resulting in an affirmative detection. This results in less cost and less overall bulk or footprint for detection capability in a wireless power transmission system. Further, because specific RFID standards do not need to be queried, the detection can be completed as quickly as 50 ms or less (e.g., 40 ms or less, 30 ms or less, 20 ms or less, 10 ms or less). This additional benefit can reduce any negative impacts of RFID detection to power transmission efficiency.

To ensure that the energy at the harmonic frequencies from the amplifier 1908 are not attenuated, switches may be built into the transmitter to temporarily remove capacitors from the power path. FIG. 24A shows switches 2402 and 2404 closed to allow the transmitter in a normal operating state to transmit power to a receiver. In FIG. 24B, switches 2402 and 2404 are open while switch 2406 closes to create a circuit of multiple inductors connected in series (effectively one large inductor). This can allow for greater power transmission at the harmonic frequencies as discussed above. In certain embodiments, it may be sufficient to open switch 2402 while closing both 2404 and 2406 or to open switches 2402 and 2406 while closing switch 2404.

Figure 25:
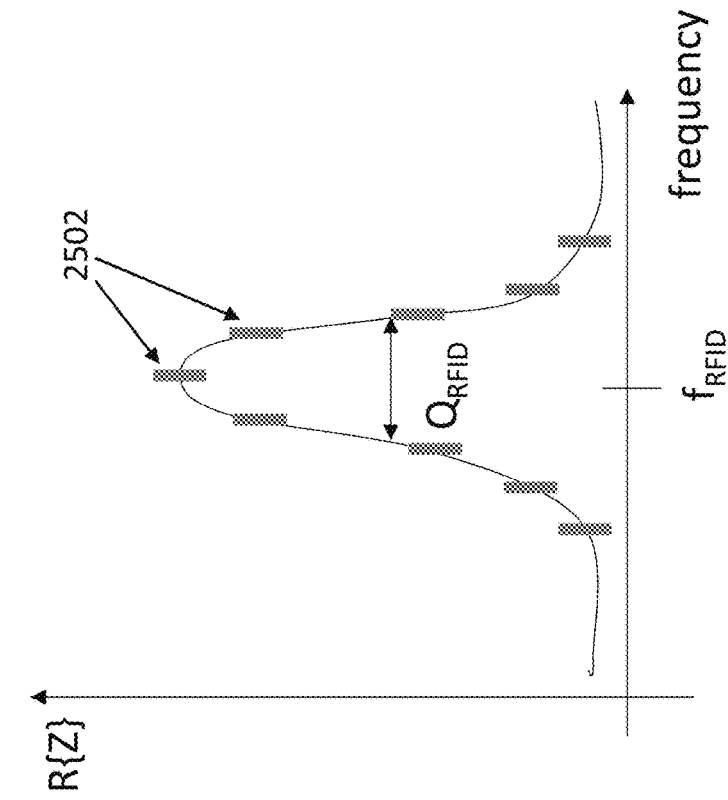
FIG. 25 is a plot of impedance as a function of frequency for a RFID tag.

FIG. 25 shows an example of the real part of the reflected impedance R{Z} peak in the frequency domain in which the width of the peak is determined by the quality factor $Q_{RFID}$ of the RFID tag centered at the resonant frequency $f_{RFID}$ of the particular RFID tag. Note that the resolution 2502 needed to resolve this peak is determined by the quality factor of the RFID tag whereas the resolution 2502 achievable for the transmitter to detect this peak is determined by the switching of the drivers in the amplifier 1908.

Figure 26:
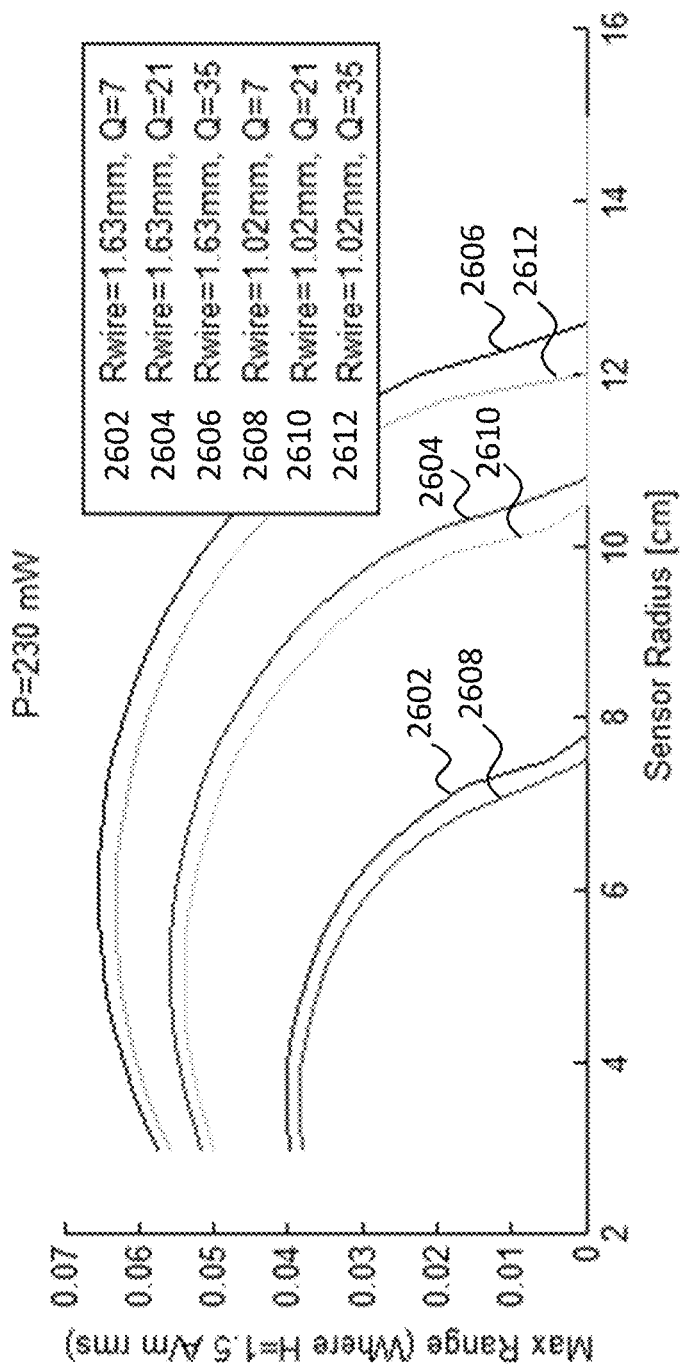
FIG. 26 is a plot showing measurements of detection range as a function of antenna radius for different RFID readers.

In some embodiments, detection of an RFID tag can be limited by the output power of the RFID reader integrated circuit (IC). For example, the more power the reader IC can transmit, the greater the range of detection. FIG. 26 shows the detection range as a function of RFID antenna radius ($R_{wire}$) and quality factor (Q). Table 2 below shows examples of plotted lines for different wire radii and quality factors. In embodiments, for an output power level of 230 mW, the reader may be able to detect in the range of 0 to 7 cm.

TABLE 2

Reproduction of legend for plot in FIG. 26 of maximum range (in meters) as a function of sensor coil radius (cm) for a magnetic field strength H = 1.5 A/m rms.

| Ref #. | Wire radius | Quality factor |
|---|---|---|
| 2602 | 1.63 mm | Q = 7 |
| 2604 | 1.63 mm | Q = 21 |
| 2606 | 1.63 mm | Q = 35 |
| 2608 | 1.02 mm | Q = 7 |
| 2610 | 1.02 mm | Q = 21 |
| 2612 | 1.02 mm | Q = 35 |

In some embodiments, RFID tags respond to reader queries at a transmitting frequency of 6.78 MHz. However, the dynamic range of magnetic field that elicits the response is reduced as compared to, for example, 13.56 MHz. Per the ISO 14443 specification, RFID tags can respond to a magnetic field with strength 1.5 A/m-7.5 A/m (dynamic range of 5:1) at 13.56 MHz. Thus RFID tags can be queried at a single magnetic field level, with a response expected both close to the RFID antenna (with a high field level) and far from the RFID antenna (with a low field level). In some embodiments, however, at 6.78 MHz, the response dynamic range is reduced to approximately 2.25:1. To compensate for the reduced dynamic range at 6.78 MHz, one can query at several (greater than or equal to 3) different field levels (e.g., field amplitudes). For example, a reader operating 6.78 MHz can first query for tags a first field level B1. Next, the reader can query at a second field level B2 (>B1). Then, the reader can query at a third field level B3 (>B2) and so on to detect tags at different positions relative to the reader antenna and/or transmitter.

In some embodiments, an object may be placed on or near the wireless power transmitter which detunes the transmitter resonator coil and/or the RFID antenna coil. The object may be a non-charging object (such as a foreign object or an electronic device without wireless power reception capabilities) or a wireless power receiver. Objects without wireless power reception capabilities are referred to as "rogue" objects in FIG. 1.

To mitigate this detuning, the quality factor of the transmitter resonator coil, $Q_{Tx}$, and/or the RFID antenna coil, $Q_{RFID}$, can be reduced. For example, if the current in the transmitter resonator coil is greater than the RFID antenna coil, then the quality factor of the transmitter resonator coil $Q_{Tx}$ can be reduced, e.g., by switching in a resistor (see FIGS. 15A and 15B). If the current in the RFID antenna coil is greater than the transmitter resonator coil, then the quality factor of the RFID antenna coil $Q_{RFID}$ is reduced. Note that the current discussed here is the current in a coil that generates the detection magnetic field. In some embodiments, the transmitter resonator and/or RFID antenna can employ tuning to compensate for the detuning. For example, the transmitter resonator may include a tunable capacitor that can be tuned to compensate for the inductance shift of the transmitter resonator coil.

In some embodiments, the transmitter can detect changes in the harmonics of the power transmission frequency, 6.78 MHz. For example, second harmonics and higher (including even and odd harmonics) of 6.78 MHz can be monitored by the transmitter to determine if an RFID tag is present during a low power mode or during power transmission mode. For example, when an RFID tag is placed on a transmitter during power transmission, voltage induced on the RFID tag antenna can exceed the designed specifications of the RFID tag components. Some of these components—the rectifier, clamp, and/or capacitor(s)—can cause an increase in higher harmonics, including the 3rd, 5th and 7th harmonics of the 6.78 MHz. To detect the presence of an RFID tag within the "impact zone", the transmitter can measure these harmonics and interrupt power transmission to avoid harm to the RFID tag. In some embodiments, since the amplifier may produce these higher harmonics out of phase with the harmonics generated by the RFID tag (via destructive interference), the power at any given harmonic may decrease instead of increasing. For comparison purposes, the fundamental can also be measured to determine whether this effect is occurring.

In certain embodiments, the changes in the higher harmonic spectrum may be measured using one or more pickup loops, or at the transmitter resonator coil voltage and/or current. Transmitter resonator coil current and voltage measurements may be compared against current and/or voltage measurements in the L3 inductor to ensure that increases in higher harmonics are not attributed to the amplifier. For example, detection of a possible RFID tag in this case can include the detection of a change in one or more harmonics, detection of a change in the ratio of these harmonics, or detection of a change over time in these harmonics. The voltage across the transmitter resonator coil or current through the resonator coil can be measured at any, some, or all harmonics. Possible changes in harmonics over time could be due to changes in the nonlinear properties of components as they heat.

In certain embodiments, filters can be used to suppress unnecessary or undesired harmonics from the amplifier or at the detection circuitry for a cleaner processing of signals. This eliminates potential sources of harmonic content that are independent from the presence of RFID tags. In some embodiments, low pass or band pass filters can be added to the transmitter, for example, between the amplifier and matching network, to eliminate unwanted harmonics from the amplifier and/or converter. Trap filters configured to filter signals at, for example, 13.56 MHz and 20.34 MHz can be used at the output of the amplifier (operating at 6.78 MHz).

RFID tags typically have resonances in the range 8-20 MHz, which is roughly twice (or sufficiently different from) the nominal 6.78 MHz wireless power transmission frequency that is used for powering devices such as laptops, mobile phones, and other electronics. Thus, a convenient method for detecting and identifying RFID tags involves the use of the existing transmitter resonator and other components of the wireless transmitter to scan for RFID tags in proximity to the resonator. This can be accomplished, as discussed above, by shifting the frequency of the magnetic fields generated by the transmitter resonator into a frequency region where RFID tags are typically resonant.

In embodiments, during RFID detection, power transmission to a power receiver is interrupted so that RFID tag detection can occur. If power transmission is interrupted for too long, receiver functions that depend on the flow of power from the transmitter will be interrupted (e.g., charging of a battery, operating functions of a device or load connected to the receiver). However, if the interruption in power transmission is relatively short, the receiver can weather the brief interruptions in power delivery and continue to function normally.

One method of implementing RFID tag detection is therefore to cycle a transmitter between two modes of operation: a power transmission mode in which operating power is transmitted from the transmitter resonator (through generation of a power magnetic field), and a RFID tag detection mode in which the frequency of the transmitter resonator is shifted, and a plurality of detection magnetic fields are generated, each corresponding to a different frequency within a band of frequencies that does not include the frequency corresponding to the power magnetic field. Typically, for example, the band of frequencies is between 8-20 MHz, which corresponds to RFID tag resonances.

The transmitter is continuously cycled between these two modes of operation. The power transmission mode occurs for a time period $t_1$ and the RFID tag detection mode occurs for a time period $t_2$ within each cycle, for a total cycle period of $t_1+t_2$. In some embodiments, for example, the total cycle period is 0.25 s or more (e.g., 0.5 s or more, 1 s or more, 2 s or more, 3 s or more, 5 s or more, 7 s or more, 8 s or more, 10 s or more). In certain embodiments, the total cycle period is between 0.5 s and 2.0 s (e.g., between 0.5 s and 1.75 s, between 0.5 s and 1.5 s, between 0.5 s and 1.25 s, between 0.5 s and 1.0 s, between 0.75 s and 2 s, between 0.75 s and 1.5 s, between 1.0 s and 2.0 s). In some embodiments, $t_2$ is 500 microseconds or less (e.g., 400 microseconds or less, 300 microseconds or less, 200 microseconds or less, 100 microseconds or less).

To assist the receiver to "ride through" periods where the transmitter is in RFID tag detection mode, in some embodiments the receiver can include one or more capacitors connected to the receiver's rectifier. When power transmission is not occurring, the capacitors connected to the rectifier discharge, providing temporary operating power to loads and devices connected to the receiver, thereby helping to bridge short periods where no power is received.

To detect the presence of RFID tags in proximity to the transmitter, the reflected impedance at the transmitter resonator can be measured. This reflected impedance can be due to RFID tags, power receivers, and/or other objects/devices. More specifically, the real part and/or imaginary part of the reflected impedance can be used as a diagnostic to identify the "signatures" of RFID tags. When the transmitter resonator generates a magnetic field within a frequency range that typically corresponds to RFID tag resonances, if no RFID tag is present in proximity to the transmitter resonator, no tag resonance is excited. Accordingly, the overall impedance of the transmitter resonator—which can be referred to as the intrinsic impedance—has an imaginary part (due to the reactance of the resonator components) and a small real part due to some small resistance present, for example, in the resonator coil.

However, when an RFID tag is present in proximity to the transmitter resonator such that the tag's resonance is excited by the field, the overall impedance of the transmitter resonator includes both the intrinsic impedance and a reflected impedance, with the reflected impedance due to the excited RFID tag resonance. The reflected impedance has both real and imaginary parts, and to a good approximation, the real part of the reflected impedance is maximized when the reactance of the tag is zero, which occurs at the resonance frequency of the tag. Thus, the real part of the reflected impedance will have a local maximum or "peak" at the resonance frequency of the excited RFID tag, as shown in FIGS. 20A and 20B. The peaks appear in a portion of the frequency spectrum that is separate from the portion of the spectrum in which peaks due to the receiver appear.

Thus, after the reflected impedance has been measured, a system controller (e.g., controller 112) can determine—based on the location of the peaks in the frequency spectrum—whether an RFID tag is present in proximity to the transmitter. For example, in some embodiments, the controller can compare the frequencies of the local maxima/peaks to reference information for RFID tags that includes resonance frequencies for known tags. In this manner, controller 112 can both detect the presence of RFID tags and, in certain embodiments, identify specific tags based on their particular frequencies. In certain embodiments, the mere presence of peaks in the RFID tag resonance region (e.g., 8-20 MHz) identified by controller 112 is sufficient for the controller to determine that at least one RFID tag is present in proximity to the transmitter.

In some embodiments, the controller compares the peak frequencies to threshold values associated with RFID tags resonances to detect the tags. For example, if the peak frequencies are larger than a particular threshold value associated with a lower limit for RFID tag resonances and/or smaller than another threshold value associated with an upper limit for RFID tag resonances, the controller can determine that one or more RFID tags are present. Finer threshold values can also be defined for specific RFID tags and/or specific types of RFID tags, and the controller can also perform tag identification based on suitably narrow ranges defined by threshold values.

Figure 33:
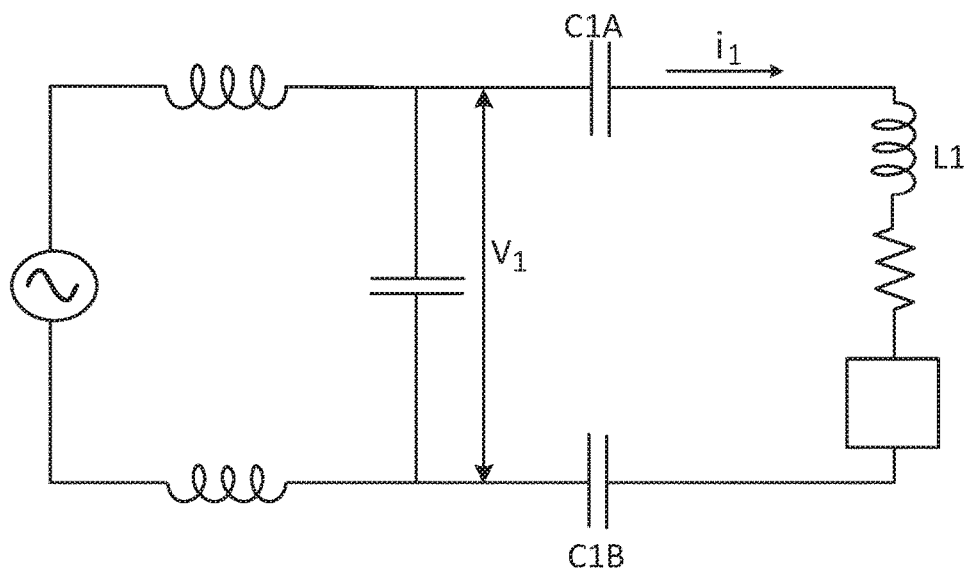
FIG. 33 is a schematic diagram of an example of a wireless power transmitter, showing voltage and current measurements that are used to determine the reflected impedance of a transmitter resonator.

To measure the impedance of the transmitter resonator, three measurements are performed. FIG. 33 is a schematic diagram of a portion of a transmitter that illustrates the measurements. A capacitance C1 (shown in FIG. 33 as two capacitances C1A and C1B) is connected in series with inductance L1. To measure the real part of the reflected impedance of transmitter resonator L1, the magnitude of the voltage $v_1$ across the C1+L1 is measured, the magnitude of the current $i_1$ through L1 is measured, and the phase difference between the current and voltage is measured. The real part of the reflected impedance of L1 is then calculated as $|v_1|/i|i_1| \cos \theta$, where $\theta$ is the measured phase difference.

Figure 34A:
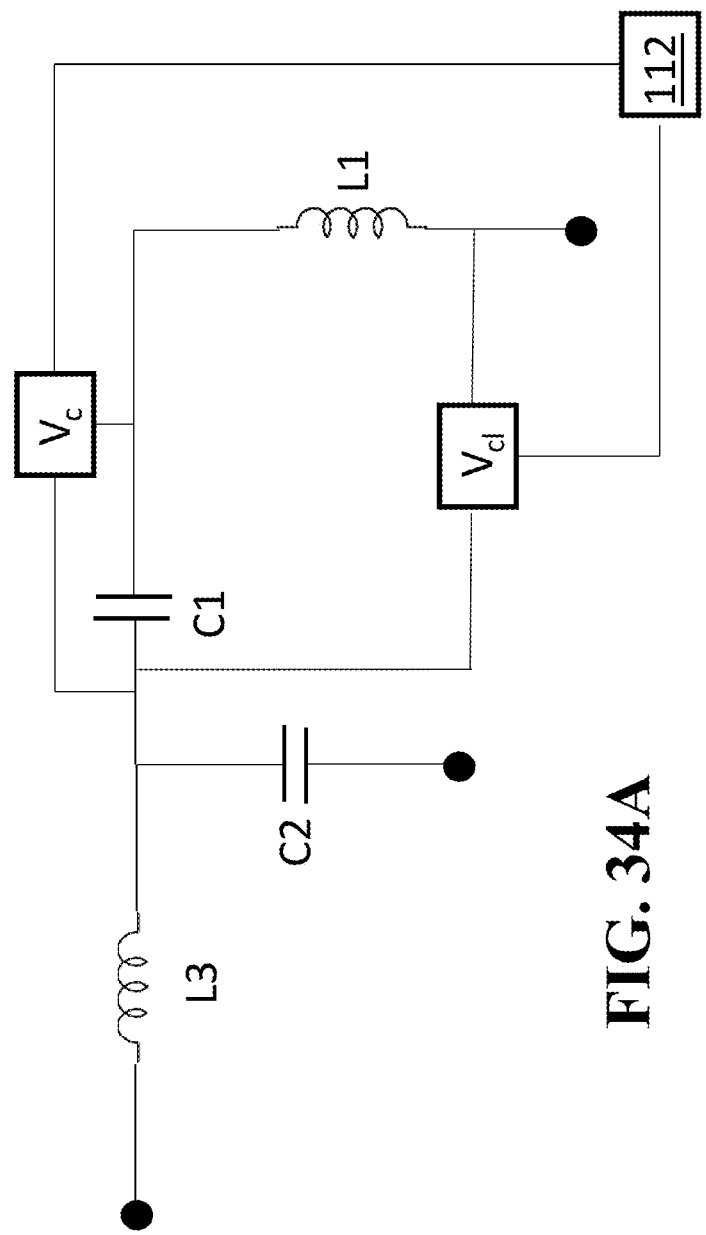
FIG. 34A is a schematic diagram of a portion of a wireless power transmitter that includes a detection subsystem for determining the reflected impedance of a transmitter resonator.

FIG. 34A is a schematic diagram of a portion of a transmitter that illustrates the use of the real part of the reflected impedance for detecting RFID tags. The transmitter shown in FIG. 34A includes a transmitter coil (represented by inductance L1) in series with a capacitor C1. A detection subsystem includes a first voltage detector $V_{c1}$ and a second voltage detector $V_c$. Both voltage detectors are connected to controller 112.

The first voltage detector $V_{c1}$ measures the voltage across the combination of capacitor C1 and inductance L1. This measurement, which is communicated to controller 112, represents voltage $v_1$. The second voltage detector $V_c$ measures the voltage across capacitor C1. This measurement is then used to determine $i_1$. In some embodiments, $i_1$ is determined by a separate circuit and the result communicated to controller 112. In certain embodiments, $i_1$ is determined by controller 112 directly from the voltage measured by detector $V_c$. In either implementation, second voltage detector $V_c$ effectively functions as a current measuring device for determining the current through inductor L1. Alternatively, in some embodiments, other detectors (such as resistors and current sense transformers) can be used to measure the current.

The phase difference between $v_1$ and $i_1$ can be determined by a phase detector that receives the signals corresponding to $v_1$ and $i_1$ and calculates the phase difference. The phase detector can be a separate component or circuit that calculates the phase difference and transmits the result to controller 112. Alternatively, the phase detector can be implemented within controller 112.

As discussed above, using second voltage detector $V_c$ to measure the voltage across capacitor C1 and then calculating $i_1$ from the voltage measured by $V_c$ effectively amounts to using capacitor C1 as a current sensor. Using C1 in this manner can be advantageous because typically, C1 is a high Q capacitor, and will therefore introduce only very small phase error into the phase measurement. Thus, the phase measurement can be determined with high sensitivity and accuracy.

When the transmitter generates a magnetic field at a frequency that corresponds RFID detection however is tuned to a power transmission frequency, if a RFID tag is present in the vicinity of the transmitter, excitation of the tag's resonance may occur, producing a peak in the real part of the reflected impedance of the transmitter resonator. In this situation, however, the intrinsic impedance of transmitter resonator already has a much larger (in magnitude) imaginary part. Detecting comparatively small peaks in the real part of the reflected impedance against a large magnitude background signal due to the imaginary part of the reflected impedance can be challenging.

Detection is made easier, however, by shifting the resonant frequency of the transmitter resonator to a frequency band that does not encompass the power transmission frequency. By shifting the resonance frequency to a band that typically includes RFID tag resonance frequencies, peaks in the real part of the reflected impedance of the transmitter resonator can more easily be measured. At the new resonance frequency, the imaginary part of the reflected impedance is very small (i.e., zero), making the real part considerably easier to detect.

Figure 34B:
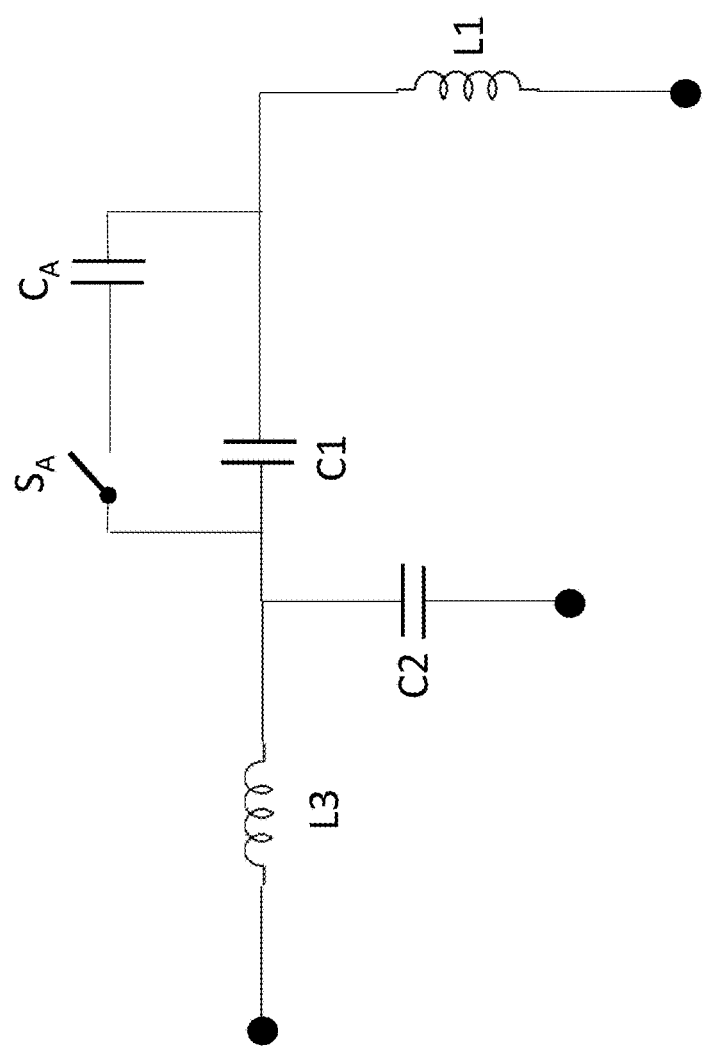
FIGS. 34B and 34C are schematic diagrams of portions of a wireless power transmitter that includes switchable capacitors.

A variety of different circuit topologies and operating conditions can be used to shift the resonance frequency of the transmitter resonator. FIG. 34B is a schematic diagram of a portion of a transmitter that includes many of the sample components as the transmitter of FIG. 34A. The transmitter shown in FIG. 34B can also include detectors $V_{c1}$ and $V_c$ as well as controller 112, but these are not shown in FIG. 34B for clarity.

The transmitter in FIG. 34B includes an additional capacitor $C_A$ connected in series with a switch $S_A$. The combination of capacitor $C_A$ and switch $S_A$ is connected in parallel with capacitor C1. Controller 112 is connected to switch $S_A$ and can open and close the switch. To change the resonance frequency of the transmitter resonator, controller 112 closes switch $S_A$, coupling in capacitor $C_A$ and changing the resonance frequency of the resonator, which now includes capacitances C1 and $C_A$. Controller 112 also adjusts the transmitter amplifier to deliver a driving current to the transmitter resonator at a frequency that corresponds to the new resonance frequency. As a result, the magnetic field generated by the transmitter resonator oscillates at the new resonance frequency.

Adding a single switched capacitor $C_A$ to the transmitter provides a single switching "bit" for purposes of frequency shifting. More generally, however, any number of additional switched capacitors can be added to provide additional resonance frequencies to which the transmitter resonator can be shifted. That is, the transmitter can include two or more (e.g., three or more, four or more, five or more, six or more, eight or more, ten or more, or even more) switched capacitors that can selectively be coupled into the transmitter resonator by controller 112 to shift the resonance frequency of the transmitter resonator. Capacitors can be switched in individually or in groups by controller 112. As discussed above, controller 112 also then adjusts the transmitter amplifier to provide a driving current to the transmitter resonator at a frequency that corresponds to the shifted frequency of the transmitter resonator.

Figure 34C:
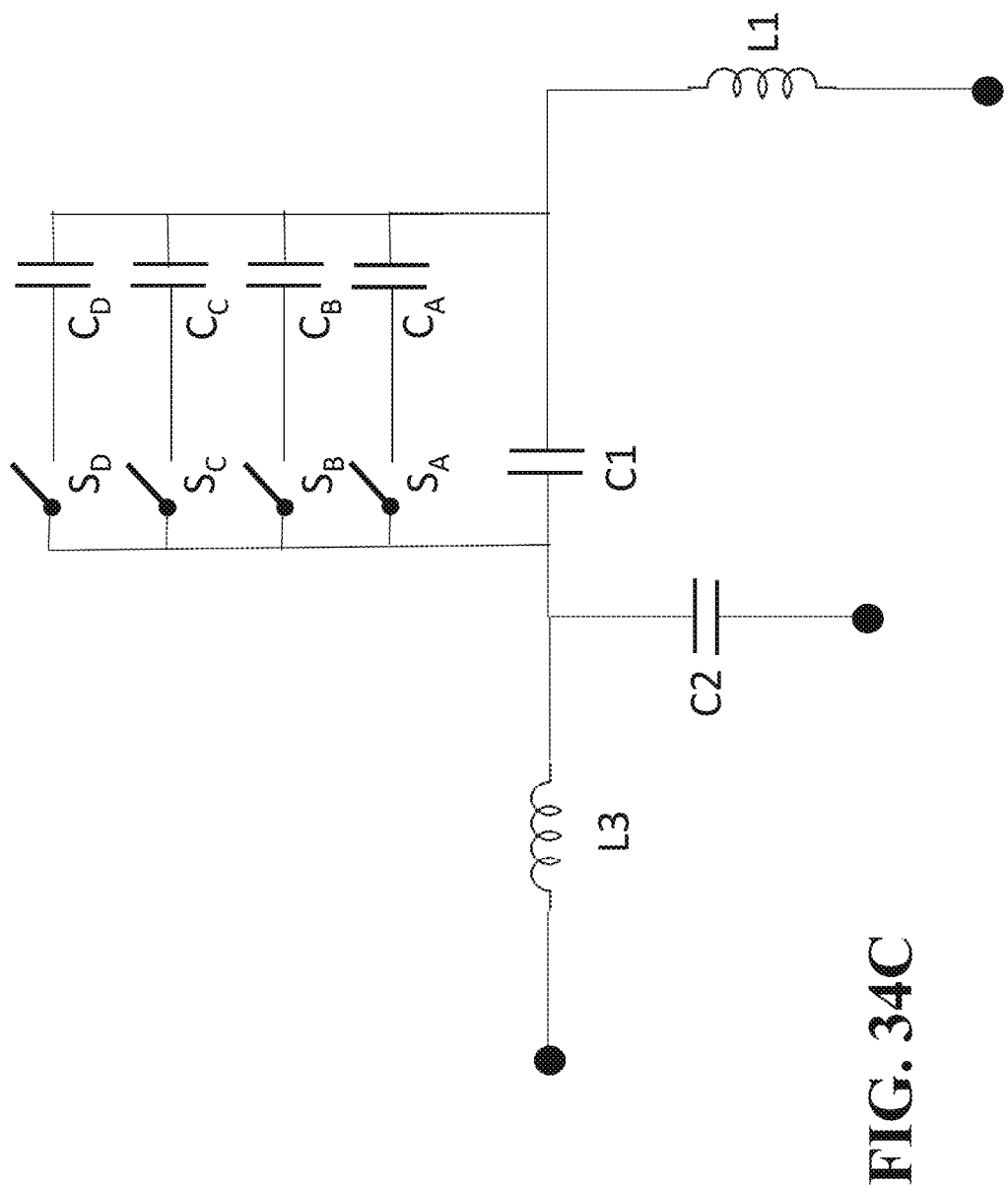

FIG. 34C is a schematic diagram of a portion of a transmitter that includes four switchable capacitors as part of the transmitter resonator. Capacitors $C_A$, $C_B$, $C_C$, and $C_D$ can each be selectively coupled into the transmitter resonator by closing switches $S_A$, $S_B$, $S_C$, and $S_D$, respectively, each of which are connected to controller 112. The capacitance values of the four capacitors are selected such that when each is individually coupled into the transmitter resonator, the transmitter resonator frequency shifts to a different value. For example, to detect RFID tags within the 8-20 MHz frequency band, the capacitance values of the four capacitors are selected so that when coupled into the transmitter resonator, each shifts the resonance frequency of the transmitter resonator to a different value within the 8-20 MHz band. The four switchable capacitors represent four "bits" for frequency switching purposes.

Figure 35:
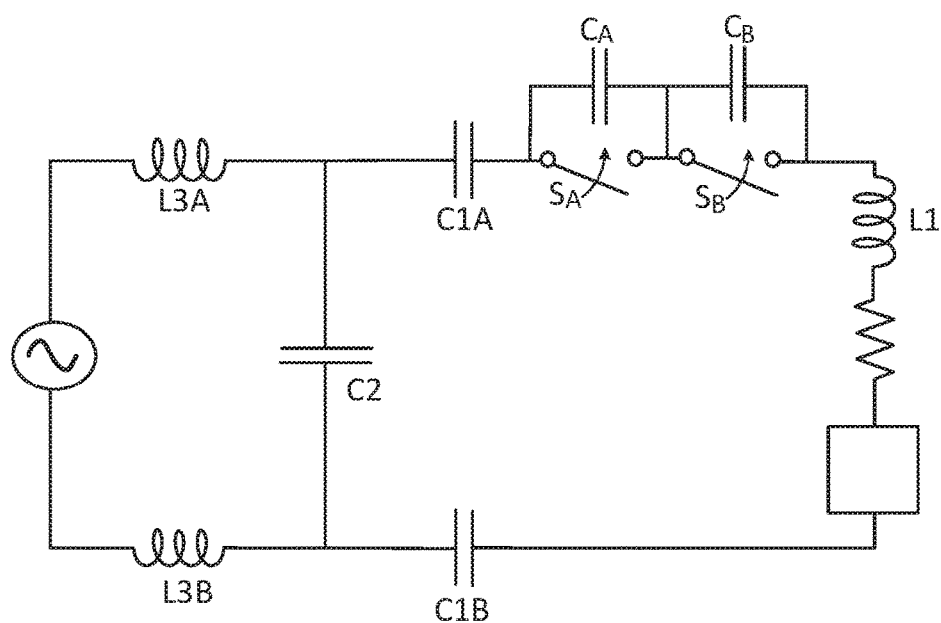
FIG. 35 is a schematic diagram of a portion of another wireless power transmitter that includes switchable capacitors.

In FIG. 34C, capacitors $C_A$, $C_B$, $C_C$, and $C_D$ are connected in parallel across C1 within the transmitter resonator. However, switched capacitors can also be connected in series with C1 to perform the same frequency shifting objective. FIG. 35 is a schematic diagram of a portion of a transmitter that includes switched capacitors $C_A$ and $C_B$ connected in series with C1 (implemented here as a combination of C1A and C1B). Capacitors $C_A$ and $C_B$ can be selectively coupled into the transmitter resonator via switches $S_A$ and $S_B$, which are each connected to and activated by controller 112. As above, the transmitter shown in FIG. 35 can generally include any number of switched capacitors in the transmitter resonator.

It should also be noted that parallel and/or serial switched capacitances can also be implemented across or in-line with capacitor C2 as an alternative to, or in addition to, implementing switched capacitances across and/or in-line with C1. Selectively coupling capacitors across or in-line with C2 also shifts the resonance frequency of the transmitter resonator, and such implementations can therefore be used for RFID tag detection in a similar manner to the foregoing discussion.

Figure 36:
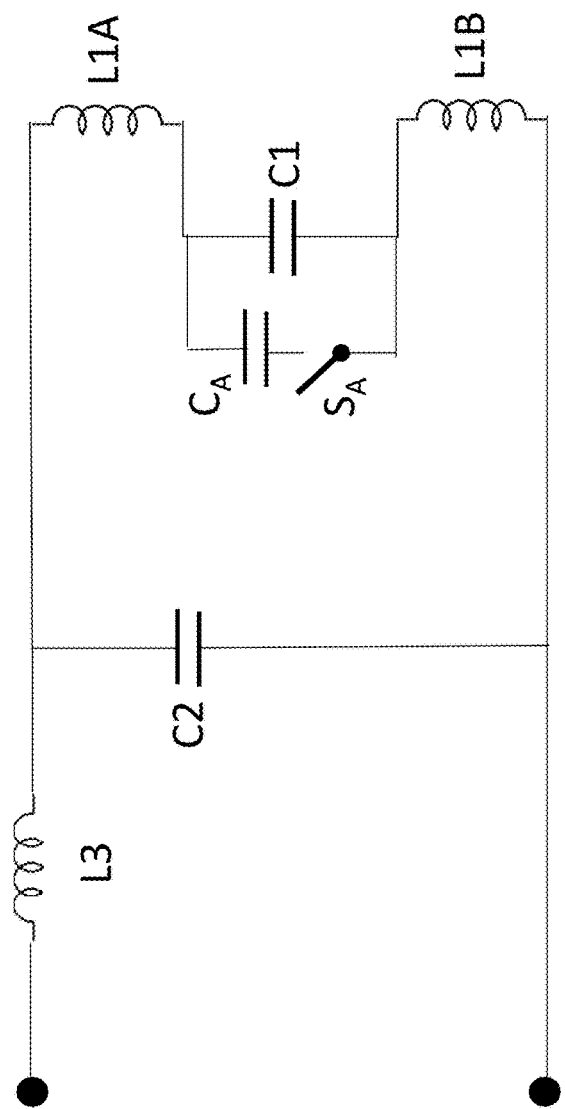
FIG. 36 is a schematic diagram of a portion of yet another wireless power transmitter that includes a switchable capacitor.

In addition, switched capacitances can also be implemented for purposes of RFID tag detection with more complex transmitter resonator topologies. FIG. 36 is a schematic diagram of a portion of a transmitter in which the transmitter resonator coil is implemented as a divided inductance, with inductance L1 replaced by inductances L1A and L1B, and capacitor C1 connected between the two divided inductances. As shown in FIG. 36, a switchable capacitance $C_A$ can be selectively coupled into the transmitter resonator to shift the resonance frequency via switch $S_A$, for purposes of RFID tag detection. As with the preceding implementations, any number of switchable capacitors can be implemented, in parallel or in series with C1. The switches are connected to controller 112 for selective activation, to provide the desired frequency shifts.

In general, the number of "bits" of switchable capacitance determines the number of discrete shifted transmitter resonator frequencies that can be used where the reactance of the transmitter resonator is zero. For example, returning to the example of FIG. 35, when switches $S_A$ and $S_B$ are both open, the transmitter resonator has a resonance frequency of 6.78 MHz with a reactance X=0 for L1=2.2 µH. With C1A=C1B=501 pF, $C_A$=154 pF, and $C_B$=76 pF, then with switch $S_A$ closed the resonance frequency of the transmitter resonator is 11 MHz at X=0, with switch $S_B$ closed the resonance frequency of the transmitter resonator is 14 MHz at X=0, and with both switches closed the resonance frequency of the transmitter resonator is 16.5 MHz at X=0.

To maintain an approximately constant current (i.e., to within ±10%) at each shifted transmitter resonator frequency within the transmitter, the bus voltage of the amplifier of the transmitter is adjusted by controller 112 at each frequency. In general, at frequencies far from the resonance frequency, a higher bus voltage is needed to maintain a constant current (of about 10 mA) in the resonator coil. However, it is generally faster to reduce the bus voltage than to increase the bus voltage. Thus, when performing RFID tag detection under time constraints, frequency shifting and bus voltage adjustment are performed in consideration of the limited time window available for tag detection.

Bus voltage adjustment can accompany the shift of the frequency of the magnetic field generated by the transmitter resonator during RFID tag detection. When driving the transmitter resonator at a resonance frequency, the bus voltage is typically low—and at a zero reactance value—to maintain a constant resonator coil current. As the resonator is driven slightly off resonance, i.e., at a frequency that no longer corresponds to a zero reactance resonant frequency, the bus voltage is increased to maintain constant coil current.

Thus, bus voltage adjustment together with capacitor switching can be used to detect RFID tags at many frequencies within the 8-20 MHz band. Continuing with the example of FIG. 35, in each of the three "bit states" (e.g., state 1: $S_A$ closed, $S_B$ open; state 2: $S_A$ open, $S_B$ closed; state 3: $S_A$ and $S_B$ closed) the bus voltage can be adjusted to generate magnetic fields using the transmitter resonator at different frequencies relatively close to the zero reactance frequency. For example, in state 1, the zero reactance frequency is 11 MHz. By changing the excitation frequency (e.g., by adjusting the bus voltage), reflected impedance measurements can be made at several frequencies (e.g., 5 frequencies) within a band from 10-12 MHz. In state 2, the zero reactance frequency is 14 MHz, and bus voltage adjustments permit reflected impedance measurements to be made at several frequencies (e.g., 6 frequencies) within a band from 12.5-15 MHz. In state 3, the zero reactance frequency is 16.5 MHz, and bus voltage adjustments permit reflected impedance measurements to be made at several frequencies (e.g., 8 frequencies) within a band from 15.5-19 MHz.

In general, the number of different frequencies, and the increment between frequency steps, can be selected as desired by appropriate adjustment of the bus voltage and switching of appropriate capacitors into the transmitter resonator. In some embodiments, for example, the number of frequencies within the RFID tag detection band (i.e., 8-20 MHz) at which reflected impedance measurements are performed is 1 or more (e.g., 2 or more, 3 or more, 4 or more, 5 or more, 10 or more, 15 or more, 20 or more, 25 or more, 30 or more, 40 or more, 50 or more, 75 or more). In certain embodiments, the minimum difference between frequencies at which impedance measurements are performed is 5 MHz or less (e.g., 2 MHz or less, 1 MHz or less, 750 kHz or less, 500 kHz or less, 250 kHz or less, 100 kHz or less).

As discussed above, reducing the bus voltage to actively change the excitation frequency is generally faster than increasing the bus voltage. Thus, when both the transmitter resonance frequency is adjusted (i.e., by switching capacitors into the transmitter resonator) and the bus voltage is adjusted, controller 112 can cycle through bus voltage values only once—from higher bus voltages to lower bus voltages—while repeatedly switching different capacitors into the transmitter resonator, to reduce the total amount of time required to perform reflectance impedance measurements.

Consider for example a transmitter as shown in FIG. 35, where the capacitance values of $C_A$ and $C_B$ are selected to provide zero reactance transmitter resonator frequencies of 11 MHz (state 1: $S_A$ closed, $S_B$ open), 14 MHz (state 2: $S_A$ open, $S_B$ closed), and 17 MHz (state 3: $S_A$ and $S_B$ closed) at a lower bus voltage $V_1$. Magnetic fields at frequencies of 12.5 MHz, 15.5 MHz, and 18.5 MHz can be generated by the transmitter resonator by driving the transmitter resonator slightly away from these zero reactance states. To maintain constant current in the resonator coil, the bus voltage is increased to a higher value $V_h$. Thus, by driving the resonator at selected frequencies (and adjusting the bus voltage to either $V_h$ or $V_1$ to maintain coil current as the resonator is driven away from zero reactance states), reflected impedance measurements at frequencies of 11, 12.5, 14, 15.5, 17, and 18.5 MHz can be performed.

To reduce or minimize the total time that the transmitter is in RFID tag detection mode, controller 112 manages switching between $V_h$ and $V_1$ and switching capacitors into the transmitter resonator. Specifically, because switching from $V_1$ to $V_h$ is relatively slow, controller 112 switches the bus voltage to $V_h$ and then rotates through states 1-3 by selectively opening and closing $S_A$ and $S_B$ to measure the reflected impedance at 12.5, 15.5, and 18.5 MHz. Controller 112 then switches the bus voltage to $V_1$ and rotates through states 1-3 again, measuring the reflected impedance at 11, 14, and 17 MHz. In this manner, the bus voltage is switched only once, from a higher value to a lower value, eliminating additional delays that would arise from lower-to-higher switching of the bus voltage.

Although the foregoing discussion has focused on the use of discrete, switchable capacitors to shift the resonance frequency of the resonator transmitter, it should be appreciated that capacitors $C_A$, $C_B$, $C_C$, and $C_D$ shown in FIGS. 34B, 34C, 35 and 36 can be replaced by a single adjustable capacitor. For example, referring to FIG. 34B, instead of having a fixed capacitance value, $C_A$ can, in some embodiments, be a tunable capacitor. When $C_A$ is tunable, the resonance frequency of the transmitter resonator can be shifted continuously by adjusting the capacitance of $C_A$ via controller 112, which is connected to a tunable $C_A$. Thus, controller 112 adjusts the capacitance of $C_A$ according to the frequency of the magnetic field that is generated by the transmitter resonator to detect RFID tags (i.e., the frequency at which the reflected impedance is measured).

$C_A$ can be switched in to the transmitter resonator via $S_A$, or can be permanently connected into the resonator (i.e., $S_A$ may not be present). When switched via $S_A$, $C_A$ can be connected in parallel or in series with C1, as discussed above. Further, as discussed above, multiple adjustable capacitors—each connected to controller 112—can be used in certain embodiments to provide for specific control over the transmitter resonator's resonance frequency.

As discussed in previous sections, if a RFID tag is detected in proximity to the transmitter, controller 112 can take one or more actions. In some embodiments, controller 112 reduces the amplitude of the power transmission magnetic field generated by the transmitter resonator (i.e., by reducing the driving current supplied to the resonator) to prevent damage to the detected tag. In certain embodiments, controller 112 displays a warning message to the user and/or generates one or more visual and/or auditory warning signals to indicate the presence of the tag to a user. In certain embodiments, controller 112 halts wireless power transfer to the receiver, e.g., by discontinuing generation of the power transmission magnetic field by the transmitter resonator.

Figure 37:
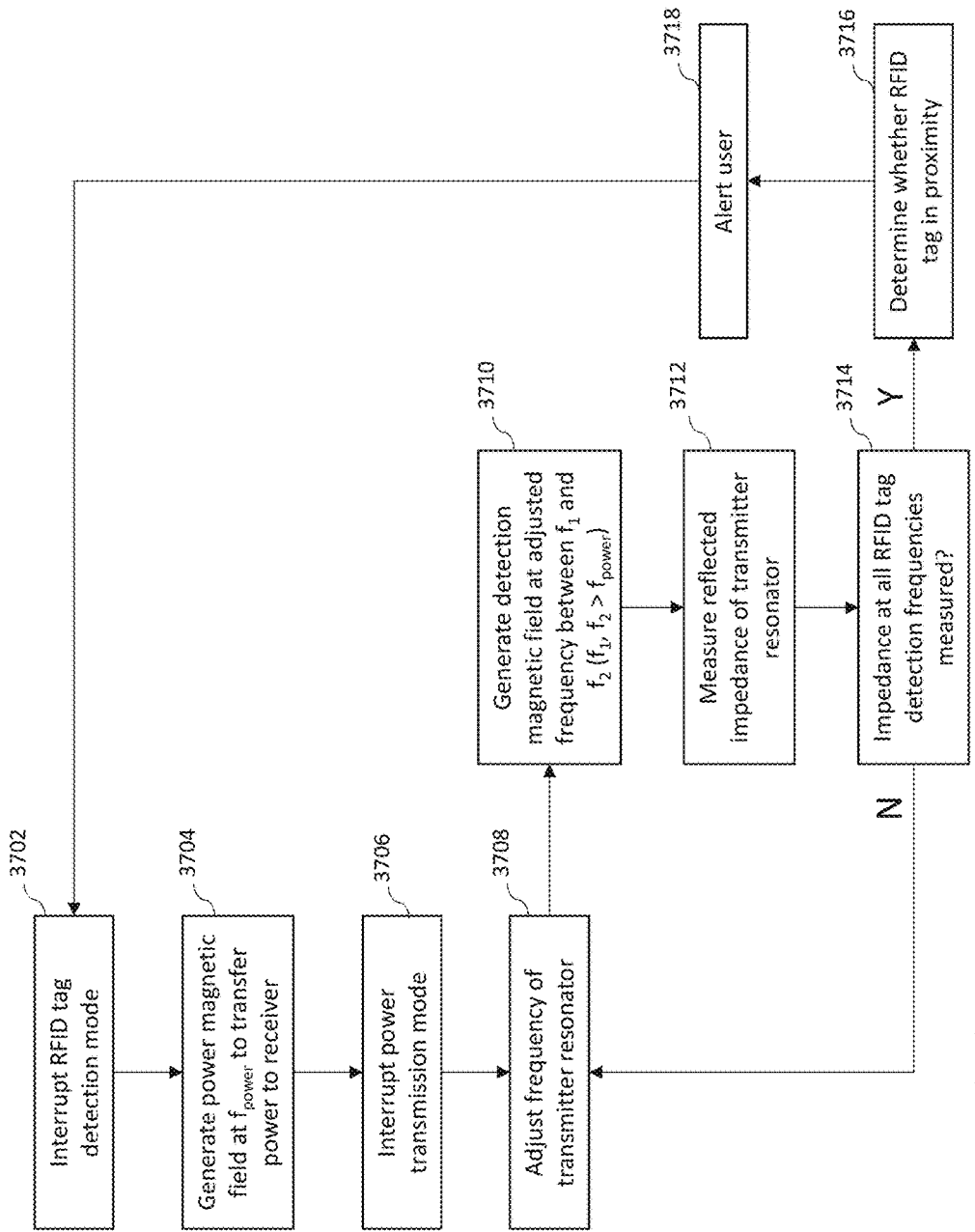
FIG. 37 is a flow chart showing a series of steps for detecting RFID tags by measuring the reflected impedance of a transmitter resonator.

FIG. 37 is a flow chart that summarizes a series of steps that can be performed to detect and identify RFID tags based on the reflected impedance of the transmitter resonator in a wireless power transmitter. In step 3702, RFID tag detection mode is interrupted by controller 112 if the transmitter is in that mode by discontinuing generation of detection magnetic fields within the RFID detection band (i.e., 8-20 MHz) and returning the transmitter resonator to its power transmission resonant frequency (e.g., approximately 6.78 MHz).

Then, in step 3704, controller 112 generates a power transmission magnetic field at the power transmission resonant frequency $f_{power}$ by activating the transmitter amplifier to deliver a driving current at that frequency to the transmitter resonator. Power transmission to a receiver can than occur for a period $t_1$.

After this period, in step 3706, controller 112 interrupts power transmission mode (by discontinuing the generation of the power transmission magnetic field), and in step 3708, initiates RFID tag detection mode by adjusting the frequency of the transmitter resonator to a new resonant frequency value within a band (e.g., the RFID detection band from 8-20 MHz) defined by lower and upper frequency limits $f_1$ and $f_2$, by switching in additional capacitance, as discussed above. For purposes of RFID tag detection, as explained previously, $f_1$ and $f_2$ are both greater than $f_{power}$.

Then, in step 3710, controller 112 generates a detection magnetic field at or near the new resonance frequency, and in step 3712, measures the reflected impedance of the transmitter resonator at or near the new resonance frequency. In some embodiments, as discussed above, controller 112 specifically measures the real part of the reflected impedance for RFID tag detection. In certain embodiments, RFID tag detection can also be performed based on a measurement of the imaginary part of the reflected impedance of the transmitter resonator. The imaginary part of the reflected impedance can be determined by controller 112 according to $|v_1|/|i_1| \sin \theta$, using the same nomenclature as for the real part of the reflected impedance discussed previously.

Next, at step 3714, controller 112 determines whether impedance measurements have been performed at all of the RFID detection frequencies that have been selected for interrogation. If not, control returns to step 3708 where the resonant frequency of the transmitter resonator is changed to a new frequency within the RFID detection band.

If impedance measurements at all of the frequencies selected for interrogation have been made, then in the next step 3716, controller 112 determines whether RFID tag is in proximity to the transmitter based on the reflected impedance measurements. As discussed above, this determination can be based on measurements of the real part of the reflected impedance at one or more RFID detection frequencies. Controller 112 can determine frequencies associated with local maxima or "peaks" in the real part of the reflected impedance, and compare the frequencies to reference information that includes peak frequencies for known RFID tags. In some embodiments, identification of specific tags is also possible using this method. In certain embodiments, peak frequencies are compared by controller 112 to threshold values that define RFID tag resonance frequencies to detect and identify RFID tags.

Further, as noted in step 3712, in some embodiments the measured imaginary part of the reflected impedance of the transmitter resonator can be used together with, or as an alternative to, the measured real part of the reflected impedance to detect RFID tags. Controller 112 can use information derived from the measured imaginary part—such as frequencies associated with specific features in the measured imaginary part—and compare the information to reference information for RFID tags and/or threshold values to detect RFID tags.

Next, in optional step 3718, controller 112 can deliver one or more alerts to a user of the transmitter in the form of visual and/or auditory messages and signals if a RFID tag is detected in proximity to the transmitter. The user can be given the option of taking some action, such as checking for a RFID tag, or manually shutting down the transmitter. Control then returns to step 3702, and the transmitter cycles through the power transmission and RFID detection modes again.

Optionally, the transmitter can also remain in RFID tag detection mode if a RFID tag is detected. That is, in FIG. 37, after step 3716 or 3718, control can return to step 3708 and RFID tag detection mode begins again as the transmitter cycles through measurement of reflected impedance at all of the RFID tag detection frequencies. The transmitter can continue to remain in the RFID tag detection mode (by repeatedly cycling back through step 3708) until a RFID tag is no longer detected.

VII. Low Frequency Excitation of RFID Tags

In some embodiments, a magnetic field can be generated at a frequency lower than 6.78 MHz, for example, as low as 100 kHz or even lower. This low frequency magnetic field has very low harmonic distortion due to the switching of the amplifier. It may be generated in addition to the already present power transmission field at approximately 6.78 MHz, or the power transmission field may be shut off for a short amount of time (on the order of microseconds) during the time the low frequency field is temporarily activated. This low frequency field may be generated by the transmitter resonator or by a separate, low frequency resonator which is in close proximity to the transmitter resonator. With the low frequency field active, the presence of harmonic content at integer multiples of the low frequency field can be indicative of the presence of an RFID and/or NFC tag. The harmonic content may appear at even harmonics, odd harmonics, or a combination of both.

RFID tag detection during power transfer may be accomplished by detecting harmonics from the nonlinear behavior of components in an RFID tag. Due to the ubiquitous behavior of RFID tags in terms of harmonic content, this technique can be useful to detect a majority of RFID tags that may be negatively impacted by the relatively strong magnetic fields used for wireless power transmission. These nonlinearities may be part of a clamping/protection circuit, or a diode rectifier, or some other component in the RFID tag electronics. Because of differences in matching network topologies of the receiver and the RFID tag, the receiver may not generate significant harmonic content when exposed to the low frequency magnetic field.

Figure 27:
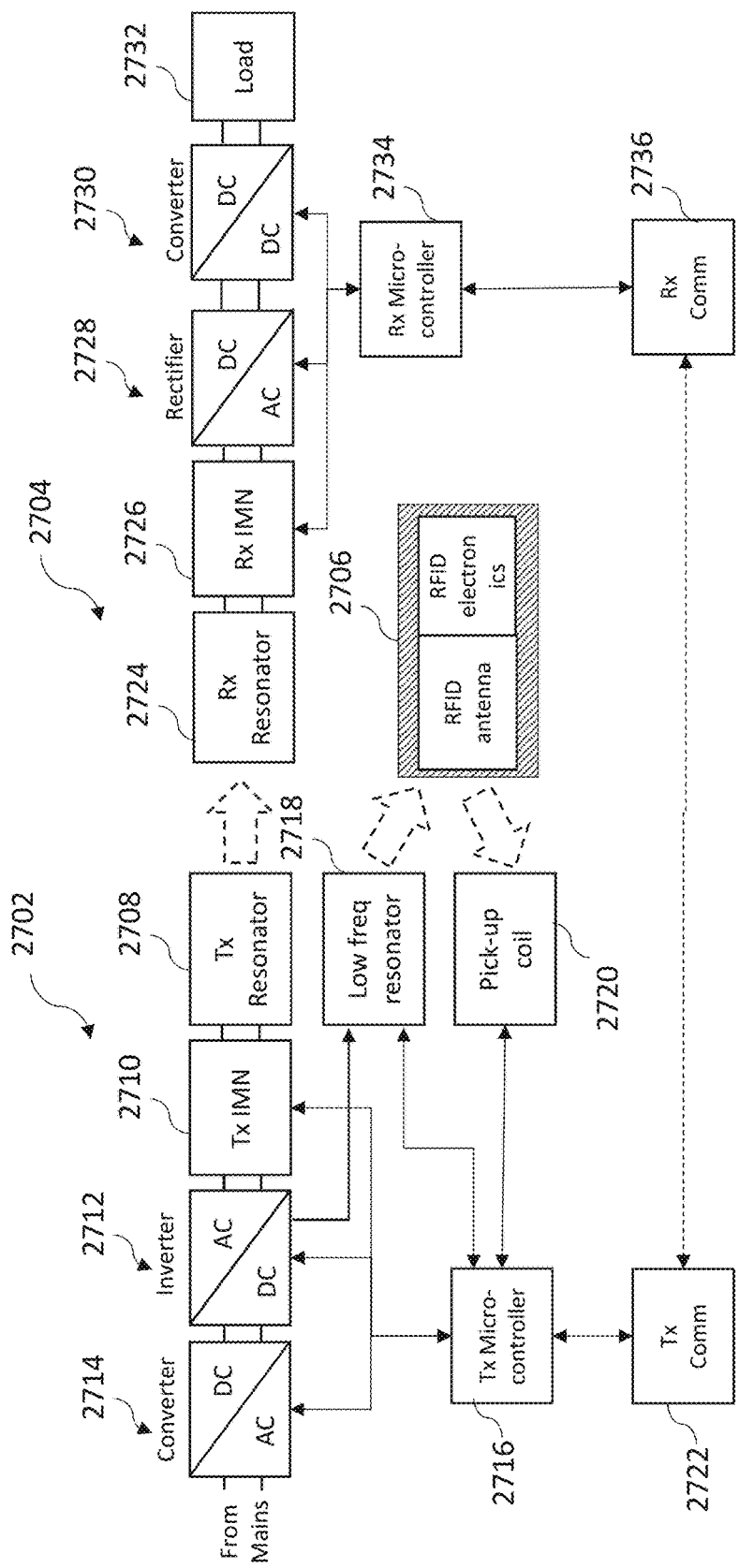
FIG. 27 is a schematic diagram of an example of a wireless power transmission system for low frequency detection of RFID tags.

FIG. 27 shows a diagram of a wireless power transmission system that includes a power transmitter 2702 and power receiver 2704. Proximate to the system is an RFID tag 2706 that includes RFID antenna and electronics. The transmitter includes a transmitter resonator 2708, impedance matching network (IMN) 2710, inverter 2712, and converter 2714. Controlling the IMN, inverter, and converter is a controller 2716 that also controls a low frequency resonator 2718 and a pick-up coil 2720. Further, the transmitter includes a communication module 2722 to communicate with the receiver. The receiver has a receiver resonator 2724, impedance matching network (IMN) 2726, rectifier 2728, and converter 2730 coupled to a load 2732. The receiver controller 2734 is coupled to the receiver IMN, rectifier, and converter and to a receiver communication module 2736 to communicate with the transmitter.

In embodiments, to generate the low frequency magnetic field, one or more coils can be used. For example, these one or more coils can include a transmitter resonator coil, a low frequency resonator coil, and/or a pick-up coil. In embodiments, the pick-up loop, primarily used to detect harmonic content generated by an RFID tag, can be positioned in close proximity to the transmitter resonator and the low frequency resonator, if it is present in the system. The one or more coils can be connected to sensing circuitry. When the sensing circuit detects significant harmonic content at some or any of the harmonic frequencies of the low frequency field, it can send a signal to the power transmitter that an RFID tag is present, which can lead the transmitter to decrease power level to prevent damage to the RFID tag. In some embodiments, the sensing circuit can use any of the transmitter resonator coil, low frequency resonator coil, and/or a pick-up coil to detect harmonic content in the response from an RFID tag. For example, the current, voltage, or impedance can be measured at any of the above coils to detect this harmonic content.

In certain embodiments, a lower frequency, such as 100 kHz to 500 kHz can be added to the 6.78 MHz operating frequency of the power transmitter. Because the wireless power receiver resonator coil has a high quality factor ($Q_{Tx} \approx 100$ or greater), the receiver resonator coil can filter out the lower frequency content generated by the transmitter. Because the RFID tag does not have a high quality factor, this filtering effect does not hold for RFID tags. Further, the RFID tag quality factor $Q_{RFID}$ has been observed to decrease dramatically when exposed to strong magnetic fields.

In some embodiments, the receiver does not generate harmonics in the lower-frequency field due to its rectifier being "locked out" by the matching capacitors in series with the receiver resonator coil, which could have a reactance of up to 10 kOhms. In other words, the harmonic response resulting from the nonlinear behavior of the switches or diodes in the receiver's rectifier is suppressed by the impedance matching capacitors of the receiver (see FIGS. 24A-24B).

Figures 28A, 28B, 28C:
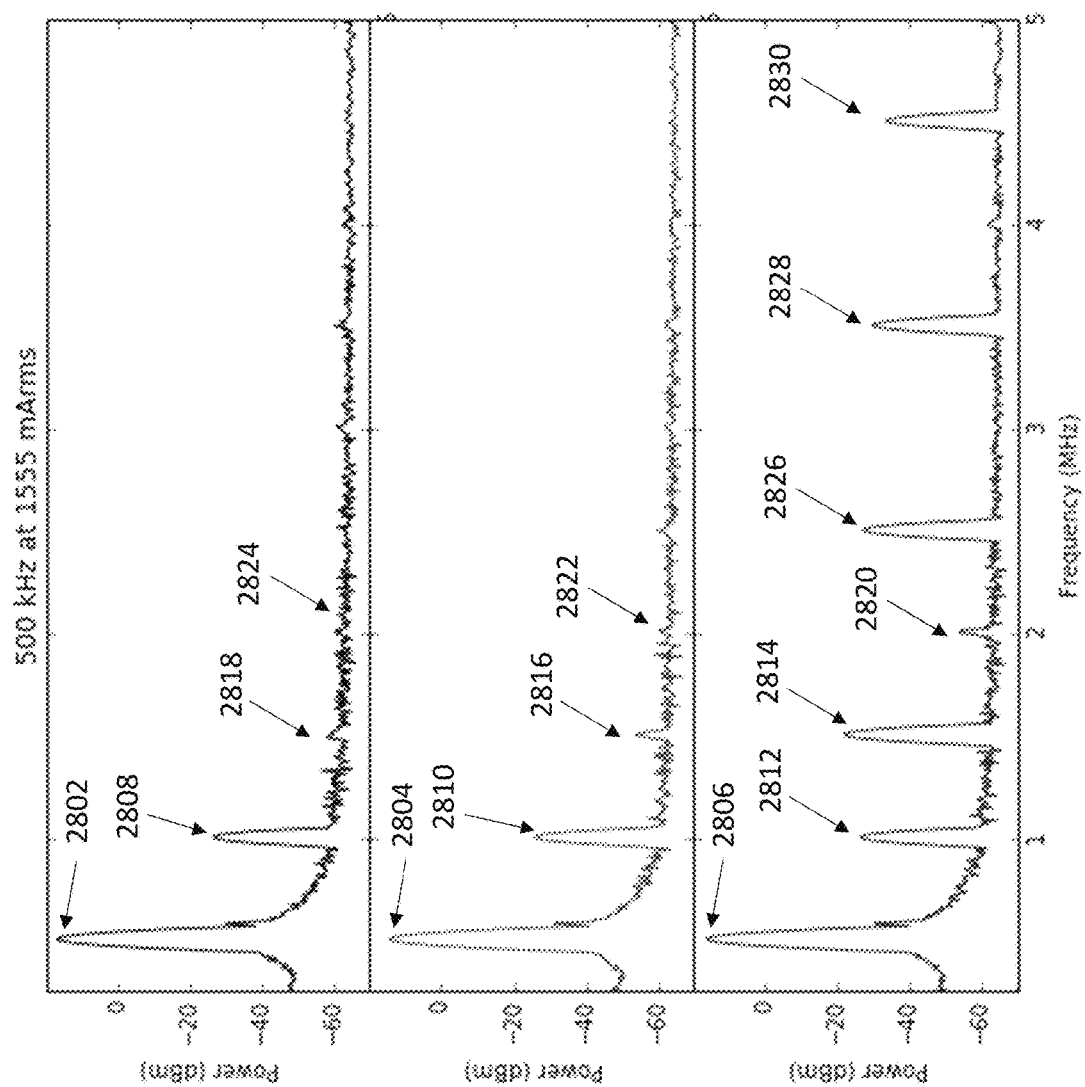
FIGS. 28A-28C are plots of power as a function of frequency that show harmonic content in response to exposure to a low frequency magnetic field for a wireless power transmitter.

FIGS. 28A-28C show plots of harmonic content in response to a 500 kHz magnetic field (transmitted a current of 1.555 mA rms). FIG. 28A shows harmonic content measured at the transmitter when the transmitter is alone in the system (without any response from a receiver, RFID tag, or foreign object). Harmonic content in a standalone activated power transmitter may be present due to the operation and nonlinear behavior of transmitter electronics, such as those of the switches in the converter and/or amplifier or the components of the matching network. FIG. 28B shows harmonic content measured at the transmitter with a wireless power receiver positioned at 5 mm away from the transmitter resonator coil. Harmonic content in a transmitter-receiver system may be present due to the operation and nonlinear behavior of receiver electronics, such as those of the switches in the rectifier and/or converter or components of the matching network, in addition to the discussed transmitter behavior above. FIG. 28C shows harmonic content measured at the transmitter with an RFID tag positioned at 5 mm away from the transmitter resonator coil. The greatest energy is at the fundamental 500 kHz, as expected, in the three peaks 2802, 2804, and 2806. At the second harmonic of 1 MHz, there is less energy in each of the response as compared to the fundamental frequency of 500 kHz. However, there is approximately equal energy between the peaks 2808, 2810, and 2812. At the third harmonic of 1.5 MHz, the most energy is produced by the response 2814 of the RFID tag, the second most energy is by the response 2816 of the receiver, and the least energy is produced by "response" 2818 or isolated transmitter. Note the relatively large difference between the energy in the peaks 2814 and 2816. This harmonic is a good candidate for differentiating the responses between a receiver and an RFID tag. At the fourth harmonic of 2 MHz, the greatest energy is produced at the peak 2820 of the RFID tag while the receiver response 2822 and the isolated transmitter response 2824 are not easily distinguishable from the noise of the measurements. From the fourth harmonic 2 MHz (peak 2820) through harmonics 2.5 MHz (peak 2826), 3.5 MHz (peak 2828), and 4.5 MHz (peak 2830), the greatest energy is produced by the response of the RFID tag (as shown in FIG. 28C compared to the responses in FIG. 28A and FIG. 28B). Thus, the $3^{nd}$, $4^{rd}$, $5^{th}$, $7^{th}$, and $9^{th}$ harmonics can be monitored to detect an RFID tag and distinguish the RFID tag from the receiver. Further, the matching capacitors in the receiver IMN can block this low-frequency signal, preventing the rectifier on the receiver from producing harmonics. This can also prevent false detection of a receiver as an RFID tag.

In some embodiments, one or more mixers (or multipliers) can be tuned to each harmonic of interest to detect RFID tags. For example, mixers can be used to mix (or multiply) the measured signal, such as current I1 at the resonator coil or current I3 in the matching network, with a sine wave at or near the harmonic of interest. The lower frequency beat can then be measured and compared to a threshold for affirmative detection. Other techniques could be employed to measure each harmonic of interest, for example, using bandpass filters coupled to analog-to-digital converters (ADCs). This digitized signal can be compared to a threshold and processed for detection.

In certain embodiments, more than one amplifier may be used in the transmitter to accomplish the above detection technique. For example, a first amplifier (such as a linear amplifier) can be used in concert with a second amplifier (such a class D or E) operating at approximately 6.78 MHz to drive the transmitter resonator to transmit power to a receiver. The first amplifier can be used to drive a detection coil at a lower frequency, such as 100 to 500 kHz. For efficiency purposes, a switch (such as a relay or transistor) can be used to switch between the two amplifiers depending on the operation (see examples of interrupting power to detect RFID tags above). In some embodiments, for a low frequency magnetic field at approximately 500 kHz, 1 A of current is used to drive the appropriate coil in order to induce enough voltage to engage nonlinear regime of rectifier diodes. in the RFID tag. For a low frequency magnetic field at approximately 100 kHz, 5 A of current is used to drive the appropriate coil to produce the desired response in the RFID tag. The higher current when driving the coil at 100 kHz is needed because the response of the RFID tag is a function of frequency and is weaker at this lower frequency as compared to a higher frequency such as 500 kHz.

FIG. 29A is a flowchart that shows a series of steps for implementing low frequency RFID tag detection. At step 2902, the transmitter outputs a low frequency magnetic field with frequency $f_{detection}$. At step 2904, the RFID tag, if present, responds with harmonic content relative to that low frequency. At step 2906, the response is detected by a coil designated for detection in the transmitter. At step 2908, the response is filtered for a chosen harmonic (for example, using the experimental results above). At step 2910, the filtered waveform is input to an analog-to-digital converter (ADC) to produce a digitized waveform. At step 2912, this waveform is compared to a threshold by a processor or controller. At step 2914, the output of the comparison is processed to determine whether to transmit power. At step 2916, a control signal is sent from the controller to the amplifier to either start or stop transmitting power, depending on the result of the comparison made in step 2914.

FIG. 29B shows a schematic diagram of a system that can be used to detect harmonic signals or features generated by the RFID tag. In some embodiments, some or all of the system components can be part of a sensor configured to detect harmonic content. In other embodiments, these components can have multiple purposes in the transmitter such as filtering signals for use in tuning the transmitter matching network. The system components can include a monitor 2918 to measure current, such as I1 at the transmitter resonator coil 2920 or I3 at the output of the amplifier 2922; voltage, such as that across the transmitter resonator coil, or power. The monitor 2918 can be coupled to a filter 2924, such as a low pass filter (LPF) or band pass filter (BPF) configured to pass the signal portions at frequencies $f_{harmonic}$ such as the $3^{rd}$, $4^{th}$, $5^{th}$, $7^{th}$, and $9^{th}$. In embodiments, there can be one or more filters at each, some, or all of these harmonic frequencies of interest. The filter 2924 can be coupled to a comparator 2926 to compare the filtered signal to a threshold. In certain embodiments, the threshold can be a predetermined threshold for each of the peaks expected at the $3^{rd}$, $4^{th}$, $5^{th}$, $7^{th}$, and $9^{th}$. In some embodiments, the threshold can be determined dynamically or "on-the-fly" based on the power, voltage, or current levels used to transmit the detection magnetic field. The comparator 2926 can be coupled to an analog-to-digital converter (ADC) 2928 to digitize the analog signal outputted from the comparator 2926 so that it can be inputted to a controller, processor, or other integrated circuit (IC) 2930 coupled to the amplifier 2922. The controller 2930 can then signal to the amplifier to resume driving the transmitter (if no RFID tag detection occurs) or not to resume driving the transmitter (if RFID tag detection occurs).

VIII. Shielding of Wireless Power Transmission Systems

Figure 30:
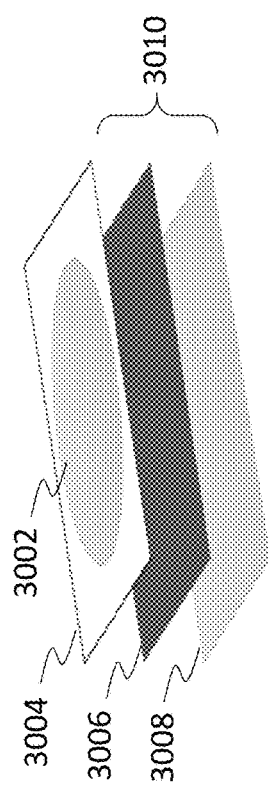
FIG. 30 is a schematic diagram of an example of a wireless power transmitter.

FIG. 30 shows a schematic diagram of an embodiment of a wireless power transmitter including a transmitter resonator coil 3002 on a substrate 3004, a layer of magnetic material 3006 (for example, ferrite), and layer of conductor 3008. The layer of conductor can be a sheet of copper, aluminum, copper-clad aluminum, a pattern of conductor on a substrate (such as PCB), and the like. The overall height 3010 of the layers can be determined by the overall thickness of, for example, a charging pad. The overall height can be approximately 3 mm, 5 mm, 10 mm, 12 mm, 15 mm, or more. In embodiments, the magnetic material 3006 can be positioned away from the plane of the resonator coil 3002. For example, for an overall height of approximately 12 mm, the ferrite can be positioned 8 to 9 mm away from resonator coil 3002. This distance prevents the detuning of a receiver coil inductance. For example, for a sample receiver resonator coil, the inductance shifts from 1.93 microHenry (at a distance of 36 mm away from the surface of the transmitter resonator coil) to 1.95 microHenry (at a distance of 6 mm away from the surface of the transmitter resonator coil). If magnetic material was positioned closer to the transmitter resonator coil (and hence closer to the receiver), the receiver resonator coil shifts to 2.05 microHenry. This distance away from the magnetic field generator (the transmitter resonator coil 2102) also prevents saturation at high field strengths. Saturation itself may be prevented with thicker magnetic material, however, thicker magnetic material can add to the cost and weight of the transmitter. In some embodiments, magnetic material thickness can be in the range of 0.1 to 1.5 mm or more. The distance away from the transmitter resonator also prevents a drop in the quality factor of the transmitter resonator.

Figure 31A:
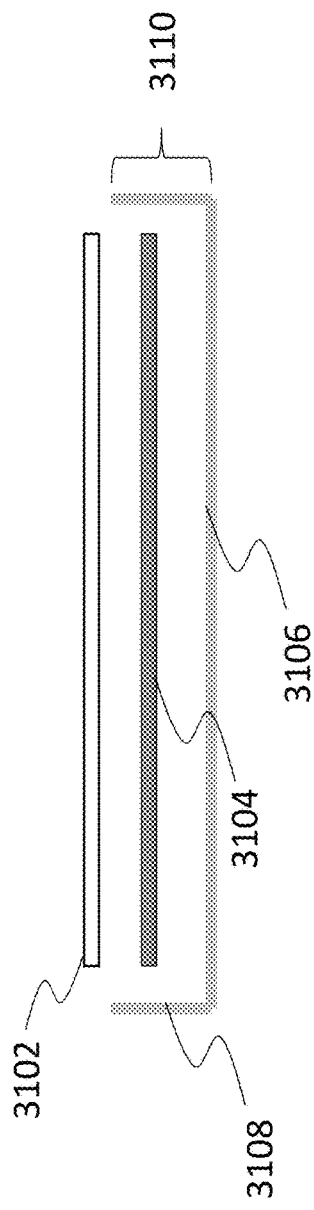
FIGS. 31A and 31B are schematic diagrams showing additional examples of a wireless power transmitter.
Figure 31B:
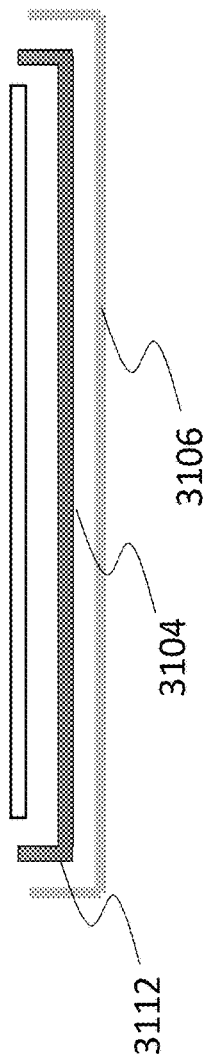

FIG. 31A shows a cross-sectional view of the layers shown in FIG. 30. The top layer contains the resonator coil 3102, the middle layer contains magnetic material 3104, and the bottom layer contains a conductor 3106 with overhangs 3108. The overhang reduces the magnetic field below the conductor where RFID tags may intrude. The height 3108 of the overhang of the conductor shield may be less than the overall height 3010 of the layers. The effectiveness of the conductor in this respect is increased as the distance from the magnetic material is increased. The conductor can be a sheet of copper, aluminum, copper-clad aluminum, and the like. FIG. 31B shows a cross-sectional view of another embodiment of the layers shown in FIG. 30. In this embodiment, the magnetic material 3110 also has overhangs 3112 that can help prevent any harmful effects that the conductor overhangs 3108 may have on the resonator coil 3102.

Figure 32B:
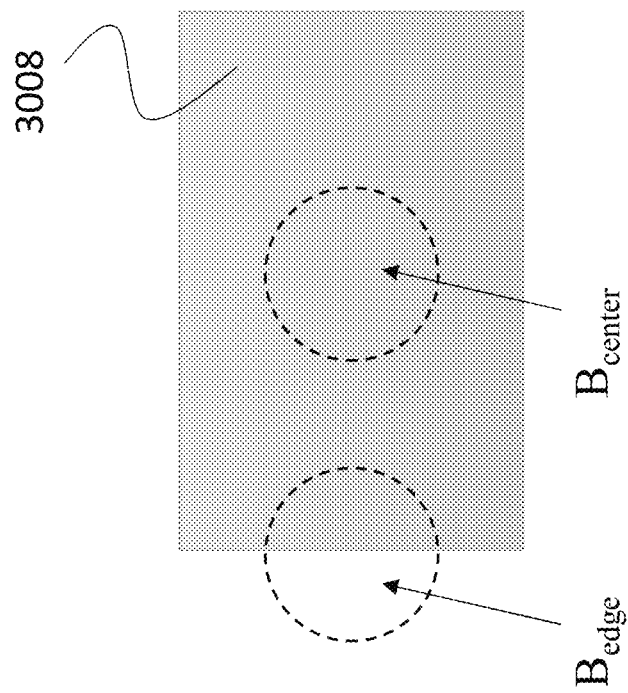
FIGS. 32A and 32B are schematic diagrams that show examples of a conductor used in a wireless power transmitter.
Figure 32A:
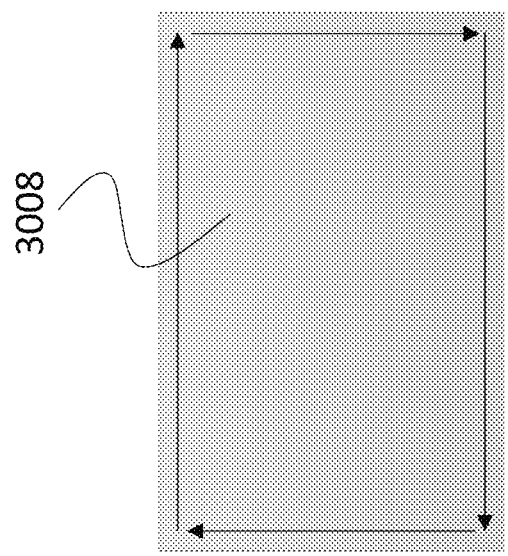

An advantage to the configurations shown in FIG. 31A and FIG. 31B is the prevention of eddy currents on the edges of the conductor sheet. These eddy currents can create a significant magnetic fields at the edges of the conductor sheet, which can have harmful effects on RFID tags. A representation of the eddy currents is shown in FIG. 32A in the form of arrows running clockwise around the edge of the conductor sheet 3008. As shown in FIG. 32B, the magnetic field strength at the edge ($B_{edge}$) of conductor sheet 3008 is greater compared to the field strength at the center of the conductor ($B_{center}$). $B_{edge}$ is also greater than the threshold magnetic field $B_{RFID}$ that an RFID tag may be able to withstand without damage. Both $B_{edge}$ and $B_{center}$ can be less than the magnetic field strength generated by the transmitter at the top surface of the transmitter resonator coil.

IX. Combinations of RFID Detection Techniques

Any of the above detection techniques can be combined with one another, and with other detection techniques for positive identification of RFID tags or transponders, such as capacitive, infrared, or ultrasonic sensing.

In addition, various "warning" or alerting techniques can be combined with the methods disclosed herein. For example, in some embodiments, systems that implement RFID tag detection can also include sensors that detect movement of objects in proximity to wireless power transmitters. A variety of detectors such as motion sensors and cameras can be used for this purpose. Such detectors can be connected to a common controller (e.g., controller 112), which can determine—based on the detector signals—whether an object in proximity to the transmitter or receiver has moved. If such movement has occurred, the controller can reduce the amplitude of the magnetic field generated by the transmitter resonator as a precautionary measure. The system can then check for RFID tags that may have been introduced near the transmitter or receiver (e.g., using any of the techniques disclosed herein) and either increase the field amplitude (if no tags are identified) or maintain/further reduce the field amplitude (if one or more tags are detected).

X. Hardware and Software Implementation

The steps described above in connection with various methods for detecting RFID tags, including measuring the impedance of transmitter resonators and adjusting/activating/signaling/controlling various components of wireless power transmitters can be implemented in computer programs using standard programming techniques. Such programs are designed to execute on programmable computers, controllers (such as controller 112), and/or specifically designed integrated circuits, each optionally featuring an electronic processor, a data storage system (including memory and/or storage elements), at least one input device, and least one output device, such as a display or printer. The program code is applied to input data (e.g., measured waveforms and data values from the detectors of a detection subsystem) to perform the functions described herein and generate output information (e.g., control signals, alerts), which is applied to one or more output devices. The code can also cause controllers and other circuits to execute control functions to modify the operation of the various components of the transmitters, as discussed above.

Each such computer program can be implemented in a high-level procedural or object-oriented programming language, or an assembly or machine language. Furthermore, the language can be a compiled or interpreted language. Each such computer program can be stored on a computer readable storage medium (e.g., an optical, magnetic, or persistent medium) that when read by a computer, controller, or circuit can cause the processor therein to perform the functions described herein. Controller 112 can, in general, be configured through software instructions to perform any of the control steps, measurement steps, adjustment steps, analysis functions, and alerting steps disclosed herein.

OTHER EMBODIMENTS

While the disclosed techniques have been described in connection with certain embodiments, other embodiments will be understood by one of ordinary skill in the art and are intended to fall within the scope of this disclosure. For example, designs, methods, configurations of components, etc. related to transmitting wireless power have been described above along with various specific applications and examples thereof. Those skilled in the art will appreciate where the designs, components, configurations or components described herein can be used in combination, or interchangeably, and that the above description does not limit such interchangeability or combination of components to only that which is described herein.

All documents referenced herein are hereby incorporated by reference.

What is claimed is:

1. A wireless power transmitter configured to detect a radio frequency identification (RFID) tag, the transmitter comprising:

a transmitter resonator;
a transmitter impedance matching network coupled to the transmitter resonator;
an amplifier coupled to the transmitter impedance matching network;
a detection subsystem connected to the transmitter resonator; and
a controller coupled to the amplifier and to the detection subsystem and configured so that during operation of the transmitter, the controller is configured to control the transmitter resonator, the amplifier, and the impedance matching network to cycle the transmitter between a power transmission mode and a RFID tag detection mode,
wherein in the power transmission mode:
the RFID tag detection mode is interrupted; and
the transmitter resonator generates a power magnetic field at a frequency $f_{power}$ to transfer power to a wireless power receiver;
wherein in the RFID tag detection mode:
the power transmission mode is interrupted;
the transmitter resonator generates at least one detection magnetic field at a frequency between $f_1$ and $f_2$ to excite a RFID tag;
the detection subsystem measures a reflected impedance of the transmitter resonator at each frequency; and
the controller determines whether a RFID tag is present in proximity to the transmitter based on the reflected impedance of the transmitter resonator; and
wherein $f_1$ and $f_2$ are greater than $f_{power}$.

2. The transmitter of claim 1, wherein the detection subsystem measures a real part of the reflected impedance of the transmitter resonator, and wherein the controller determines whether a RFID tag is present in proximity to the transmitter based on the real part of the reflected impedance of the transmitter resonator.

3. The transmitter of claim 1, wherein the detection subsystem measures an imaginary part of the reflected impedance of the transmitter resonator, and wherein the controller determines whether a RFID tag is present in proximity to the transmitter based on the imaginary part of the reflected impedance of the transmitter resonator.

4. The transmitter of claim 1, wherein $f_1$ and $f_2$ are each between 8 MHz and 22 MHz.

5. The transmitter of claim 1, wherein the amplifier provides one or more driving currents corresponding to the frequency of the at least one detection magnetic field to generate the at least one detection magnetic field.

6. The transmitter of claim 5, wherein the transmitter resonator comprises a resonator coil, the transmitter further comprising:
a first capacitor $C_1$ connected in series with the resonator coil; and
one or more capacitors each connected to $C_1$ through a different associated switch,
wherein the controller is configured to activate the transmitter resonator to generate each detection magnetic field by:
activating the amplifier to provide a driving current corresponding to a frequency of the detection magnetic field to the transmitter resonator; and
closing one of the associated switches to connect one of the capacitors to $C_1$ through a continuous circuit pathway.

7. The transmitter of claim 5, wherein the transmitter comprises a tunable capacitor connected to the controller, and wherein the controller is configured to activate the transmitter resonator to generate each detection magnetic field by:
activating the amplifier to provide a driving current corresponding to a frequency of the detection magnetic field to the transmitter resonator; and
adjusting a capacitance value of the tunable capacitor based on the frequency of the detection magnetic field.

8. The transmitter of claim 1, wherein the transmitter resonator comprises a resonator coil and the transmitter comprises a first capacitor $C_1$ connected in series with the resonator coil, wherein the detection subsystem is configured to measure a first voltage across a combination of the first capacitor and the resonator coil and a second voltage across the first capacitor, and wherein the controller is configured to determine the reflected impedance based on the measured first and second voltages.

9. The transmitter of claim 8, wherein the controller is configured to determine a current through the resonator coil based on the second voltage, and to determine the reflected impedance based on the first voltage and the current through the resonator coil.

10. The transmitter of claim 1, wherein the controller is configured to determine whether a RFID tag is present in proximity to the transmitter by identifying one or more local maximum values in the reflected impedance of the transmitter resonator at frequencies between $f_1$ and $f_2$.

11. The transmitter of claim 10, wherein the controller is configured to determine whether a RFID tag is present in proximity to the transmitter by determining frequencies associated with the one or more local maximum values, and comparing the determined frequencies to reference information comprising resonance frequencies associated with RFID tags.

12. The transmitter of claim 10, wherein the controller is configured to determine whether a RFID tag is present in proximity to the transmitter by comparing the determined frequencies to one or more threshold frequency values corresponding to resonance frequency limits for RFID tags.

13. The transmitter of claim 1, wherein the controller is configured to reduce an amplitude of the power magnetic field if a RFID tag is determined to be present in proximity to the transmitter.

14. The transmitter of claim 1, wherein in a single cycle, the transmitter operates for a first time period $t_1$ in the power transmission mode and for a second time period $t_2$ in the RFID tag detection mode, and wherein $t_2$ is 500 microseconds or less.

15. The transmitter of claim 14, wherein $t_2$ is 300 microseconds or less.

16. The transmitter of claim 14, wherein a total cycle time corresponding to a sum of $t_1$ and $t_2$ is between 0.5 seconds and 2 seconds.

17. The transmitter of claim 1, wherein in the RFID tag detection mode, the controller is configured to adjust a bus voltage in the amplifier to maintain a constant current in the transmitter resonator as each detection magnetic field is generated.

18. A method for detecting a radio frequency identification (RFID) tag, the method comprising:
operating a wireless power transmitter in a power transmission mode, wherein the operating comprises using a transmitter resonator of the transmitter to generate a power magnetic field at a frequency $f_{power}$ to transfer power to a wireless power receiver;
operating the wireless power transmitter in a RFID tag detection mode, wherein the operating comprises:

using the transmitter resonator to generate at least one detection magnetic field at a frequency between $f_1$ and $f_2$ to excite a RFID tag;

measuring a reflected impedance of the transmitter resonator at each frequency; and determining whether a RFID tag is present in proximity to the transmitter based on the measured reflected impedance of the transmitter resonator; and cycling the wireless power transmitter between the power transmission mode and the RFID tag detection mode, wherein $f_1$ and $f_2$ are greater than $f_{power}$.

19. The method of claim 18, further comprising measuring a real part of the reflected impedance of the transmitter resonator, and determining whether a RFID tag is present in proximity to the transmitter based on the real part of the reflected impedance of the transmitter resonator.

20. The method of claim 18, wherein $f_1$ and $f_2$ are each between 8 MHz and 22 MHz.

21. The method of claim 18, further comprising activating an amplifier of the wireless power transmitter to provide one or more driving currents corresponding to the frequency of the at least one detection magnetic field to generate the at least one detection magnetic field.

22. The method of claim 21, further comprising, for each detection magnetic field:

activating the amplifier to provide a driving current corresponding to a frequency of the detection magnetic field to the transmitter resonator; and connecting at least one capacitor with a capacitor $C_1$ of the wireless power transmitter through a continuous circuit pathway, wherein $C_1$ is connected in series with a coil of the transmitter resonator.

23. The method of claim 18, wherein the transmitter resonator comprises a resonator coil and the transmitter comprises a first capacitor $C_1$ connected in series with the resonator coil, the method further comprising:

measuring a first voltage across a combination of the first capacitor and the resonator coil and a second voltage across the first capacitor; and determining the reflected impedance based on the measured first and second voltages.

24. The method of claim 18, further comprising determining whether a RFID tag is present in proximity to the transmitter by:

identifying one or more local maximum values in the reflected impedance of the transmitter resonator at frequencies between $f_1$ and $f_2$;

determining frequencies associated with the one or more local maximum values; and comparing the determined frequencies to reference information comprising resonance frequencies associated with RFID tags.

* * * * *